(12) United States Patent
Wang et al.

(10) Patent No.: US 11,099,353 B2
(45) Date of Patent: Aug. 24, 2021

(54) ADJUSTABLE OPTICAL LENS AND CAMERA MODULE, MANUFACTURING METHOD AND APPLICATIONS THEREOF

(71) Applicant: Ningbo Sunny Opotech Co., Ltd., Zhejiang (CN)

(72) Inventors: Mingzhu Wang, Ningbo (CN); Bojie Zhao, Ningbo (CN); Heng Jiang, Ningbo (CN); Liang Ding, Ningbo (CN); Feifan Chen, Ningbo (CN); Chunmei Liu, Ningbo (CN); Nan Guo, Ningbo (CN); Shoujie Wang, Zhejiang (CN)

(73) Assignee: Ningbo Sunny Opotech Co., Ltd., Zhejiang (CN)

( * ) Notice: Subject to any disclaimer, the term of this patent is extended or adjusted under 35 U.S.C. 154(b) by 145 days.

(21) Appl. No.: 15/772,512

(22) PCT Filed: Oct. 25, 2016

(86) PCT No.: PCT/CN2016/103253
§ 371 (c)(1),
(2) Date: May 22, 2018

(87) PCT Pub. No.: WO2017/071561
PCT Pub. Date: May 4, 2017

(65) Prior Publication Data
US 2019/0079262 A1 Mar. 14, 2019

(30) Foreign Application Priority Data

Oct. 30, 2015 (CN) .......................... 201510726575.6
Dec. 2, 2015 (CN) .......................... 201510873537.3
(Continued)

(51) Int. Cl.
*G02B 7/10* (2021.01)
*G02B 5/20* (2006.01)
(Continued)

(52) U.S. Cl.
CPC ................. *G02B 7/10* (2013.01); *G02B 5/20* (2013.01); *G02B 7/00* (2013.01); *G02B 7/003* (2013.01);
(Continued)

(58) Field of Classification Search
CPC . G02B 7/10; G02B 7/102; G02B 5/20; G02B 7/00; G02B 7/003; G02B 7/006;
(Continued)

(56) References Cited

U.S. PATENT DOCUMENTS 10,222,573 B2 * 3/2019 Wang .................. G02B 7/003
2007/0047110 A1 * 3/2007 Matsushima .......... G02B 7/023
359/819
(Continued)

FOREIGN PATENT DOCUMENTS

JP 2005024996 1/2005
JP 2006078849 3/2006
(Continued)

*Primary Examiner* — Jie Lei
(74) *Attorney, Agent, or Firm* — Raymond Y. Chan; David and Raymond Patent Firm

(57) ABSTRACT

An adjustable optical lens and camera module, and manufacturing method and applications thereof is disclosed. The camera module includes an optical sensor and an adjustable optical lens. The adjustable optical lens includes an optical structural member and at least two lenses, wherein each of the lenses is arranged in an internal space of the optical structural member. Along a vertical direction of the optical structural member, at least one lens is adapted to be adjustably pre-mounted to an internal space of the optical structural member serving as an adjustable lens. The side wall of
(Continued)

the optical structural member is provided with at least one adjustment channel, which is positioned corresponding to the adjustable lens, so that an assembling position of the adjustable lens can be adjusted through the adjustment channel so as to align a central axis line of the adjustable optical lens with a central axis line of the optical sensor.

20 Claims, 33 Drawing Sheets

(30) Foreign Application Priority Data

| | | |
|---|---|---|
| Dec. 21, 2015 | (CN) | 201510968893.3 |
| Dec. 29, 2015 | (CN) | 201511009093.5 |
| Oct. 25, 2016 | (WO) | PCT/CN2016/103253 |

(51) Int. Cl.
*H04N 5/225* (2006.01)
*G02B 7/02* (2021.01)
*G02B 7/00* (2021.01)
*G02B 13/00* (2006.01)

(52) U.S. Cl.
CPC .............. *G02B 7/02* (2013.01); *G02B 7/023* (2013.01); *G02B 7/025* (2013.01); *H04N 5/2254* (2013.01); *G02B 13/001* (2013.01)

(58) Field of Classification Search
CPC .......... G02B 7/02; G02B 7/026; G02B 7/023; G02B 7/021; G02B 7/025; G02B 7/09; G02B 7/14; G02B 13/001; G03B 5/06; G03B 3/02; G03B 3/10; G03B 17/14; H04N 5/225; H04N 5/2254
USPC ....... 359/694, 699, 700, 701, 704, 811, 819, 359/821, 822, 823, 826; 396/529, 530, 396/533, 535, 544
See application file for complete search history.

(56) References Cited

U.S. PATENT DOCUMENTS

| | | | | |
|---|---|---|---|---|
| 2010/0053776 | A1* | 3/2010 | Tanaka | G02B 9/60 359/793 |
| 2011/0069198 | A1* | 3/2011 | Ezawa | G02B 7/025 348/222.1 |
| 2012/0063764 | A1* | 3/2012 | Yamamoto | G02B 7/003 396/531 |
| 2013/0107381 | A1* | 5/2013 | Ezawa | G02B 7/023 359/823 |
| 2017/0176705 | A1* | 6/2017 | Wang | H04N 5/2257 |
| 2019/0137721 | A1* | 5/2019 | Wang | G02B 7/003 |

FOREIGN PATENT DOCUMENTS

| | | |
|---|---|---|
| KR | 20140069803 | 6/2014 |
| KR | 1020140076761 A | 6/2014 |
| WO | 2013063014 | 5/2013 |
| WO | 2013063014 | 6/2015 |

* cited by examiner

ADJUSTABLE OPTICAL LENS AND CAMERA MODULE, MANUFACTURING METHOD AND APPLICATIONS THEREOF

CROSS-REFERENCE TO RELATED APPLICATIONS

This is a non-provisional application that claims the benefit of priority under 35U.S.C.§ 371 to international application number PCT/CN2016/103253, international filing date Oct. 25, 2016, which claims priority under 35 U.S.C. 119(a-d) to Chinese application number CN201510726575.6, filed Oct. 30, 2015, Chinese application number CN201510873537.3, filed Dec. 2, 2015, Chinese application number CN201510968893.3, filed Dec. 21, 2015 and Chinese application number CN201511009093.5, filed Dec. 29, 2015, which are incorporated herewith by references in their entities. wherein the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of camera module, and more particularly to an adjustable optical lens and camera module and manufacturing method and applications thereof.

Description of Related Arts

As mobile electronic devices have become popular, camera module related technologies applied to mobile electronic devices for images capturing (e.g. videos or pictures) for the user have been rapidly developed and improved. Meanwhile, the camera module has recently and widely applied to various fields, including health care, safety and security, and industrial production fields, and etc.

The conventional camera module comprises a lens and an optical sensor. The lens is arranged along a photosensitive path of the optical sensor within a barrel, and that lights reflected from an object can enter an inside of the camera module through the lens and be received by the optical sensor to proceed photoelectric conversion, so that images respective to the object can be subsequently captured by the camera module. As the camera module technology has been further utilized in all industries and fields, users in the market have demanded strictly more on the imaging quality of the camera module. However, due to the limitation of the molding and packaging technique of the camera module and the manufacturing process of the lens of the camera module, the current camera module in the market can barely fulfill the application needs of the high quality camera module for the market. More particularly, the conventional optical lens usually comprises a plurality of lens which are aligned overlappingly with each other and molded together. In the lens, a central axis line of the lens can be affected by a position of the central axis line of each lens. The most ideal condition is that the central axis line of each lens is coincided with each other. However, because of the limitation of the packaging technique, there is certain deviation generated among central axis lines of each lens. Also, because each lens needs to be arranged on the case of optical lens through a gluing or welding process, a position and an inclination of each lens are affected by the gluing and welding material, so that the central axis line of the lens has a greater deviation by packaging each overlapped lens in the camera case. In the process of packaging the lens and the optical sensor together to form the camera module, it is difficult to ensure that the central axis line of the lens and the central axis line of the optical sensor are aligned. Once, there is a deviation between the central axis line of the lens and the central axis line of the optical sensor, the image quality of the camera module will certainly be affected. Therefore, in the process of producing the camera module, how to ensure the image quality of the produced camera module and the series of problems being occurred as mentioned above while ensuring the image quality during production of the camera module become the major technical difficulties to be resolved.

Major manufacturers in the field of camera module continuously improve their technologies as the expanding applications of the camera module and boosting of the market competition. Their goals and the key in marketing competition include lower production cost, higher production efficiency, and better imaging quality of the camera module.

Regular cellphone camera modules often have blur imaging issue due to tilt of the material or assembling. In order to solve the blur imaging issue caused by tilt of the material or assembling, a technology is provided, which adjusts the optics path of the camera lens through adjusting a piece or a set of the camera lenses, which means a movable part of the camera lens of the assembled camera module can be adjusted in at least one of the horizontal, vertical, tilt, rotation directions, such that the optical axis of the camera lens can be perpendicular to the chip or within an allowable range of deviance, so as to solve the blur imaging issue. However, the way to better adjust the lens and affix it after adjustment to ensure good imaging quality while keeping low cost and easy assembling of the camera module has then become an urgent demand in the field of camera module.

As mentioned above, when the applications of the camera module expands, the need of camera module continuously increases in a lot of industries, and the quality requirement on camera module becomes higher and higher. There is stricter demand to the manufacturers of camera module for better imaging quality camera modules with lower cost.

In a regular camera module assembling procedure, camera lens is a part to be independently assembled. It includes the structures of a lens cone (including an aperture member), lens(es), spacer ring, stopper, and etc. The assembling process includes, orderly, installing the spacer ring and lens(es) in the lens cone and utilizing glue or stopper to affix the last lens in position to complete the assembling of the camera lens. The assembling tolerance of the above assembling method includes the assembling tolerance of the lens and spacer ring and the assembling tolerance of the lens and camera lens. Therefore, the assembling tolerance chain of this assembling method is too long, which brings high assembling cost and low accuracy of the assembling position of the lens and affects the quality of the camera lens. As a result, the quality of the entire camera module and products installed with such camera module would be adversely influenced.

Hence, how to improve on the camera module assembling, shorten the assembling tolerance chain, lower the production cost, and increase the imaging quality has become an urgent issue to be solved.

SUMMARY OF THE PRESENT INVENTION

The invention is advantageous in that it provides an adjustable optical lens and camera module and manufacturing method and applications thereof, wherein the adjustable optical lens comprises an optical structural member and at least two lenses. The lenses are overlappingly and spacedly arranged in an internal space of the optical structural member, and the position of at least one of the lens in the internal space of the optical structural member is adjustably arranged.

Another advantage of the invention is to provide an adjustable optical lens and camera module and manufacturing method thereof, wherein the central axis line of the adjustable optical lens is able to be adjusted through changing the position(s) of one or more lenses of a lens set in the internal space of the optical structural member. For example, while the position of the one or more lenses in the internal space of the optical structural member is adjusted, the central axis lines of the adjustable optical lens and the lens set formed by each lens are coincided, so as to increase the yield rate of the adjustable optical lens.

Another advantage of the invention is to provide an adjustable optical lens and camera module and manufacturing method and applications thereof, wherein positions of the lenses of the adjustable optical lens in the internal space of the optical structural member are able be adjusted along at least one direction.

Another advantage of the invention is to provide an adjustable optical lens and camera module and manufacturing method and applications thereof, wherein the horizontal position(s) of the one or more lenses of the adjustable optical lens in the internal space of the optical structural member can be adjusted.

Another advantage of the invention is to provide an adjustable optical lens and camera module and manufacturing method and applications thereof, wherein the vertical position(s) of the one or more lens of the adjustable optical lens in the internal space of the optical structural member can be adjusted.

Another advantage of the invention is to provide an adjustable optical lens and camera module and manufacturing method and applications thereof, wherein the tilt position(s) of the one or more lens of the adjustable optical lens in the internal space of the optical structural member can be adjusted.

Another advantage of the invention is to provide an adjustable optical lens and camera module and manufacturing method and applications thereof, wherein each lens of the adjustable optical lens in the internal space of the optical structural member is able to be adjusted to rotate.

Another advantage of the invention is to provide an adjustable optical lens and camera module and manufacturing method and applications thereof, wherein the optical structural member has at least one adjustment channel, and when the one or more lenses are packed in the internal space of the optical structural member to form the adjustable optical lens, the one or more lenses are arranged in the internal space of the optical structural member which is relative to the adjustment channel, so that the position of at least one of the one or more lenses in the internal space of the optical structural member of the optical structural member is able to be adjusted from the external environment through the at least one adjustment channel, so as to simplify the operation process.

Another advantage of the invention is to provide an adjustable optical lens and camera module and manufacturing method and applications thereof, wherein in a manufacturing method of the camera module by packaging the adjustable optical lens and an optical sensor with each other, the position of at least one of the lenses of the adjustable optical lens in the internal space of the optical structural member is able to be adjusted, so as to ensure that the central axis line of the adjustable optical lens of the camera module and the central axis line of the optical sensor are coincided.

Another advantage of the invention is to provide an adjustable optical lens and camera module and manufacturing method and applications thereof, wherein when the position of one of the lenses in the internal space of the optical structural member is adjusted, the adjusted lens is firstly packaged in the optical structural member and then the adjustable optical lens and the optical sensor are packaged. An offset generated between the adjusted optical lens and the optical sensor can be prevented in this process of packaging the adjustable optical lens and the optical sensor, so as to guarantee the reliability of the camera module.

Another advantage of the invention is to provide an adjustable optical lens and camera module and manufacturing method and applications thereof, wherein in the process of packaging the camera module, a range of deviation of the central axis line of the adjustable optical lens and the central axis line of the optical sensor can be adjusted within an acceptable range, so as to improve a yield rate and image quality for the camera module.

Another advantage of the present invention is to provide an adjustable optical lens and camera module and manufacturing method and applications thereof, wherein the adjustable optical lens includes an aperture member. The aperture member is arranged on a top position of an optical structural member and is able to be adjusted respective to the position of the optical structural member.

Another advantage of the present invention is to provide an adjustable camera lens and camera module and manufacturing method and applications thereof, which changes current manufacturing method of camera module by preassembling optical lenses into optical structural member to be adjusted to reach resolution requirement and affixed, so as to form a fixed camera module. This reduces manufacturing procedures and is able to solve current issues of too much tolerance from the assembling with the manufacturing method of camera module and process defect of overlength tolerance chain in the assembling.

Another advantage of the present invention is to provide an adjustable camera lens and camera module and manufacturing method and applications thereof, which reduces successive testing process, lowers testing cost, and has lower production cost and higher efficiency.

Another advantage of the invention is to provide an adjustable optical lens and camera module and manufacturing method and applications thereof, wherein positions of the lens of the adjustable optical lens in the internal space of the optical structural member are able to be adjusted along at least one direction.

Another advantage of the invention is to provide an adjustable optical lens and camera module and manufacturing method and applications thereof, wherein a horizontal position of each lens and/or aperture member of the adjustable optical lens in the internal space of the optical structural member is able to be adjusted.

Another advantage of the invention is to provide an adjustable optical lens and camera module and manufacturing method and applications thereof, wherein a vertical position of each lens and/or aperture member of the adjustable optical lens in the internal space of the optical structural member is able to be adjusted.

Another advantage of the invention is to provide an adjustable optical lens and camera module and manufacturing method and applications thereof, wherein a tilt position of each lens and/or aperture member of the adjustable optical lens in the internal space of the optical structural member is able to be adjusted.

Another advantage of the invention is to provide an adjustable optical lens and camera module and manufacturing method and applications thereof, wherein a position of each lens of the adjustable optical lens in the internal space of the optical structural member is able to be adjusted to rotate.

Another advantage of the invention is to provide an adjustable optical lens and camera module and manufacturing method and applications thereof, wherein the optical structural member has at least one adjustment channels, and when the one or more lenses are packaged in the internal space of the optical structural member to form the adjustable optical lens, the one or more lenses are arranged in the internal space of the optical structural member in relative to the adjustment channel, so that the position of at least one of the one or more lenses in the internal space of the optical structural member of the optical structural member is able to be adjusted through the adjustment channel from the external environment, so as to simplify the operation process.

Another advantage of the invention is to provide an adjustable optical lens and camera module and manufacturing method and applications thereof, wherein in a manufacturing method for the camera module by packaging the adjustable optical lens and an optical sensor with each other, the position of at least one of the lenses of the adjustable optical lens in the internal space of the optical structural member is able to be adjusted, so as to ensure that the central axis line of the adjustable optical lens of the camera module and the central axis line of the optical sensor are coincided.

Another advantage of the invention is to provide an adjustable optical lens and camera module and manufacturing method and applications thereof, wherein when the position of at least one of the one or more lenses in the internal space of the optical structural member is adjusted, the adjustable optical lens and the optical sensor are packaged. An offset generated between the adjusted optical lens and the optical sensor can be prevented in this process of packaging the adjustable optical lens and the optical sensor, so as to guarantee the reliability of the camera module.

Another advantage of the invention is to provide an adjustable optical lens and camera module and manufacturing method and applications thereof, wherein in the process of packaging the camera module, a range of deviation of the central axis line of the adjustable optical lens and the central axis line of the optical sensor can be adjusted within an acceptable range, so as to improve a yield rate and image quality for the camera module.

Another advantage of the present invention is to provide an adjustable optical lens and camera module and manufacturing method and applications thereof, wherein camera modules made with this method are structurally tighter. Also, the manufacturing method is simple.

Another advantage of the present invention is to provide an adjustable optical lens and camera module and manufacturing method and applications thereof, wherein it is able to make camera modules having higher image quality through correcting the assembling positions of the adjustable optical elements with the image quality of the camera module as a standard.

An object of the present invention is to provide an adjustable optical lens and camera module and manufacturing method and applications thereof, which mainly solves the issue about the design of the lens and optical structural member, such that a piece or a set of the lenses in the inside can be adjusted and subsequently fixed.

An object of the present invention is to provide an adjustable optical lens and camera module and manufacturing method and applications thereof, wherein the tilt issue of the module caused by the material or assembling can be solved through adjusting one piece or one set of lens in the optics system of the camera module, such that the yield rate of the camera module can be increased.

An object of the present invention is to provide an adjustable optical lens and camera module and manufacturing method and applications thereof, wherein the adjustable optical lens is formed by adjusting the lens, which can effectively avoid defective on the camera lens, so as for reducing the unit price of the camera lens, helping manufacturer to lower the production cost of the camera module, and increasing the competitiveness of the product in the industry.

An object of the present invention is to provide an adjustable optical lens and camera module and manufacturing method and applications thereof, wherein the optical structural member has at least an adjustment channel arranged on the end face thereof, such that the lens at the end face of the optical structural member can be optically adjusted by vacuum suction or tool clamping for increasing the calibration accuracy.

An object of the present invention is to provide an adjustable optical lens and camera module and manufacturing method and applications thereof, wherein the optical structural member has at least an adjustment channel arranged on the top thereof, wherein the lens has an adjustment groove at the position corresponding to the adjustment channel, so as for being held from the outside and adjusted, which makes the adjustment simpler and easier.

An object of the present invention is to provide an adjustable optical lens and camera module and manufacturing method and applications thereof, wherein the optical structural member has at least an adjustment channel arranged on a side thereof so as for adjusting any one or one set of the lenses in the optical structural member, which expands the quantity and limit of the adjustment of the adjustable lens and helps to calibrate the optical path of the adjustable optical lens more accurately.

An object of the present invention is to provide an adjustable optical lens and camera module and manufacturing method and applications thereof, wherein the position for adjusting the lens and the position for affixing the lens can selectively be the same, such that the adjustment channel can also be utilized for affixing the calibrated optical lens and the production cost can be further reduced.

An object of the present invention is to provide an adjustable optical lens and camera module and manufacturing method and applications thereof, wherein the optical structural member has at least an affixing channel arranged thereon, so as for affixing the adjusted optical lens through the affixing channel, wherein the affixing channel and the adjustment channel are located at different positions, which provides more choices and make it easier.

Another advantage of the invention is to provide an adjustable optical lens and camera module and manufacturing method and applications thereof, wherein the adjustment channel communicates the internal space of the optical structural member with external environment, such that the lens inside of the optical structural member can be adjusted from the outside of the optical structural member, which ensures the adjustment accuracy.

Another advantage of the invention is to provide an adjustable optical lens and camera module and manufacturing method and applications thereof, wherein the affixing channel communicates the internal space of the optical structural member with external environment, wherein the adjusted optical lens can be affixed by injecting adhesive through the affixing channel.

Another advantage of the invention is to provide an adjustable optical lens and camera module and manufacturing method and applications thereof, wherein the adjustable optical lens can be affixed through injecting adhesive on the top surface or side thereof.

Another advantage of the invention is to provide an adjustable optical lens and camera module and manufacturing method and applications thereof, wherein the adjustable lens is preassembled on the top of the optical structural member so as for being adjusted from the light incident position on the top of the optical structural member, which adjustment method is simple and easy.

Another advantage of the invention is to provide an adjustable optical lens and camera module and manufacturing method and applications thereof, wherein the first piece of the lenses is treated as the adjustable lens adaptable to be adjusted through vacuum suction or tool clamping and affixed, which adjustment method is simpler and does not require to arrange adjustment channel and/or affixing channel on the optical structural member.

Another advantage of the present invention is to provide an adjustable optical lens and camera module and manufacturing method and applications thereof, which can decrease the tolerance chain of lens assembling, reduce assembly costs, and enhance imaging quality of the camera module.

Another advantage of the present invention is to provide an adjustable optical lens and camera module and manufacturing method and applications thereof, wherein the internal optical lenses are embedded and integrated with one another, which lowers the machining precision of the lens cone component and the accuracy requirement of the assembling among the lenses and the lens cone component and helps to reduce the cost.

Another advantage of the present invention is to provide an adjustable optical lens and camera module and manufacturing method and applications thereof, wherein the internal optical lenses are embedded and integrated with one another before being assembled on the lens cone component, which improves the conventional technology of one-by-one assembling, shortens the assembling tolerance chain, and enhances the assembling efficiency.

Another advantage of the present invention is to provide an adjustable optical lens and camera module and manufacturing method and applications thereof, wherein the last piece of the lens, as the outside optical lens, is not installed in the lens cone component, but is connected between the outside of the lens cone component and the bottom of the lens cone component, which can effectively lower the requirements on the machining precision of the lens cone component and the assembling accuracy of the connection between the lenses and the lens cone component, so as to reduce the cost and increase the imaging quality.

Another advantage of the present invention is to provide an adjustable optical lens and camera module and manufacturing method and applications thereof, wherein a shading layer is arranged on the outer side of the last optical lens, which serves as the external optical lens, so as to block external light from entering through the channel that is not for light incidence and avoids light leakage of the camera lens, so as to guarantee high quality of the camera lens. Besides, a thinner shading layer also helps to reduce the weight of the camera module lens.

Another advantage of the invention is to provide an adjustable optical lens and camera module and manufacturing method and applications thereof, wherein the external optical lens is leant on the lens mount instead of being installed in the lens cone component, such that the assembling tolerance between the lens cone component and the lens mount will not affect the imaging quality of the camera module, which shortens the assembling tolerance chain of the lens and improves on the production efficiency.

Another advantage of the invention is to provide an adjustable optical lens and camera module and manufacturing method and applications thereof, wherein a distance between the camera lens and the optical sensor can be decreased by arranging the last optical lens between the outside of the lens cone and the lens mount, such that the back focal length can be shortened, which helps the development of compact camera module.

Another advantage of the invention is to provide an adjustable optical lens and camera module and manufacturing method and applications thereof, wherein at least one internal optical lens is utilized as the adjustable lens for being adjusted to make the central axis line of the camera module lens and the central axis line of the optical sensor coincide or be within an allowable range of deviance, so as to calibrate the imaging quality of the camera module and ensure a better imaging quality of the camera module being produced.

Another advantage of the invention is to provide an adjustable optical lens and camera module and manufacturing method and applications thereof, wherein the external optical lens is preassembled between the lens cone component and the lens mount, such that it is adaptable to adjust the optical path of the camera module lens through adjusting the external optical lens and/or the lens cone component for calibrating the imaging of the camera module, which helps to increase the imaging quality and yield rate of the camera module.

Another advantage of the present invention is to provide an adjustable optical lens and camera module and manufacturing method and applications thereof, which can complete the calibration during the assembling process, including calibrating the back focal length of the lens and adjusting the imaging quality of the camera module through arranging the adjustable lens, so as to greatly increase the yield rate and product performance of the camera module.

Another advantage of the invention is to provide an adjustable optical lens and camera module and manufacturing method and applications thereof, wherein calibration of the camera module can be completed in the process of manufacture through arranging the adjustable lens, which saves the successive focusing step, cuts on the working procedure, reduces the cost, and increases the efficiency.

Another advantage of the present invention is to provide an adjustable optical lens and camera module and manufacturing method and applications thereof, wherein the assembling method is simple, feasible, easy to practice, suitable for spread and utilization.

Additional advantages and features of the invention will become apparent from the description which follows, and may be realized by means of the instrumentalities and combinations particular point out in the appended claims.

In order to achieve at least one of the above advantages, objectives and features, according to another aspect of the present invention, the present invention provides a camera module, including:

an optical sensor; and an adjustable optical lens, positioned in a photosensitive path of the optical sensor, wherein the adjustable optical lens comprises:

an optical structural member; and at least two lenses, wherein each of the lenses is arranged in an internal space of the optical structural member and along a vertical direction of the optical structural member, wherein at least one of the lenses is adapted to be adjustably pre-mounted to an interior of the optical structural member as a pre-mounted optical lens, wherein a side wall of the optical structural member has at least one adjustment channel provided, corresponding to the pre-mounted optical lens and communicating the internal space of the optical structural member and an external environment, so that a position of at least one of the lenses can be adjusted from the external environment through the adjustment channel so as to align central axis lines of the adjustable optical lens and the optical sensor.

According to some embodiments, the optical lens preassembled in the camera module is assembled in the inside of the optical structural member by a gluing process, wherein the adhesive used in the preassembling is a mixed adhesive of an UV adhesive and a thermosetting adhesive, which becomes semi-solidified after ultraviolet exposure to achieve the preassembling, wherein after a heating treatment, the mixed adhesive will be completely solidified so as to affix the whole adjustable optical lens.

According to some embodiments, the adjustable optical lens of the camera module comprises an aperture member which is installed at a top of the optical structural member and aligned with the lenses along a photosensitive path of the optical sensor and is adapted to be adjustably arranged, wherein the aperture member is preassembled through semi-solidifying adhesive.

According to some embodiments, an adhesive injection channel is provided in the aperture member of the camera module, wherein the adhesive injection channel is positioned and arranged corresponding to the lens adapted to be adjusted, so as to affix the adjusted optical lens(es) through injecting adhesive via the adhesive injection channel.

According to another aspect, the present invention provides a camera module, including:

a photosensitive device, which includes an optical sensor; and an adjustable optical lens arranged in a photosensitive path of the optical sensor, wherein the adjustable optical lens comprises five lenses, including a first lens, a second lens, a third lens, a fourth lens, and a fifth lens, wherein the first to fifth lenses are orderly and overlappingly installed in an optical structural member along the photosensitive path of the optical sensor, wherein the first lens and the second lens are adjustably preassembled in the optical structural member;

wherein two adjustment channels are provided in the optical structural member, each corresponding to the first lens and the second lens and communicating an internal space of the optical structural member with an external environment so as to adjust spatial positions of the first lens and the second lens in the internal space of the optical structural member through the adjustment channels.

According to some embodiments, an inner wall of the optical structural member in the camera module comprises five limiting structures spacingly arranged thereon, including a first limiting structure, a second limiting structure, a third limiting structure, a fourth limiting structure, and a fifth limiting structure, which support the first lens, the second lens, the third lens, the fourth lens, and the fifth lens respectively.

According to some embodiments, the adjustable optical lens of the camera module comprises an aperture member which is installed at a top of the optical structural member and aligned with the lenses along a photosensitive path of the optical sensor and is adapted to be adjustably arranged, wherein the aperture member is preassembled with the semi-solidifying adhesive.

According to some embodiments, an adhesive injection channel is provided in the aperture member of the camera module, wherein the adhesive injection channel is formed corresponding to the lens to be adjusted, so as to affix the adjusted optical lens through injecting adhesive via the adhesive injection channel.

According to another aspect, the present invention provides a camera module, including:

an adjustable optical lens; and a photosensitive device comprising an optical sensor, wherein the adjustable optical lens is arranged in a photosensitive path of the optical sensor;

wherein the adjustable optical lens comprises a first lens, a second lens, a third lens, and a fourth lens; and an optical structural member, wherein the first to fourth lenses are orderly, overlappingly, and spacedly installed in the an internal space of the optical structural member, wherein the optical structural member comprises at least an adjustment channel arranged on a top thereof, wherein the adjustment channel communicates the internal space of the optical structural member with an external environment, wherein the adjustment channel faces the first lens, such that the first lens can be adjusted through the adjustment channel and the first lens can also be affixed by injecting adhesive through the adjustment channel.

According to some embodiments, adhesive is injected between a side of the first lens and a corresponding inner wall of the optical structural member through the adjustment channel of the camera module, so as to affix the first lens in position by affixing the side of the first lens with the inner wall of the optical structural member.

According to some embodiments, adhesive is injected to a top surface of the first lens through the adjustment channel of the camera module, so as to affix the first lens in position by affixing the top surface of the first lens with the inner wall of the optical structural member.

According to some embodiments, the photosensitive device of the camera module further comprises a filter, a circuit board, and a lens mount. The filter is mounted in the lens mount and arranged above the optical sensor. The optical sensor is attached on the circuit board. The circuit board is mounted on a bottom of the lens mount so as to have the optical sensor located in a cavity defined by inner walls of the lens mount.

According to some embodiments, there are three adjustment channels separately arranged from one another at 120 degrees along in a peripheral direction on the outer side of the optical structural member of the camera module.

According to some embodiment, the top surface of the first lens of the camera module has at least two adjustment grooves arranged thereon corresponding to the adjustment channel.

According to another aspect, the present invention also provides a camera module, including:

an adjustable optical lens; and a photosensitive device, comprising an optical sensor, wherein the adjustable optical lens is arranged in a photosensitive path of the optical sensor;

The adjustable optical lens comprises:

four lenses, which are respectively a first lens, a second lens, a third lens, and a fourth lens; and an optical structural member has four of the lenses orderly, overlappingly, and spacedly installed in the internal space thereof. The optical structural member comprises at least an adjustment channel arranged on a side thereof and at least a affixing channel arranged on the top thereof. The adjustment channel and the affixing channel communicate the internal space of the optical structural member with external environment. The adjustment channel faces the side of the first lens, such that the first lens can be adjusted through the adjustment channel. The affixing channel faces the top surface of the first lens, such that the first lens can be affixed by injecting adhesive through the affixing channel.

According to some embodiment, there are three adjustment channels separately arranged from one another at 120 degrees along in a peripheral direction of the optical structural member corresponding to the outer side of the first lens of the camera module.

According to some embodiment, the photosensitive device of the camera module comprises a filter, a circuit board, and a lens mount. The filter is mounted in the lens mount and arranged above the optical sensor. The optical sensor is attached on the circuit board. The circuit board is mounted on the bottom of the lens mount so as to have the optical sensor located in the cavity defined by the inner walls of the lens mount.

According to another aspect, the present invention provides a camera module, including:

an camera module lens; and a photosensitive device comprising an optical sensor, wherein the camera module lens is arranged in a photosensitive path of the optical sensor;

wherein the camera module lens comprises:

three internal lenses;

at least an external lens; and a lens cone component having an accommodating cavity therein, wherein the three internal lenses include a first internal lens, a second internal lens and a third lens arranged in the accommodating cavity, wherein the external lens is arranged on a bottom outside the lens cone component, wherein a side wall of the lens cone component has at least an adjustment channel arranged therein corresponding to the first internal lens, wherein the first internal lens is adjustably preassembled on the lens cone component.

According to some embodiments, every outer side of each external lens of the camera module has a shading layer that completely covers the entire side of the external lens.

According to some embodiments, there is at least an affixing channel positioned corresponding to the first internal lens and arranged on the top of the lens cone component of the camera module, such that the first internal lens can be affixed by glue dispensing through the affixing channel.

According to some embodiments, the lens cone component of the camera module comprises four adjustment channels separately arranged from one another at 90 degrees.

According to some embodiments, the second internal lens and the third internal lens of the camera module are embedded with each other to form a whole lens unit.

According to some embodiments, the photosensitive device of the camera module further comprises a filter, a circuit board and a lens mount. The filter is mounted in the lens mount and arranged above the optical sensor. The optical sensor is provided on the circuit board. The circuit board is mounted on the bottom of the lens mount so as to have the optical sensor positioned in the cavity inside the lens mount. The external lens is arranged between the lens cone component and the lens mount.

According to another aspect of the present invention, the present invention provides an adjustable optical lens, including:

an optical structural member; and at least two lenses, wherein each of the lenses is arranged in an internal space of the optical structural member along an axial direction of the optical structural member, wherein a position of at least one of the lenses in the internal space of the optical structural member is arranged to be adjusted.

According to a preferred embodiment of the present invention, the optical structural member has at least one adjustment channel provided to communicate the internal space of the optical structural member with an external environment, and at least one of the lenses being preassembled is arranged in the internal space of the optical structural member corresponding to the adjustment channel, wherein the lens being preassembled in the internal space of the optical structural member is able to be adjusted through the adjustment channel.

According to another aspect of the present invention, the present invention provides a camera module, including:

an optical sensor; and an adjustable optical lens, wherein the adjustable optical lens is arranged in a path of photoreception of the optical sensor, wherein the adjustable optical lens comprises an optical structural member and at least two lenses, wherein each lens is arranged in an internal space of the optical structural member along a vertical direction of the optical structural member, wherein a central axis line of the adjustable optical lens and a central axis line of the optical sensor are coincided through adjusting a position of at least one of the lenses in the internal space of the optical structural member before of the adjustable optical lens and the optical sensor are packaged, so as to improve the image quality of the camera module.

According to a preferred embodiment of the present invention, the optical structural member has at least one adjustment channel provided to communicate the internal space of the optical structural member with an external environment, and the lens being preassembled is arranged in the internal space of the optical structural member corresponding to the adjustment channel, wherein the lens being preassembled in the internal space of the optical structural member is able to be adjusted through the adjustment channel.

According to a preferred embodiment of the present invention, a gap is provided between an outer wall of the lens and an inner wall of the optical structural member.

According to a preferred embodiment of the present invention, a width of the gap provided between the outer wall of the lens and the inner wall of the optical structural member is greater than or equal to 3 micron.

According to another aspect of the present invention, the present invention provides a manufacturing method of camera module, including the following steps:

(a) arranging an adjustable optical lens in a photosensitive path of an optical sensor;

(b) adjusting position of at least one of the lenses of the adjustable optical lens to make a central axis line of the adjustable optical lens with a central axis line of the optical sensor being coincided; and (c) packaging the adjustable optical lens and the optical sensor to form the camera module.

According to a preferred embodiment of the present invention, in the step (b), the central axis line of the adjustable optical lens and the central axis line of the optical sensor can be coincided by adjusting a position of one of the lenses of the adjustable optical lens.

According to a preferred embodiment of the present invention, in the above manufacturing method, the central axis line of the adjustable optical lens and the central axis line of the optical sensor can be coincided by adjusting a position of the lens at the outermost of the adjustable optical lens.

According to an embodiment of the present invention, in the above manufacturing method, at least one of a horizontal direction, a vertical direction, a tilt direction, and a peripheral direction of the lens is to be adjusted.

According to a preferred embodiment of the present invention, in the above manufacturing method, the adjusted lens and the optical structural member are packaged after the position of the lens in the internal space of an optical structural member is adjusted.

According to a preferred embodiment of the present invention, in the above mentioned manufacturing method, a side portion of the optical structural member has at least an adjustment channel formed in at least a position corresponding to the lens arranged in the internal space of the optical structural member, so that the position of the lens in the internal space of the optical structural member from an external environment of the optical structural member is able to be adjusted through the adjustment channel.

According to another aspect of the present invention, the present invention also provides a manufacturing method of camera module, which includes the following steps:

(A) arranging a semi-finished article of an optical structural member in a photosensitive path of an optical sensor such as a photosensitive chip;

(B) arranging at least one lens in the semi-finished article of the optical structural member to form an adjustable optical lens;

(C) adjusting one or more positions of the lens in an internal space of the optical structural member until a central axis line of the adjustable optical lens and a central axis line of the optical sensor are coincided.

According to a preferred embodiment of the present invention, the manufacturing method further comprises a step of:

(D) affixing the adjustable optical lens and the optical structural member to form the camera module.

In a preferred embodiment of the present invention, the lens and the optical structural member are affixed by an adhesive dispensing process.

According to the above mentioned preferred embodiment of the present invention, according to the step (A), the optical structural member is arranged in the photosensitive path of the optical sensor. Also, in the step (B), the lenses are overlappingly and spacedly arranged in the internal space of the optical structural member along a vertical direction of the optical structural member.

According to a preferred embodiment of the present invention, the semi-finished article of the optical structural member arranged in the photosensitive path of the optical sensor, in the step (A), comprises one the optical structural member and at least one of the lenses which are preassembled in the internal space of the optical structural member, wherein the rest of the lenses are arranged in the internal space of the optical structural member in the step (B).

According to another aspect of the present invention, the present invention provides an adjustable optical lens, including:

an optical structural member; and at least two lenses, wherein each of the lenses is arranged in an internal space of the optical structural member along an axial direction of the optical structural member, wherein a position of at least one of the lenses in the internal space of the optical structural member is arranged to be adjusted.

According to an embodiment of the present invention, the optical structural member has at least one adjustment channel for communicating an internal space of the optical structural member with an external environment, wherein the lens in the internal space of the optical structural member is arranged at a position corresponding to the adjustment channel, so that a position of the lens in the internal space of the optical structural member can be selectively adjusted through the adjustment channel.

According to an embodiment of the present invention, the position of the lens adaptable to be adjusted in the internal space of the optical structural member is adapted to be adjusted in at least one direction.

According to an embodiment of the present invention, the lens adapted to be adjusted is preassembled inside the optical structural member with adhesive, wherein the adhesive is in a semi-solidified condition.

According to an embodiment of the present invention, the adjustable optical lens further includes an aperture member, which is preassembled on top of the optical structural member and in the same optical path with the lens, wherein the assembling position of the aperture member is adapted to be adjusted.

According to an embodiment of the present invention, assembling position of the aperture member is adapted to be adjusted in at least one direction corresponding to the position of the optical structural member.

According to an embodiment of the present invention, the aperture member is preassembled through semi-solidifying adhesive.

According to an embodiment of the present invention, the adhesive used in preassembling is a mixed adhesive of an UV adhesive and a thermosetting adhesive, which becomes semi-solidified after ultraviolet exposure to achieve the preassembling, wherein after the heating process, the adhesive will be completely solidified so as to affix the aperture member.

According to an embodiment of the present invention, an adhesive injection channel is provided at the position of the aperture member, wherein the adhesive injection channel is corresponding to the lens adapted to be adjusted, so as to affix the adjusted lens through injecting adhesive via the adhesive injection channel.

According to another aspect of the present invention, the present invention provides an adjustable optical lens, including:

an optical structural member;

at least one lens, wherein the lens is set and affixed in the internal space of the optical structural member along an axial direction of the optical structural member; and an aperture member, which is preassembled on top of the optical structural member and positioned adjacent to a top side of the lens, wherein an assembling position of the aperture member is adapted to be adjusted correspondingly to a spatial position of the optical structural member.

According to an embodiment of the present invention, the aperture member is preassembled by a semi-solidifying adhesive.

According to an embodiment of the present invention, the adhesive used in preassembling is a mixed adhesive of an UV adhesive and a thermosetting adhesive, which becomes semi-solidified after ultraviolet exposure to achieve the preassembling, wherein after a heating treatment, the mixed adhesive will be completely solidified so as to affix the aperture member.

According to an embodiment of the present invention, the assembling position of the aperture member is adapted to be adjusted in at least one direction.

According to an embodiment of the present invention, an inner wall of the optical structural member has at least one limit structure, adapting to support the lens.

According to another aspect of the present invention, the present invention provides a camera module, including:

a photosensitive device, including an optical sensor; and an adjustable optical lens, wherein the adjustable optical lens is arranged in a photosensitive path of the optical sensor, wherein the adjustable optical lens comprises an optical structural member, at least a lens, and an aperture member, wherein each lens is arranged in an internal space of the optical structural member along an axial direction of the optical structural member, wherein the aperture member is arranged on top of the optical structural member and positioned adjacent to a top side of the lens, wherein at least one of the lenses is preassembled in the internal space of the optical structural member, wherein before packaging the adjustable optical lens and the photosensitive device, an assembling position of the preassembled lens inside the optical structural member is adapted to be adjusted, wherein after adjustment, imaging of the camera module is turned to meet the resolution requirement.

According to an embodiment of the present invention, a side wall of the optical structural member has at least one adjustment channel connecting the internal space of the optical structural member to an external environment, wherein the preassembled lens in the internal space of the optical structural member is correspond to the adjustment channel, which is adaptable to adjust a position of the lens in the internal space of the optical structural member through the adjustment channel.

According to an embodiment of the present invention, a spatial position of the preassembled lens in the internal of the optical structural member is adaptable to be adjusted in at least one direction, wherein after adjustment, a central axis line of the adjustable optical lens and a central axis line of the optical sensor coincide or are within an allowable range of deviance.

According to an embodiment of the present invention, side walls of the optical structural member corresponding to each of the preassembled lenses have three adjustment channels separated from one another at 120 degrees, adaptable to adjust a horizontal and vertical position of the preassembled lenses at each of the adjustment channels.

According to an embodiment of the present invention, the preassembled lens is preassembled by semi-solidifying adhesive.

According to an embodiment of the present invention, the adhesive used in preassembling of the lens(es) is a mixed adhesive of an UV adhesive and a thermosetting adhesive, which becomes semi-solidified after ultraviolet exposure to achieve the preassembling, wherein after a heating treatment, the adhesive will be completely solidified to affix the aperture member.

According to an embodiment of the present invention, the photosensitive device further includes a filter, a lens mount, and a circuit board, wherein the filter is affixed on the lens mount, wherein the optical sensor is attached both on a top side of the circuit board and on a bottom side of the filter, wherein the optical structural member is affixed on a top side of the lens mount.

According to an embodiment of the present invention, the photosensitive device further includes a filter and a circuit board, wherein the filter is affixed on the optical structural member and located on a bottom side of the lens, wherein the optical sensor is attached both on the top side of the circuit board and on the bottom side of the filter, wherein the optical structural member is affixed correspondingly to a spatial distance from the optical sensor.

According to another aspect of the present invention, the present invention provides a camera module, including:

a photosensitive device, wherein the photosensitive device includes an optical sensor; and an adjustable optical lens, wherein the adjustable optical lens is arranged in a photosensitive path of the optical sensor, wherein the adjustable optical lens comprises an optical structural member, one or more lenses, and an aperture member, wherein each of the lenses is arranged in an internal space of the optical structural member along an axial direction of the optical structural member, wherein the aperture member is preassembled on top of the optical structural member, wherein before packaging the adjustable optical lens and the photosensitive device, an assembling position of the aperture member is adapted to be adjusted correspondingly to a spatial position of the optical structural member, wherein after adjustment, imaging of the camera module is turned to meet the resolution requirement.

According to an embodiment of the present invention, at least one of the lenses is preassembled in the internal space of the optical structural member, wherein before packaging the adjustable optical lens and the photosensitive device, the spatial position of the preassembled lens inside the optical structural member is adapted to be adjusted.

According to an embodiment of the present invention, an assembling position of the lens is adapted to be adjusted in at least one direction, wherein after adjustment, a central axis line of the adjustable optical lens and a central axis line of the optical sensor coincide or are within an allowable range of deviance.

According to an embodiment of the present invention, a side wall of the optical structural member has at least one adjustment channel provided for communicating the internal space of the optical structural member with an external environment, wherein the preassembled lens in the internal space of the optical structural member to correspond to the adjustment channel, which is adaptable to adjust the position of the lens in the internal space of the optical structural member through the adjustment channel.

According to an embodiment of the present invention, the side walls of the optical structural member corresponding to each of the preassembled lenses have three adjustment channels separated from one another at 120 degrees, adaptable to adjust horizontal and vertical positions of the preassembled lenses through each of the adjustment channels.

According to an embodiment of the present invention, an adhesive injection channel is provided at a position of the aperture member, wherein the adhesive injection channel is positioned corresponding to the lens adapted to be adjusted, so that the lens after adjustment can be affixed by injecting adhesive for solidification via the adhesive injection channel.

According to an embodiment of the present invention, a assembling position of the aperture member is adaptable to be adjusted in at least one direction, wherein after adjustment, a central axis line of the adjustable optical lens and a central axis line of the optical sensor coincide or are within an allowable range of deviation.

According to an embodiment of the present invention, the aperture member is preassembled on top of the optical structural member through semi-solidifying adhesive.

According to an embodiment of the present invention, the preassembled lens is preassembled in the internal space of the optical structural member through semi-solidifying adhesive.

According to an embodiment of the present invention, the adhesive used in preassembling is a mixed adhesive of an UV adhesive and a thermosetting adhesive, which becomes semi-solidified after ultraviolet exposure to achieve the preassembling, wherein after a heating treatment, the adhesive will be completely solidified and affix the aperture member in position.

According to an embodiment of the present invention, the photosensitive device further includes a filter, a lens mount, and a circuit board, wherein the filter is affixed on the lens mount, wherein the optical sensor is attached both on a top side of the circuit board and on a bottom side of the filter, wherein the optical structural member is affixed on a top side of the lens mount.

According to an embodiment of the present invention, the photosensitive device further includes a filter and a circuit board, wherein the filter is affixed on the optical structural member and located on a bottom side of the lens, wherein the optical sensor is attached both on a top side of the circuit board and on a bottom side of the filter, wherein the optical structural member is affixed correspondingly to a spatial distance from the optical sensor.

According to another aspect of the present invention, the present invention provides a manufacturing method of camera module, including the following steps:

(A) arranging an adjustable optical lens along a photosensitive path of an optical sensor comprised by an optical device;

(B) preassembling an adjustable optical element in the adjustable optical lens to complete a preassembly of the camera module;

(C) adjusting an assembling position of the adjustable optical element to make the imaging of the camera module after adjusted meet a resolution requirement; and (D) packaging the adjustable optical lens and the optical device so as to form the camera module.

According to an embodiment of the present invention, the adjustable optical element is at least a lens, wherein in the step (B), at least one lens is preassembled in the adjustable optical lens as a preassembled lens, wherein by adjusting the assembling position of the preassembled lens, a central axis line of the adjustable optical lens and a central axis line of the optical sensor are adjusted to coincide or be within an allowable range of deviation therebetween.

According to an embodiment of the present invention, the adjustable optical element is an aperture member, wherein in the step (B), the aperture member is preassembled on top of the adjustable optical lens, wherein by adjusting an assembling position of the aperture member, the central axis line of the adjustable optical lens and the central axis line of the optical sensor are made to be coincided or be within an allowable range of deviation.

According to an embodiment of the present invention, wherein the adjustable optical element includes an aperture member and at least a lens, wherein in the step (B), the aperture member and the lens are preassembled in the adjustable optical lens, wherein by adjusting the assembling positions of the aperture member and the preassembled lens, the central axis line of the adjustable optical lens and the central axis line of the optical sensor are made to be coincided or be within an allowable range of deviation.

According to an embodiment of the present invention, in the above manufacturing method, a side wall of an optical structural member included by the adjustable optical lens has at least one adjustment channel provided to communicate an internal space of the optical structural member to an external environment, wherein the preassembled lens in the internal space of the optical structural member corresponding to the adjustment channel is adaptable to adjust its spatial position inside the optical structural member through the adjustment channel.

According to one embodiment of the present invention, in the step (D), through an adhesive dispensing process in the adjustment channel, the adjustment channel is sealed, and by conducting a heating process, the adhesive for preassembling the lens and for the above adhesive dispensing process is solidified, so that the adjusted lens is affixed, so as to further fix the whole camera module.

According to an embodiment of the present invention, in the step (D), by an adhesive dispensing process in the adjustment channel, the adjustment channel is sealed, and by conducting a heating process, the adhesive for preassembling the lens and aperture member and for the above adhesive dispensing process is solidified, the adjusted lens and the aperture member are fixed, so as to further fix the whole camera module.

According to an embodiment of the present invention, in the step (D), the aperture member has at least an adhesive injection channel provided corresponding to the preassembled lens, wherein by injecting adhesive into the adhesive injection channel and conducting heating process to solidify the adhesive for preassembling and the adhesive for adhesive dispensing, the adjusted lens is affixed, so as to further fix the whole camera module.

According to an embodiment of the present invention, in the step (D), the aperture member has at least an adhesive injection channel provided corresponding to the preassembled lens, wherein by injecting adhesive into the adhesive injection channel and conducting heating process to solidify the adhesive for preassembling and the adhesive for adhesive dispensing, the adjusted lens and the aperture member are fixed, so as to further fix the whole camera module.

According to an embodiment of the present invention, in the above manufacturing methods, assembling position of the adjustable optical element is adjusted through adjusting at least any one direction of the horizontal direction, vertical direction, tilt direction, and peripheral direction of the adjustable optical element.

According to an embodiment of the present invention, in the above manufacturing methods, the adjustable optical element is preassembled with adhesive, wherein the adhesive used for preassembling is a mixed adhesive of an UV adhesive and a thermosetting adhesive, which becomes semi-solidified after ultraviolet exposure to achieve the preassembling of the adjustable optical element in the step (B), wherein in the step (D) after the heating process, the adhesive will be completely solidified to fix the whole camera module.

According to an embodiment of the present invention, the step (C) includes the following steps:

(C1) capturing imaging of the preassembled camera module;

(C2) calculating calibration measurement for the adjustable optical element with software based on the imaging of the camera module; and (C3) adjusting assembling position of the adjustable optical element according to the calibration measurement.

According to an embodiment of the present invention, in the step (C), if the imaging of the camera module fails to meet the resolution requirement after the adjustable optical element is adjusted, the steps (C1) to (C3) need to be repeated until the imaging of the adjusted camera module meets the resolution requirement.

According to an embodiment of the present invention, in the step (C1), the preassembled camera module is powered on and imaging of the camera module is captured, wherein the capturing of the imaging of the camera module is based on shooting MTF testing chart with the camera module, wherein the MTF value is applied to represent the imaging quality of the camera module. A greater MTF value indicates a higher imaging quality of the camera module. Every time when the imaging of the camera module is captured, a MTF value corresponding to the imaging needs to be calculated. The MTF value is then checked to determine if it is greater than the standard. If the MTF value is greater than or equal to the standard, the capturing is completed; if the MTF value is lower than the standard, another capturing and adjusting will be required.

According to an embodiment of the present invention, in the process of capturing imaging every time, environmental parameters for the shooting of the camera module, including the parameter of light and distance between the MTF testing chart and the camera module, are strictly controlled, so as to ensure the accuracy and consistency of imaging capturing for implementing subsequent adjusting steps.

According to an embodiment of the present invention, in the step (C2), a software applied to adjust the assembling position of the adjustable optical element is adaptable to be based research of sensibility of optical design of lens. The method of applying software to calculate the calibration measurement of assembling position of the adjustable optical element includes: (1) measuring optical characteristics of the camera module, including MTF value, eccentricity of the optic axis, tilt angle of the optic axis, and field curvature, before calibration; and (2) calculating the calibration measurement required by the assembling position of the adjustable optical element based on the sensibility of the eccentricity of the optic axis, tilt angle of the optic axis, and field curvature of the assembling position of the adjustable optical element respectively.

According to an embodiment of the present invention, in the step (A), by assembling the adjustable optical lens and the photosensitive device to achieve the fixed assembling for part of the optical elements comprised by the camera module, wherein the photosensitive device further comprises a filter, a lens mount, and a circuit board, wherein the filter is fixedly set on the lens mount, wherein the optical sensor is attached both on a top side of the circuit board and on a bottom side of the filter, wherein all elements of the adjustable optical lens besides of the adjustable optical element are fixed on the top side of the lens mount. In the process of the assembling and fixing, the assembling tolerances of the above elements are controlled within an allowable range.

According to an embodiment of the present invention, in the step (A), by assembling the adjustable optical lens and the photosensitive device to achieve the fixed assembling for part of the optical elements included by the camera module, wherein the photosensitive device further comprises a filter and a circuit board, wherein the filter is fixedly set on an optical structural member comprised by the adjustable optical lens and is on the bottom side of the lens, wherein the optical sensor is attached both on the top side of the circuit board and on the bottom side of the filter, wherein the optical structural member is affixed correspondingly to the spatial distance from the optical sensor. In the process the assembling and fixing, the assembling tolerances of the above elements are controlled within an allowable range.

According to another aspect of the present invention, the present invention provides an adjustable optical lens, including:

one or more lenses; and an optical structural member has the lenses orderly, overlappingly, and spacedly installed in an internal space thereof, wherein at least one of the lenses serves as an adjustable lens, which assembling positions are suitable to be adjusted. The optical structural member also has at least an adjustment channel and an affixing channel, wherein it is suitable for adjusting and affixing the adjustable lens through the adjustment channel and the affixing channel respectively.

According to an embodiment of the present invention, the affixing channel and the adjustment channel are arranged at the same position on the optical structural member. Both the adjustment channel and the affixing channel correspond to the adjustable lens and communicate the internal space of the optical structural member to an external environment, such that the adjustable lens can communicate to the external environment of the optical structural member through the adjustment channel and the affixing channel, so as to be adjusted and affixed.

According to an embodiment of the present invention, the affixing channel and the adjustment channel are arranged at different positions on the optical structural member. Both the adjustment channel and the affixing channel correspond to the adjustable lens and communicate the internal space of the optical structural member to the external environment, such that the adjustable lens can communicate to the external environment of the optical structural member through the adjustment channel and the affixing channel, so as to be adjusted and affixed.

According to an embodiment of the present invention, the adjustable lens is the first piece of the lenses of the adjustable optical lens arranged on top of the optical structural member.

According to an embodiment of the present invention, the adjustable lens can be any one or more of the lenses arranged in the middle of the optical structural member.

According to an embodiment of the present invention, the adjustment channel and the affixing channel are both arranged on top of the optical structural member.

According to an embodiment of the present invention, the adjustment channel and the affixing channel are both arranged on side of the optical structural member.

According to an embodiment of the present invention, the adjustment channel is arranged on a side of the optical structural member and the affixing channel is arranged on top of the optical structural member.

According to an embodiment of the present invention, the adjustment channel is arranged on a top of the optical structural member and the affixing channel is arranged on side of the optical structural member.

According to an embodiment of the present invention, the assembling position of the adjustable lens can be adjusted through inserting an external adjustment device into the adjustment channel to contact the adjustable lens, wherein the assembling position of the adjustable lens is adaptable to be adjusted in at least one direction, such that the optical path of the adjustable optical lens can be calibrated.

According to an embodiment of the present invention, the external adjustment device has an automation function, which is adaptable to record the adjusting method and calibration measurement of the adjustable lens or it is adaptable to input the adjusting method and calibration measurement of the adjustable lens into the external adjustment device.

According to an embodiment of the present invention, the adjusted adjustable lens can be affixed through injecting adhesive onto the edge of the adjustable lens with a glue dispensing device and then solidifying the adhesive.

According to an embodiment of the present invention, the adhesive is adaptable to be injected to a top surface of the adjustable lens, so as to affixed the adjustable lens through affixing the top surface of the adjustable lens with an inner wall of the optical structural member.

According to an embodiment of the present invention, the adhesive is adaptable to be injected to a side of the adjustable lens, so as to affixed the adjustable lens through affixing the side of the adjustable lens with the inner wall of the optical structural member.

According to an embodiment of the present invention, the adjustable lens has at least an adjustment groove arranged on an edge of the adjustable lens, wherein it is adaptable to insert an external adjustment device through the adjustment channel into the adjustment groove to adjust the assembling position of the adjustable lens.

According to another aspect of the present invention, the present invention also provides a camera module, including:
an optical sensor; and
an adjustable optical lens, wherein the adjustable optical lens is arranged in a photosensitive path of the optical sensor, wherein the adjustable optical lens comprises one or more lenses and at least an optical structural member, wherein the lenses are orderly, overlappingly and spacedly installed in an internal space of the optical structural member, wherein at least one of the lenses serves as an adjustable lens, which assembling positions are suitable to be adjusted, wherein the optical structural member also has at least an adjustment channel and an affixing channel provided, adapted for adjusting and affixing the adjustable lens through the adjustment channel and the affixing channel respectively.

According to an embodiment of the present invention, the affixing channel and the adjustment channel are arranged at the same position on the optical structural member. Both the adjustment channel and the affixing channel correspond to the adjustable lens and communicate the internal space of the optical structural member to an external environment, such that the adjustable lens can communicate to the external environment of the optical structural member through the adjustment channel and the affixing channel, so as to be adjusted and affixed.

According to an embodiment of the present invention, the affixing channel and the adjustment channel are arranged at different positions on the optical structural member. Both the adjustment channel and the affixing channel correspond to the adjustable lens and communicate the internal space of the optical structural member to the external environment, such that the adjustable lens can communicate to the external environment of the optical structural member through the adjustment channel and the affixing channel, so as to be adjusted and affixed.

According to an embodiment of the present invention, the adjustable lens is the first piece of the lenses of the adjustable optical lens arranged on top of the optical structural member.

According to an embodiment of the present invention, the adjustable lens can be any one or more of the lenses arranged in the middle of the optical structural member.

According to another aspect of the present invention, the present invention also provides a calibration method of camera module, which includes the following steps:

(A) installing one or more lenses in an internal space of an optical structural member and in a photosensitive path of an optical sensor, wherein at least one of the lenses serving as an adjustable lens is preassembled that the assembling position thereof is adjustable, while the rest of the lenses are affixed, so as to complete the preassembling of the adjustable optical lens;

(B) adjusting the adjustable lens through at least one adjustment channel provided in the optical structural member, so as to make imaging of the camera module meets a resolution requirement; and (C) adjusting the adjustable lens through at least one affixing channel provided in the optical structural member, so as to complete a calibration of the camera module.

According to an embodiment of the present invention, in the step (A), it may either assemble the preassembled adjustable optical lens with a photosensitive device or assemble the lenses after the optical structural member is assembled on the photosensitive device.

According to an embodiment of the present invention, the step (B) comprises the following steps:

(B1) powering on the preassembled camera module and capturing the imaging of the camera module;

(B2) calculating the adjusting method and calibration measurement for the adjustable lens based on the imaging of the camera module; and (B3) adjusting the adjustable lens based on the calibration measurement.

According to an embodiment of the present invention, in the step (B3), an external adjustment device is inserted into the adjustment channel to contact the adjustable lens and adjust the assembling position of the adjustable lens in at least one direction, wherein after adjustment, a central axis line of the adjustable optical lens and a central axis line of an optical sensor are coincided or within an allowable range of deviance.

According to an embodiment of the present invention, in the above manufacturing method, the external adjustment device has an automation function, which is adaptable to record the adjusting method and calibration measurement of the adjustable lens or it is adaptable to input the adjusting method and calibration measurement of the adjustable lens into the external adjustment device to precisely adjust the adjustable lens.

According to an embodiment of the present invention, in the above mentioned method, the external adjustment device adjusts the adjustable lens through machine holding or vacuum suction.

According to an embodiment of the present invention, in the step (C), the adjustable lens after adjustment can be affixed through injecting adhesive onto the edge of the adjustable lens with a glue dispensing device and then solidifying the adhesive.

According to an embodiment of the present invention, in the step (C), adhesive is injected to a top surface of the adjustable lens so as to affix the adjustable lens through affixing a top surface of the adjustable lens with an inner wall of the optical structural member.

According to an embodiment of the present invention, in the step (C), adhesive is injected to a side of the adjustable lens so as to affix the adjustable lens through affixing a side of the adjustable lens with the inner wall of the optical structural member.

According to another aspect of the present invention, the present invention also provides a calibration method of camera module, which includes the following steps:

(a) assembling an optical structural member in a photosensitive device;

(b) assembling and affixing at least a lens in an internal space of a middle or a bottom of the optical structural member;

(c) preassembling an adjustable lens in the internal space on top of the optical structural member to complete the preassembly of the camera module;

(d) calibrating the preassembled camera module to make the imaging of the adjusted camera module meeting the resolution requirement; and (e) completing the calibration of the camera module by affixing the adjustable lens.

According to an embodiment of the present invention, the step (d) comprises the following steps:

(d1) powering on the preassembled camera module and capturing the imaging of the camera module;

(d2) calculating the adjusting method and calibration measurement for the adjustable lens based on the imaging of the camera module; and (d3) adjusting the adjustable lens based on the calibration measurement so as to calibrate the camera module.

According to an embodiment of the present invention, in the above manufacturing method, the adjustable lens is contacted by an external adjustment device from a light incident position on top of the optical structural member, such that the assembling position of the adjustable lens can be adjusted in at least one direction.

According to an embodiment of the present invention, in the above mentioned method, the external adjustment device adjusts the adjustable lens through machine holding or vacuum suction.

According to an embodiment of the present invention, in the step (e), adhesive is injected from the light incident position on top of the optical structural member and the adjustable lens is affixed in the internal space of the optical structural member after the adhesive is solidified. According to another aspect, the present invention also provides a camera module lens, including:

one or more internal lenses;

at least an external lens; and a lens cone component, wherein the one or more internal lenses are arranged in an interior of the lens cone component according to a predetermined order. The external lens is arranged in an exterior of the lens cone component along a vertical direction of the lens cone component. The internal lenses and the external lens are all arranged in a optical path of the camera module lens.

According to an embodiment of the present invention, the internal lenses are joined and assembled into a whole to be affixed in the lens cone component.

According to an embodiment of the present invention, the adjacent internal lenses are embedded or integrated with each other by means of spacer ring or adhesive.

According to an embodiment of the present invention, at least one of the internal lenses is preassembled in the lens cone component to serve as an adjustable lens, wherein an assembling position of the adjustable lens is adaptable to be adjusted correspondingly to a spatial position of the lens cone component in at least one direction.

According to an embodiment of the present invention, the lens cone component has at least an adjustment channel provided along a peripheral direction of an outer side thereof. The adjustment channel(s) is adapted to communicate an internal space of the lens cone component and an external environment and positioned corresponding to the adjustable lens(es) respectively, such that it is adaptable to adjust an optical path of the camera module lens by adjusting an assembling position of the adjustable lens through the adjustment channel.

According to an embodiment of the present invention, the adjustable lens is affixed on an inner wall of the lens cone component by adhesive injected through the adjustment channel by a glue dispensing device, which also seals the adjustment channel.

According to an embodiment of the present invention, when the first piece of the internal lens is served as the adjustable lens and arranged in the internal space in an upper portion of the lens cone component, a top of the lens cone component has at least an affixing channel corresponding to an edge of the adjustable lens to communicate the edge of the adjustable lens with the external environment, adapted for affixing the adjustable lens by injecting adhesive through the affixing channel.

According to an embodiment of the present invention, the external lens is affixed on a bottom of the lens cone component, wherein an edge of a top surface of the external lens and a bottom surface of the lens cone component are connected.

According to an embodiment of the present invention, the external lens is preassembled on the bottom of the lens cone component to serve as an adjustable lens. The edge of the top surface of the external lens and the bottom surface of the lens cone component are connected. The assembling position of the external lens is adapted to be adjusted in at least one direction correspondingly to an assembling position of the lens cone component.

According to an embodiment of the present invention, every outer side of each the external lens has a shading layer that completely covers the entire side of the external lens.

According to an embodiment of the present invention, the shading layer is formed on every outer side of each the external lens through painting black glue thereon.

According to another aspect of the present invention, the present invention provides a camera module, including:

a photosensitive device, which includes an optical sensor and a lens mount; and a camera module lens arranged in a photosensitive path of the optical sensor, wherein the camera module lens comprises one or more internal lenses, at least an external lens, and a lens cone component, wherein the internal lenses are arranged in an internal space of the lens cone component in a predetermined order, wherein the external lens is arranged between the lens cone component and the lens mount, wherein the internal lenses and the external lens are both arranged in a photosensitive path of the optical sensor.

According to an embodiment pedestal the present invention, the external lens is affixed between the lens cone component and the lens mount, wherein an edge of a top surface and an edge of a bottom surface of the external lens are respectively and affixedly connected with a bottom surface of the lens cone component and a top surface of the lens mount.

According to an embodiment of the present invention, the external lens serving as the adjustable lens is preassembled between the lens cone component and the lens mount. An edge of a top surface and an edge of a bottom surface of the external lens are respectively connected with a bottom surface of the lens cone component and a top surface of the lens mount in a movable manner. The assembling positions of the external lens and the lens cone component correspondingly to an assembling position of the optical sensor are both adaptable to be adjusted in at least one direction. After adjustment, a central axis line of the camera module lens and a central axis line of the optical sensor are coincided or within an allowable range of deviance.

According to an embodiment of the present invention, the external lens is preassembled between the lens cone component and the lens mount. The edge of the top surface of the external lens is affixedly connected with the bottom surface of the lens cone component, while the edge of the bottom surface of the external lens and the bottom surface of the lens cone component are preassembled in a movable manner, such that the assembling position of the camera module lens correspondingly to the assembling position of the optical sensor is adaptable to be adjusted in at least one direction. After adjustment, the central axis line of the camera module lens and the central axis line of the optical sensor are coincided or within an allowable range of deviance.

According to an embodiment of the present invention, the external lens is preassembled on the lens mount by adhesive, wherein the adhesive used in the preassembling is a mixed adhesive of an UV adhesive and a thermosetting adhesive, which becomes semi-solidified after ultraviolet exposure to achieve the preassembling, wherein the adhesive will be completely solidified after adjustment, so as to affix the external lens.

According to another aspect of the present invention, the present invention provides a assembling method of a lens of a camera module, which includes the following steps:

(A) arranging at least an internal lens in an internal space of a lens cone component in a predetermined order;

(B) arranging at least an external lens in the an extension space of a bottom of the lens cone component in a vertical direction of the lens cone component; and (C) completing an assembling of the camera module lens.

According to an embodiment of the present invention, the method further comprises a step of:

(D) arranging a shading layer on an outer side of the external lens, wherein the arranging of the shading layer is adpated to be conducted either before or after the assembling of the external lens.

According to another aspect of the present invention, the present invention provides a assembling method of camera module, which includes the following steps:

(a) arranging one or more internal lenses in an internal space of a lens cone component in a predetermined order;

(b) arranging at least an external lens in an external space of the lens cone component in a vertical direction of the lens cone component;

(c) arranging a shading layer on an outer side of the external lens to complete the assembling of the camera module lens;

(d) arranging an camera module lens in a photosensitive path of an optical sensor;

(e) completing the preassembling of the camera module; and (f) packaging the camera module lens and the optical sensor so as to complete the assembling of the camera module.

According to an embodiment of the present invention, in the step (a), the one or more internal lenses are joined and assembled in a predetermined order as a whole unit which is then affixed in the internal space of the lens cone component.

According to an embodiment of the present invention, in the step (a), the one or more internal lenses are affixed in the internal space of the lens cone component in a predetermined order one after another.

According to an embodiment of the present invention, in the step (a), at least one of internal lenses serving as an adjustable lens is preassembled in the internal space of the lens cone component, wherein an assembling position of the adjustable lens is adapted to be adjusted in at least one direction correspondingly to the internal space of the lens cone component.

According to an embodiment of the present invention, the lens cone component has at least an adjustment channel provided therein, communicating the internal space of the lens cone component and the external environment and corresponding to the adjustable lens, wherein an external adjustment device is able to be utilized to contact an outer side of the adjustable lens through the adjustment channel.

According to an embodiment of the present invention, the adjustable lens is affixed on an inner wall of the lens cone component by adhesive injected through the adjustment channel by a glue dispensing device, which also seals the adjustment channel.

According to an embodiment of the present invention, when a first piece of the internal lens is served as the adjustable lens and arranged in the internal space in an upper portion of the lens cone component, the upper portion of the lens cone component has at least an affixing channel positioned corresponding to an edge of the adjustable lens to communicate an edge of the adjustable lens with an external environment, so that the adjustable lens is able to be affixed by injecting adhesive through the affixing channel.

According to an embodiment of the present invention, in the step (b) and the step (d), the external lens is affixed between the lens cone component and a lens mount. The external lens and the lens cone component are affixedly connected by applying adhesive on an edge of a top surface of the external lens and a bottom surface of the lens cone component. The external lens and the lens mount are affixedly connected by applying adhesive on an edge of a bottom surface of the external lens and a top surface of the lens mount.

According to an embodiment of the present invention, in the step (b) and the step (d), the external lens is preassembled between the lens cone component and a lens mount to serve as an adjustable lens. The external lens and the lens cone component are preassembled by applying adhesive between an edge of a top surface of the external lens and a bottom surface of the lens cone component. The external lens and the lens mount are preassembled by applying adhesive on an edge of a bottom surface of the external lens and a top surface of the lens mount. The assembling positions of the external lens and the lens cone component correspondingly to optical sensor are both adaptable to be adjusted in at least one direction.

According to an embodiment of the present invention, in the step (b) and the step (d), the external lens is preassembled between the lens cone component and a lens mount to serve as an adjustable lens. The external lens and the lens cone component are affixedly connected by applying adhesive between an edge of a top surface of the external lens and a bottom surface of the lens cone component. The external lens and the lens mount are preassembled by applying adhesive on an edge of the bottom surface of the external lens and a top surface of the lens mount. The assembling positions of the external lens and the lens cone component correspondingly to optical sensor are both adaptable to be adjusted in at least one direction.

According to an embodiment of the present invention, in the step (b) and the step (d), the external lens is preassembled between the lens cone component and a lens mount to serve as an adjustable lens. The external lens and the lens cone component are preassembled by applying adhesive between an edge of a top surface of the external lens and a bottom surface of the lens cone component. The external lens and the lens mount are affixedly connected by applying adhesive on an edge of a bottom surface of the external lens and a top surface of the lens mount. The assembling position of the lens cone component correspondingly to optical sensor is adaptable to be adjusted in at least one direction.

According to an embodiment of the present invention, the step (e) comprises the following steps:

(e1) powering on the preassembled camera module and capturing an imaging of the camera module;

(e2) calculating an adjusting method and a calibration measurement for the adjustable lens based on the imaging of the camera module; and (e3) adjusting the adjustable lens based on the calibration measurement, so as to make the imaging of the camera module meeting a resolution requirement.

According to an embodiment of the present invention, in the step (f), the adjustable lens is affixed through a glue dispensing device, so as to complete the assembling of the camera module.

According to an embodiment of the present invention, in the step (c), the arranging of the shading layer is adapted to be conducted either before or after the assembling of the external lens.

According to an embodiment of the present invention, in the step (c), the shading layer is formed on every outer side of each the external lens through a painting black glue thereon, wherein the shading layer completely covers the entire side of the external lens.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments in the following are examples only and person skilled in the art can come out with other obvious alternatives. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "lower," "front," "back," "left," "right," "perpendicular," "horizontal," "top," "bottom," "inner," "outer," and more that indicate relations of direction or position are based on the relations of direction or position shown in the appended drawings, which is only for ease of describing the present invention and simplifying the description, rather than to indicate or imply that the referred device or element has to apply specific direction or to be operated or structured in specific direction. Therefore the above-mentioned terminologies shall not be interpreted as confine to the present invention.

Figure 1:
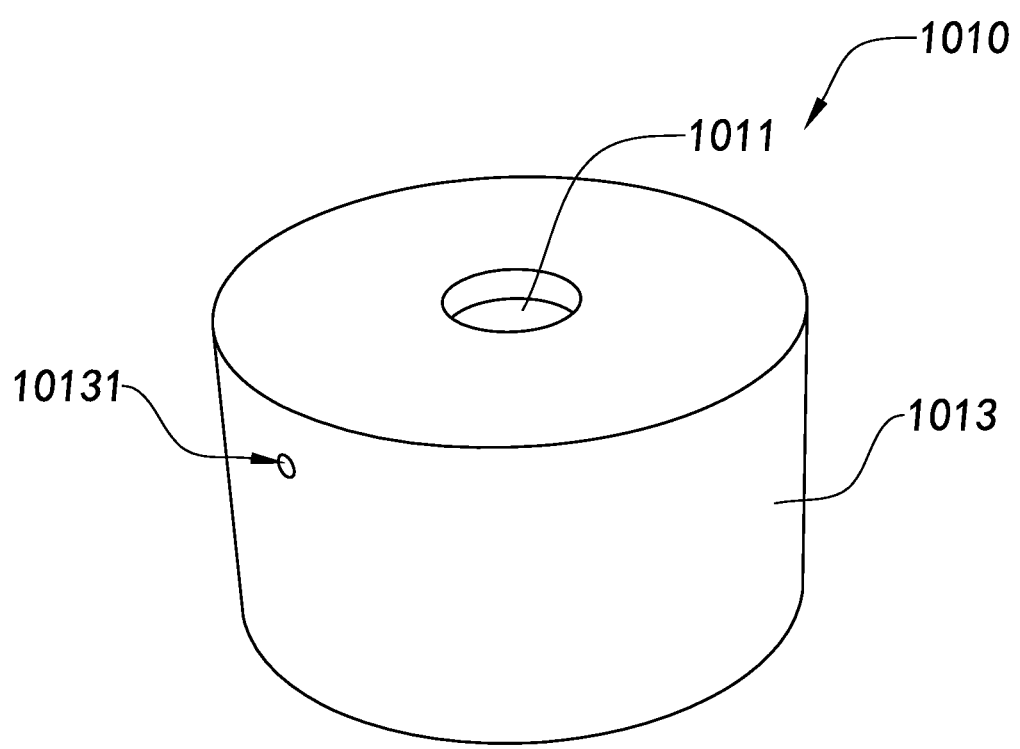
FIG. 1 is a perspective view of an adjustable optical lens according to a first preferred embodiment of the present invention.
Figure 2:
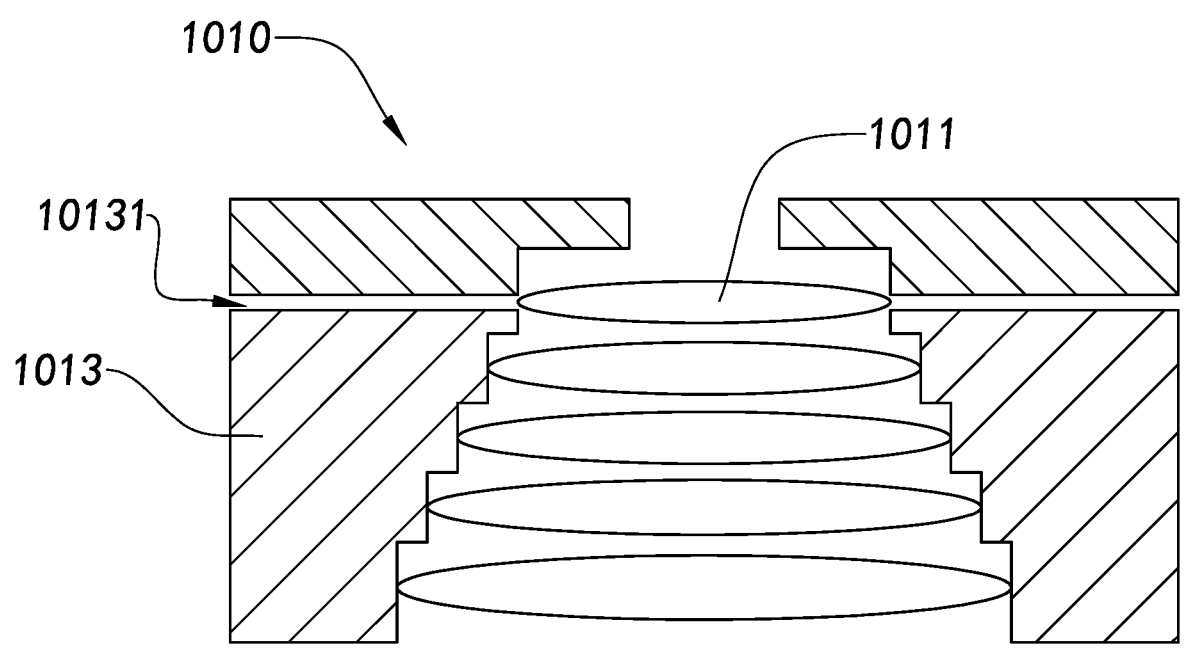
FIG. 2 is a sectional view of the adjustable optical lens according to the above first preferred embodiment of the present invention.

Referring to FIG. 1 and FIG. 2 of the drawings, an adjustable optical lens 1010 according to a preferred embodiment of the present invention is illustrated. A central axis line of the adjustable optical lens 1010 is able to be adjusted after the adjustable optical lens 1010 has been produced, so that when the adjustable optical lens 1010 is subsequently applied to an imaging system, the central axis line of the adjustable optical lens 1010 can be adjusted based on specific parameters of the imaging system. Specifically, the adjustable optical lens 1010 comprises an optical structural member 1013 and two or more lens 1011. Each lens 1011 is arranged in an internal space of the optical structural member 1013 along an axial direction of the optical structural member 1013, wherein a position of the at least one of the lenses 1011 in the internal space of the optical structural member 1013 is arranged in an adjustable configuration. Accordingly, the central axis line of the adjustable optical lens 1010 is adapted to be adjustable based on the application needs of the imaging system after the adjustable optical lens 1010 is produced.

Further, the optical structural member 1013 of the adjustable optical lens 1010 has at least one adjustment channel 10131 provided to respectively communicate the internal space of the optical structural member 1013 with an external environment, wherein when the lenses 1011 are all overlappingly and spacedly arranged in the internal space of the optical structural member 1013 along a vertical direction of the optical structural member 1013, an outer wall of each of the lenses 1011 is arranged at a position corresponding to the adjustment channels 10131. Therefore, the positions of the lenses 1011 in the internal space of the optical structural member 1013 can be adjusted later from the external environment of the optical structural member 1013 through the adjustment channels 10131, that is able to achieve an adjustment of the central axis line of the adjustable optical lens 1010. Especially, according to the present embodiment of the present invention, the adjustment channel 10131 is provided in a side wall of the optical structural member 1013 at the position corresponding to the lens 1011 to be adjusted. More specifically, when the lens 1011 to be adjusted is arranged in the optical structural member, an edge of the lens 1011 faces the adjustment channel 10131 so as for an adjustment element to reach the edge of the lens 1011 through the adjustment channel, which is extended from the external environment to the internal space, and to engage with the edge of the lens 1011 to adjust the position of the lens 1011. Certainly, according to other embodiments of the present invention, the adjustment channel 10131 may also be provided at other position(s) of the optical structural member 1013, such as a top wall of the optical structural member 1013, and thus the present invention shall not be limited to this embodiment.

It is understandable that position and quantity of the adjustment channel 10131 can be varied according to the need. For example, but not limited to that, various adjustment channels can be provided corresponding to the mounting position of the lens 1011 to be adjusted, which means a predetermined number, such as one, two, three or more, of the adjustment channels 10131 can be provided with respect to the position of the same lens 1011 to be adjusted. The adjustment channels corresponding to the same lens 1011 can be arranged in positions based on the need. For instance, if there are two adjustment channels 10131, the two adjustment channels can be configured with the same diameter, while if there are three adjustment channels, the three adjustment channels can be arranged in an axial symmetry manner to be spaced with one another in 120°, so as for symmetrically adjusting the lens 1011, rendering the adjustment more accurate and easy. Nevertheless, person skilled in the art should understand that the present invention shall not be limited to such arrangement.

Those skilled in the art should know that the above disclosed structure of the adjustable optical lens 1010 is illustrated as an example that the theories of the adjustable optical lens 1010 can be described by adjusting the position of the outermost lens 1011 in the internal space of the optical structural member 1013. Specifically, according to the present embodiment, the adjustable optical lens 1010 comprises one the optical structural member 1013 and a plurality of the lenses 1011 overlappingly arranged in the internal space of the optical structural member 1013. The optical structural member 1013 has at least one the adjustment channel 10131, wherein the outermost lens 1011 is located at the position corresponding to the adjustment channel 10131 in the optical structural member 1013. Besides, the lens 1011 does not contact the inner wall of the optical structural member 1013, such that position of the lens 1011 in the optical structural member 1013 is adjustable. In other words, a gap is formed between an outer wall of the lens 1011 and the inner wall of the optical structural member 1013, wherein a size of the gap can be greater than or equal to 3 micrometers. An end of an adjustment element is applied to insert from outside of the optical structural member 1013 into the adjustment channel 10131 and is extended to the internal space of the optical structural member 1013, so as to push against the outer wall of the lens 1011 for adjusting the position of the lens 1011 in the internal space of the optical structural member 1013 so as to adjust a central axis line of the adjustable optical lens 1010. After the adjustment of the central axis line of the adjustable optical lens 1010, the positions of the lens 1011 and optical structural member 1010 are fixed again. For example, the positions of lens 1011 and adjustable optical lens 1010 can be fixed by a gluing process or a welding process, so as to ensure a reliability of the adjustable optical lens 1010 while in use. Those skilled in the art may appreciate that a distance for the lens 1011 to be adjusted in the internal space of the optical structural member 1013 is equal to or smaller than the gap between the outer wall of the lens 1011 and the inner wall of the optical structural member 1013.

Although FIGS. 1 and 2 of the drawings show that the lens 1011 in the internal space of the optical structural member 1013 is able to be adjusted by arranging the adjustment channels 10131 in the optical structural member 1013 of the adjustable optical lens 1010, those skilled in the art should understand that other similar and possible methods that can be used to adjust the relative position of the lens 1011 in the internal space of the optical structural member 1013 can be applied and shall be considered modified implementation according to the adjustable optical lens 1010 of the present invention.

Figure 3:
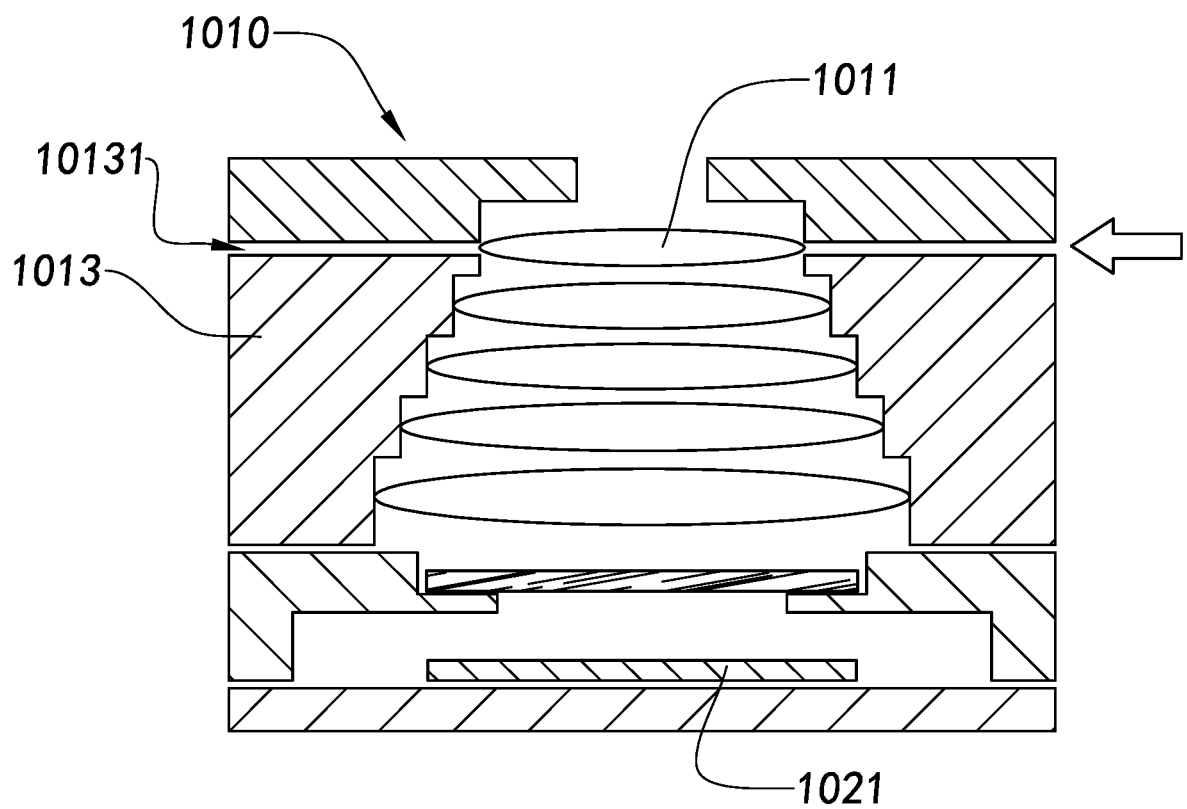
FIG. 3 is a sectional view of a manufacturing process of the camera module according to the above first preferred embodiment of the present invention.

Referring to FIG. 3, the present invention also provides a camera module which comprises the adjustable optical lens 1010, wherein the camera module also comprises an optical sensor 1021. The adjustable optical lens 1010 is arranged to the optical sensor 1021 that lights reflected from an object can enter an inside of the camera module through the adjustable optical lens 1010 thereof and be received by the optical sensor 1021 to proceed a photoelectric conversion, so that images respective to the object can be generated by the camera module.

Referring to FIG. 3 of the drawings, according to the above mentioned first preferred embodiment of the present invention, a manufacturing method of the camera module is illustrated. In this manufacturing method, firstly, the adjustable optical lens 1010 is arranged in a photosensitive path of the optical sensor 1021. Because a certain deviation may exist in the manufacturing method of the camera module, the central axis line of the adjustable optical lens 1010 cannot be accurately controlled. Therefore, after the adjustable optical lens 1010 is arranged in the photosensitive path of the optical sensor 1021, the central axis line of the adjustable optical lens 1010 and the central axis line of the optical sensor 1021 are coincided by adjusting the position(s) of the lens(es) 1011 in the internal space of the optical structural member 1013. And then, the adjustable optical lens 1010 and the optical sensor 1021 are packaged to complete the manufacturing method of the camera module. Those skilled in the art can understand that the central axis line of the adjustable optical lens 1010 and the central axis line of the optical sensor 1021 in the present invention are coincided, wherein a deviation between the central axis line of the adjustable optical lens 1010 and the central axis line of the optical sensor 1021 are controlled within an acceptable range, so that the yield rate of the camera module can be increased and the image quality of the camera module is guaranteed.

It is worth mentioning that in the step of adjusting the central axis line of the adjustable optical lens 1010, the central axis line of the adjustable optical lens 1010 can be adjusted not only by changing a horizontal position of the lens 1011 in the internal space of the optical structural member 1013, but also by changing a tilt position of the lens 1011 in the internal space of the optical structural member 1013. Furthermore, in another embodiment of the present invention, a vertical position of the lens 1011 in the internal space of the optical structural member 1013 can also be adjusted based on the application needs of the camera module. Therefore, a structure design of the camera module becomes more flexible.

Figure 4:
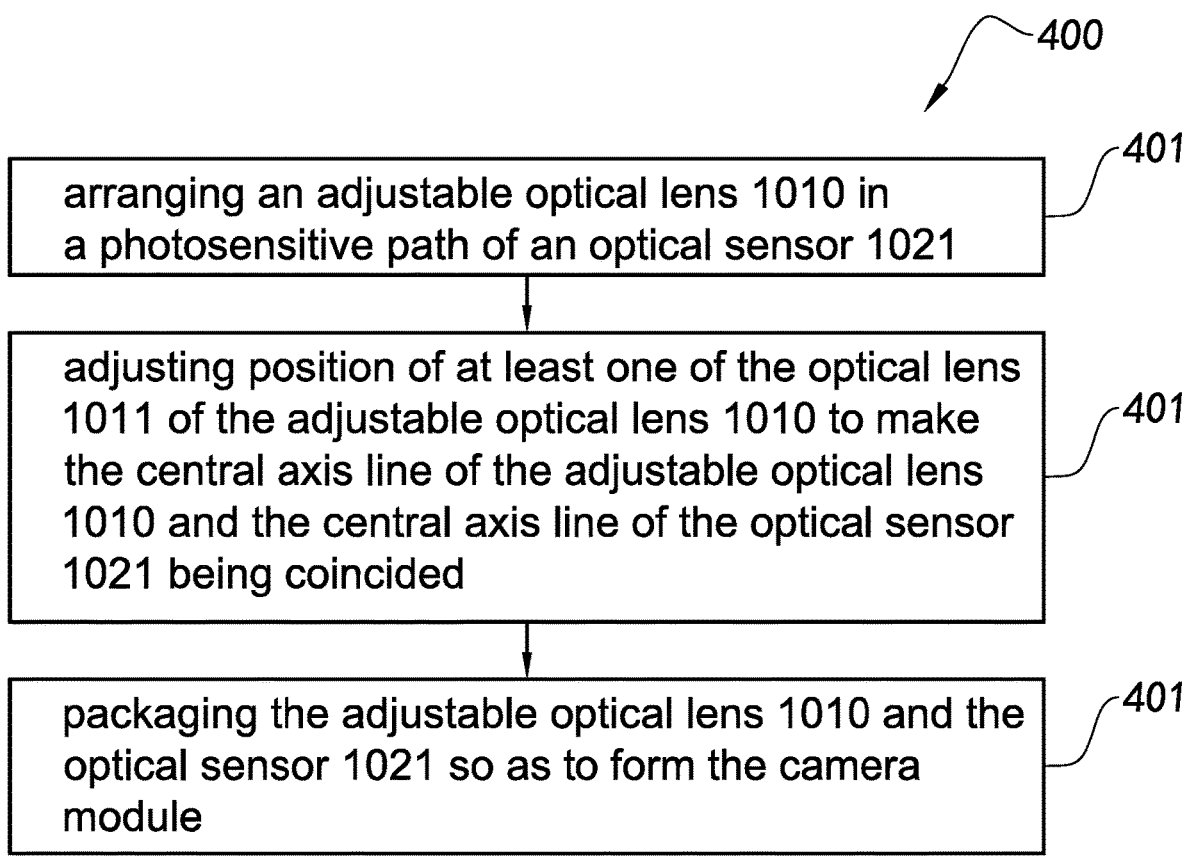
FIG. 4 is a flow diagram of a manufacturing method of the camera module according to the above first preferred embodiment of the present invention.

As shown in FIG. 4, the present invention also comprises a manufacturing method 400 of a camera module, wherein the manufacturing method 400 comprises the following steps:

step (401): arranging an adjustable optical lens 1010 in a photosensitive path of an optical sensor 1021;

step (402): adjusting position of at least one lens 1011 of the adjustable optical lens 1010 to make the central axis line of the adjustable optical lens 1010 and the central axis line of the optical sensor 1021 being coincided; and step (403): packaging the adjustable optical lens 1010 and the optical sensor 1021 to form the camera module.

Further, in the step (402), the central axis line of the adjustable optical lens 1010 and the central axis line of the optical sensor 1021 are coincided by adjusting the position of the lens 1011 positioned at the outermost of the adjustable optical lens 1010. It is worth mentioning that position of the lens 1011 of the adjustable optical lens 1010 in the internal space of the optical structural member 1013 is able to be adjusted in at least one direction, for example, a horizontal direction. Preferably, each of the directions of the horizontal direction, vertical direction, and tilt direction of the lens 1011 of the adjustable optical lens 1010 in the internal space of the optical structural member 1013 can be adjusted. Therefore, image quality of the camera module generated from the adjustable optical lens 1010 can be guaranteed. Besides, in another preferred embodiment of the present invention, at least one of the lenses 1011 in the internal space of the optical structural member 1013 can be adjusted to rotate, so as to fulfill the application needs for packaging different types of camera module.

Further, in the step (402), after the position of the lens 1011 in the internal space of the optical structural member 1013 is adjusted, this adjusted lens 1011 and the optical structural member 1013 are packaged. Therefore, the step for packaging the adjustable optical lens 1010 and the optical sensor 1021 is able to prevent deviation generated between the adjusted lenses 1011, so as to guarantee the image quality of the camera module.

Furthermore, in the above mentioned manufacturing method, a side portion of the optical structural member 1013 has at least an adjustment channel 10131 formed in position which is corresponding to at least one the lens 1011 arranged in the internal space of the optical structural member 1013, so that the position of the lens 1011 to be adjusted in the internal space of the optical structural member 1013 is able to be adjusted from an external environment of the optical structural member 1013 through the adjustment channel 10131.

Figure 5:
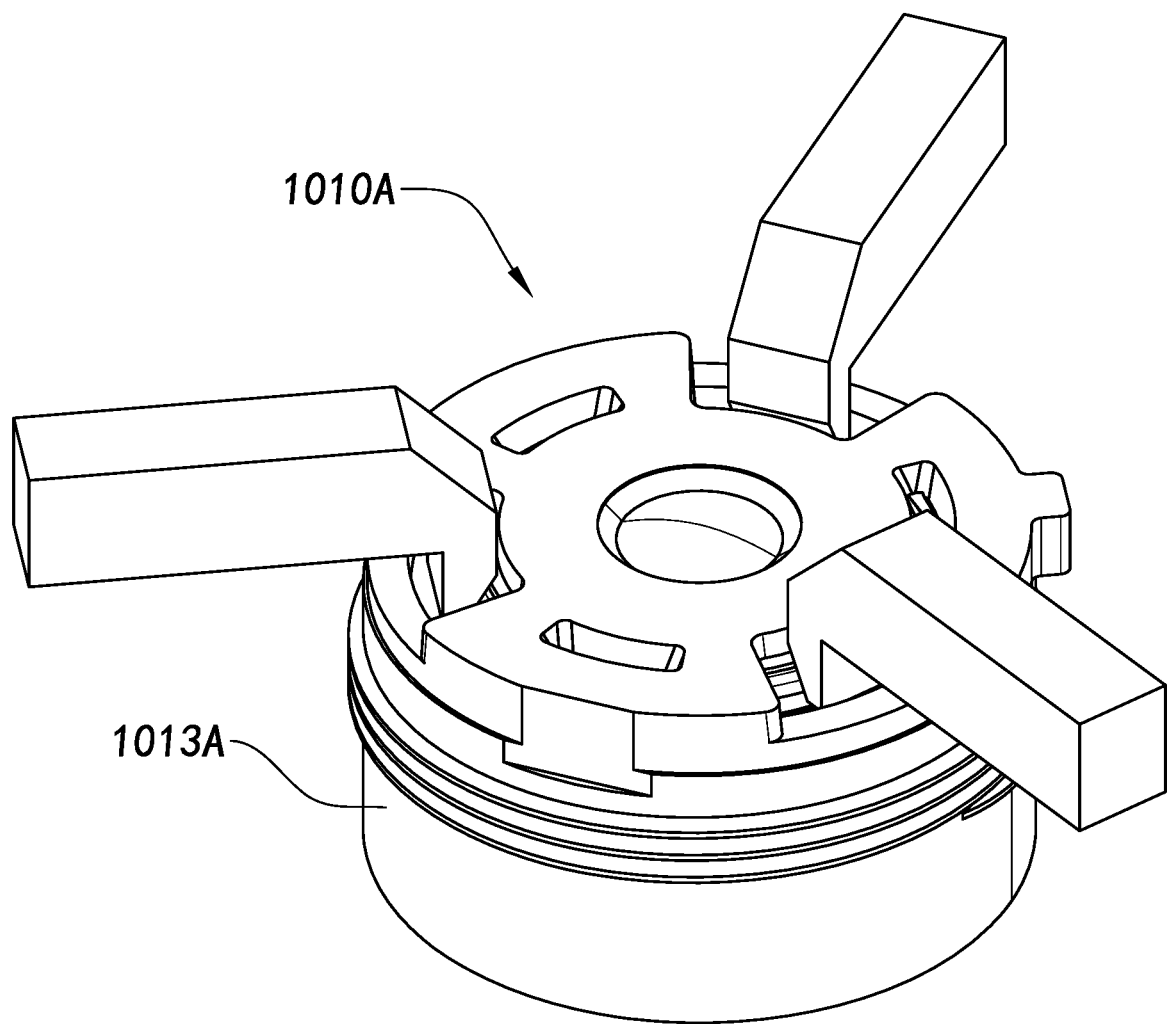
FIG. 5 is a perspective view of an optical structural member of an adjustable optical lens according to a second preferred embodiment of the present invention.

Referring to FIG. 5 of the drawings, an adjustable optical lens 1010A according to a second preferred embodiment of the present invention is illustrated, wherein the adjustable optical lens 1010A comprises an optical structural member 1013A and at least two lenses 1011A. At least one of the lenses 1011A is adjustably installed in the optical structural member 1013A. Contrasting to the conventional optical lens, the optical structural member 1013A of the adjustable optical lens 1010A of the present invention is separately arranged from at least one of the lenses 1011A. Besides, the adjustable optical lens 1010A and an optical sensor 1021A, such as a photosensitive chip, are packaged to produce a camera module. The lens 1011A is installed in the optical structural member 1013A based on the corresponding relation between a central axis line of the adjustable optical lens 1010A and a central axis line of the optical sensor 1021A. Accordingly, image quality of the camera module which comprises the adjustable optical lens 1010A can be improved.

According to the above preferred embodiment of the present invention, each lens 1011A can be installed in the optical structural member 1013A based on the corresponding relation between the central axis line of the adjustable optical lens 1010A and the central axis line of the optical sensor 1021A, and then the adjustable optical lens 1010A and the optical sensor 1021A are packaged to produce the camera module. In another preferred embodiment of the present invention, the lens 1011A at the outermost of the adjustable optical lens 1010A can be installed in the optical structural member 1013A based on the corresponding relation between the central axis line of the adjustable optical lens 1010A and the central axis line of the optical sensor 1021A, and then the adjustable optical lens 1010A and the optical sensor 1021A are packaged to produce the camera module.

After the lens 1011A is installed in the optical structural member 1013A, the lens 1011A and the optical structural member 1013A are affixed. Therefore, image quality of the manufactured camera module can be improved.

Figure 6:
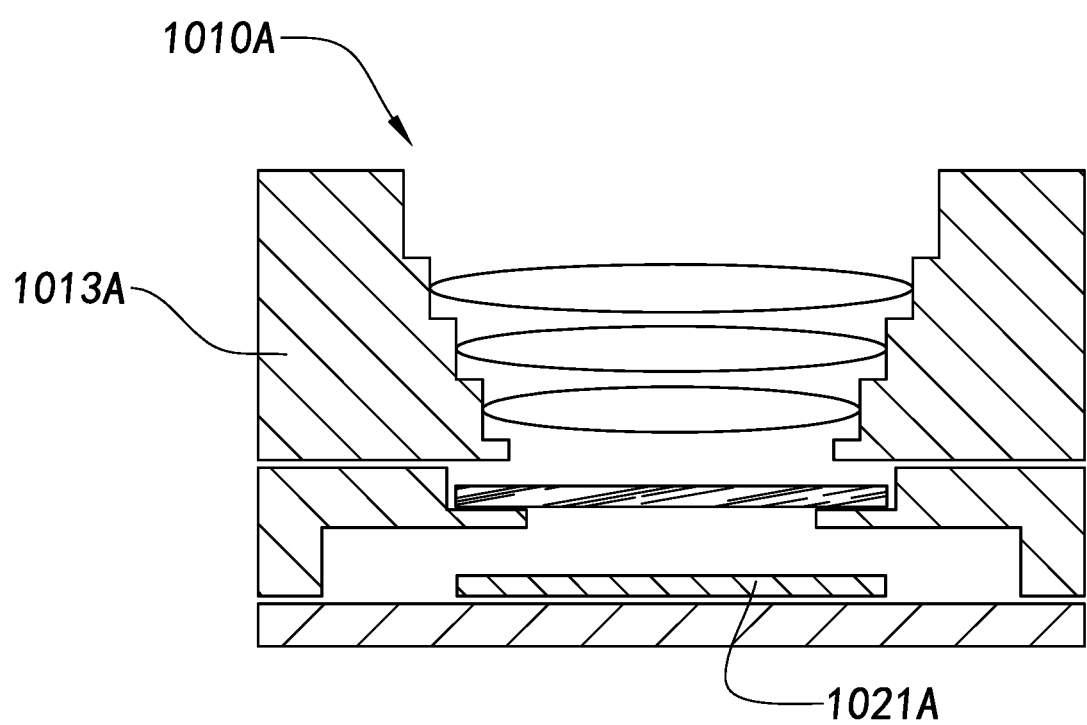
FIG. 6 is a first perspective view of a manufacturing process of the camera module according to the above second preferred embodiment of the present invention.
Figure 7:
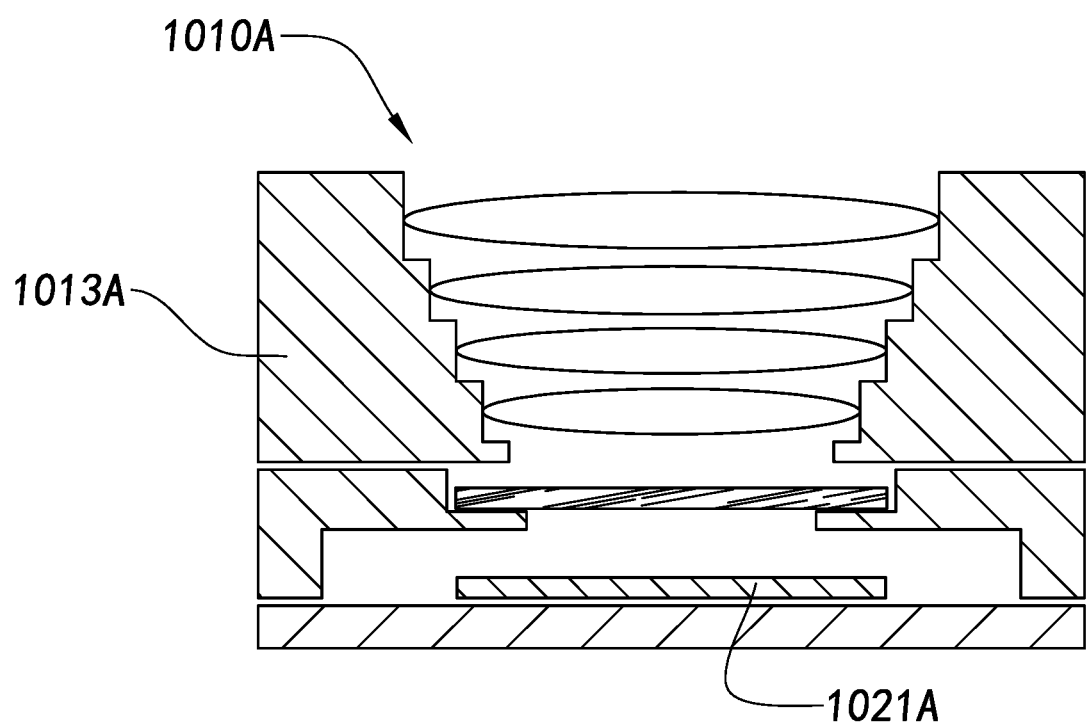
FIG. 7 is a second perspective view of a manufacturing process of the camera module according to the above second preferred embodiment of the present invention.

FIGS. 6 and 7 illustrate the manufacturing process of the camera module according to the above second preferred embodiment of the present invention, wherein the camera module can not only be a prime lens camera module, but also can be an auto-focus lens camera module. The difference between the prime lens camera module and the auto-focus lens camera module is that the adjustable optical lens 1010A of the prime lens camera module is directly packaged on a lens mount for connecting the adjustable optical lens 1010A and a photosensitive device 1020A, wherein the photosensitive device 1020A comprises at least one optical sensor 1021A. Preferably, the photosensitive device 1020A may also comprise a circuit board attached by the optical sensor 1021A. The adjustable optical lens 1010A of the auto-focus lens camera module is installed with a driver, such as a voice coil motor, and then the driver is installed on the lens holder, so that when the auto-focus lens camera module is in use, the adjustable optical lens 1010A can be driven by the driver for moving along the photosensitive path of the optical sensor 1021A, which is defined as an offset movement of the optical sensor 1021A.

No matter in the manufacturing process of the auto-focus lens camera module or of the prime lens camera module, the optical structural member 1013A can be installed along a photosensitive path of the optical sensor 1021A before the lens 1011A is installed in the optical structural member 1013A. Also, after the position of the lens 12A in the internal space of the optical structural member 1013A is adjusted, the central axis line of the adjustable optical lens 10A and the central axis line of the optical sensor 1021A are coincided. It is worth mentioning that after the lens 1011A is arranged in the optical structural member 1013A, the central axis line of the adjustable optical lens 1010A and the central axis line of the optical sensor 1021A are coincided, and then the lens 1011A and the optical structural member 1013A are affixed. In some embodiments, for example, the lens 1011A and the optical structural member 1013A are affixed by an adhesive dispensing process.

Figure 8:
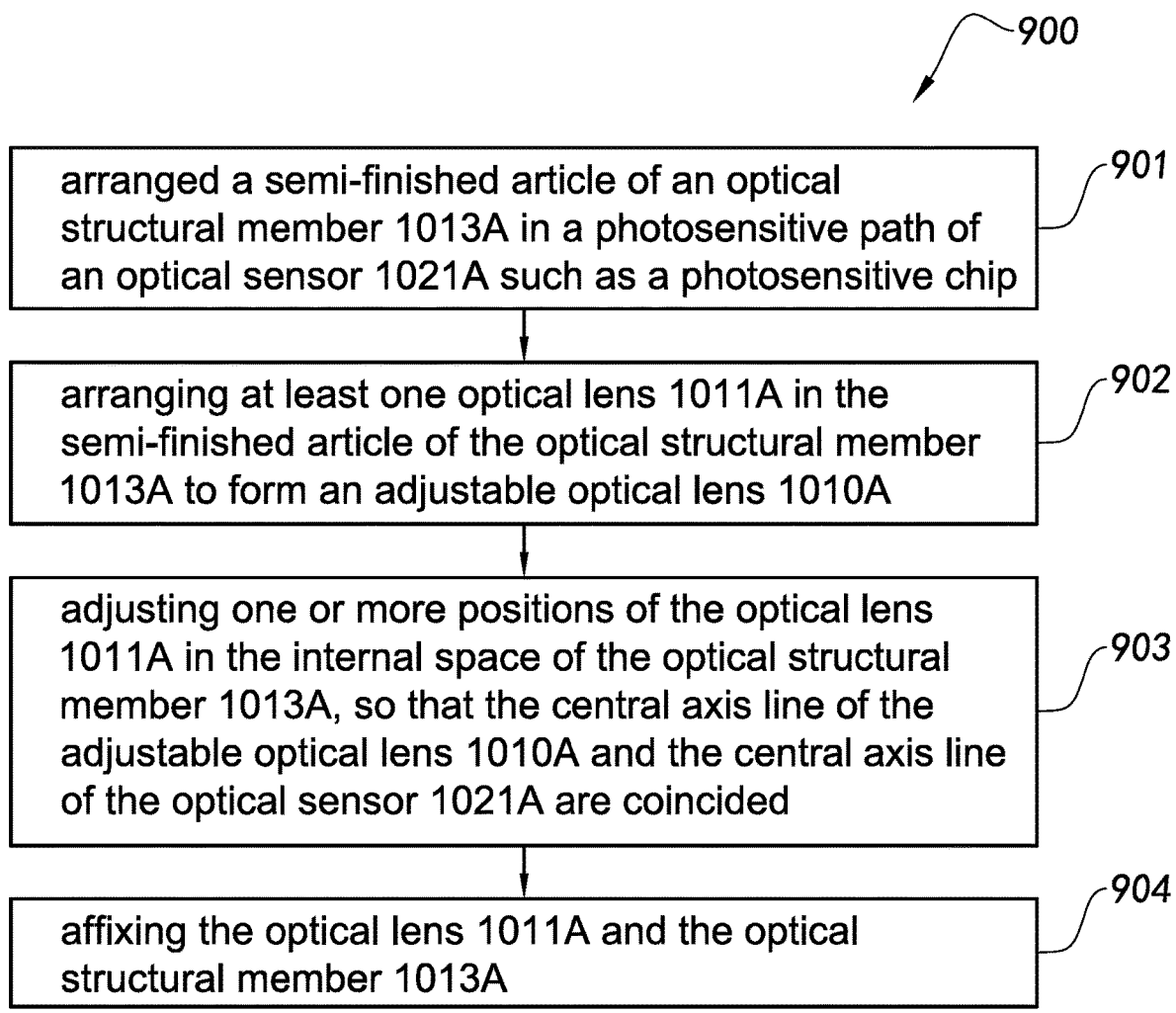
FIG. 8 is a flow diagram of a manufacturing method of the camera module according to the above second preferred embodiment of the present invention.

As shown in FIG. 8, another manufacturing method 900 of a camera module according to the above second preferred embodiment of the present invention is illustrated, wherein the manufacturing method 900 comprises the following steps:

step (901): arranging a semi-finished article of an optical structural member 1013A in a photosensitive path of an optical sensor 1021A, such as a photosensitive chip;

step (902): arranging at least one lens 1011A in the semi-finished article of the optical structural member 1013A to form an adjustable optical lens 1010A; and step (903): adjusting one or more positions of the lens 1011A in an internal space of the optical structural member 1013A, so that a central axis line of the adjustable optical lens 1010A and a central axis line of the optical sensor 1021A are coincided.

Further, after the step (903), the manufacturing method 900 of a camera module further comprises the following steps:

step (904): affixing the lens 1011A and the optical structural member 1013A. It is worth mentioning that, according to the present preferred embodiment of the present invention, the lens 1011A and the optical structural member 1013A are affixed by an adhesive dispensing process.

Further, according to the above mentioned second preferred embodiment of the present invention, in the step (901), the optical structural member 1013A is arranged in the photosensitive path of the optical sensor 1021A. Also, in the step (902), the lenses are overlappingly and spacedly arranged in the internal space of the optical structural member 1013A along an axial direction of the optical structural member 1013A. In another embodiment of the present invention, the semi-finished article of the optical structural member 1013A arranged in the photosensitive path of the optical sensor 1021A, in the step (901), comprises an optical structural member 1013A and at least a lens 1011A which are preassembled in the internal space of the optical structural member 1013A, and the rest of the lenses 1011A are also arranged in the internal space of the optical structural member 1013A to form the adjustable optical lens 1010A, in the step (902).

Figure 9:
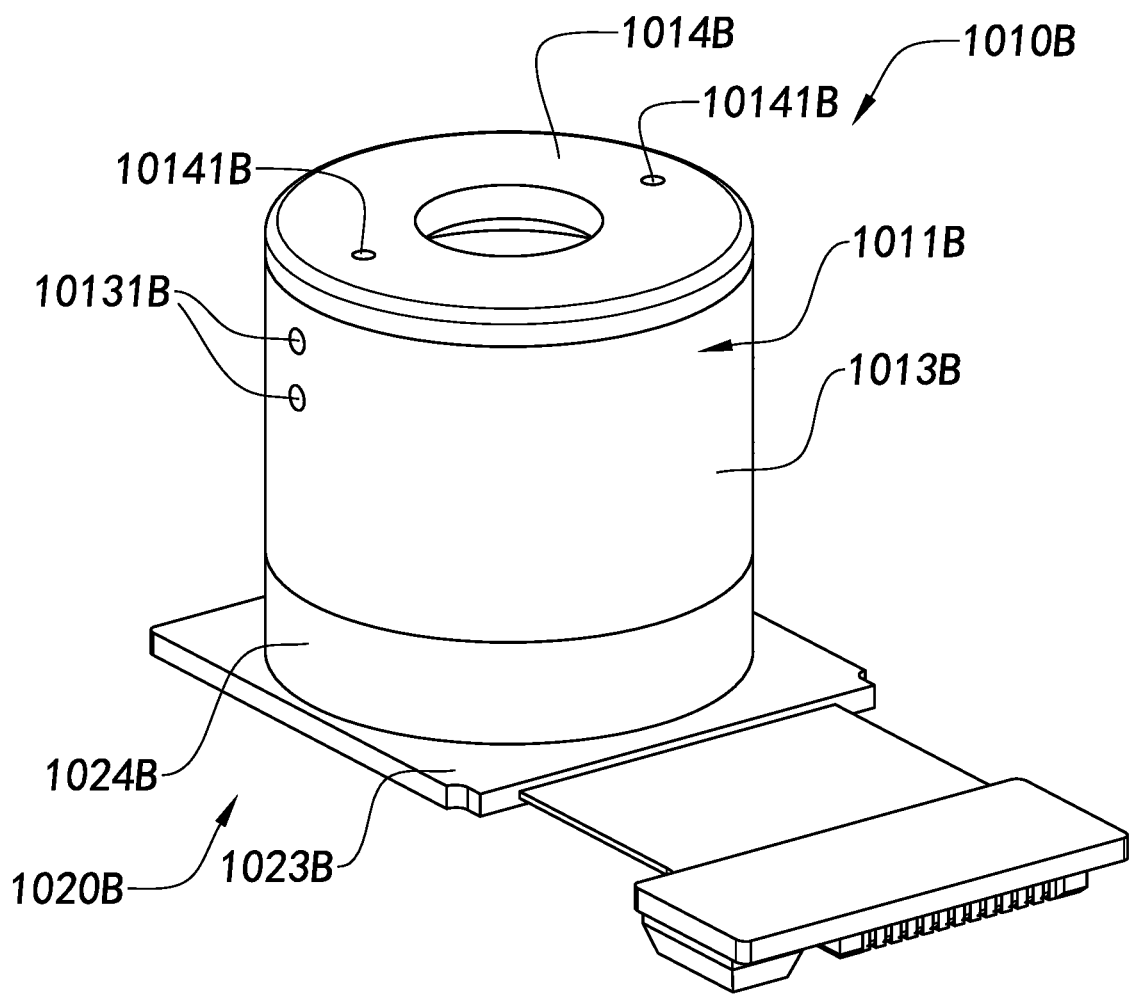
FIG. 9 is a perspective structural view of a camera module according to a third preferred embodiment of the present invention.
Figure 10:
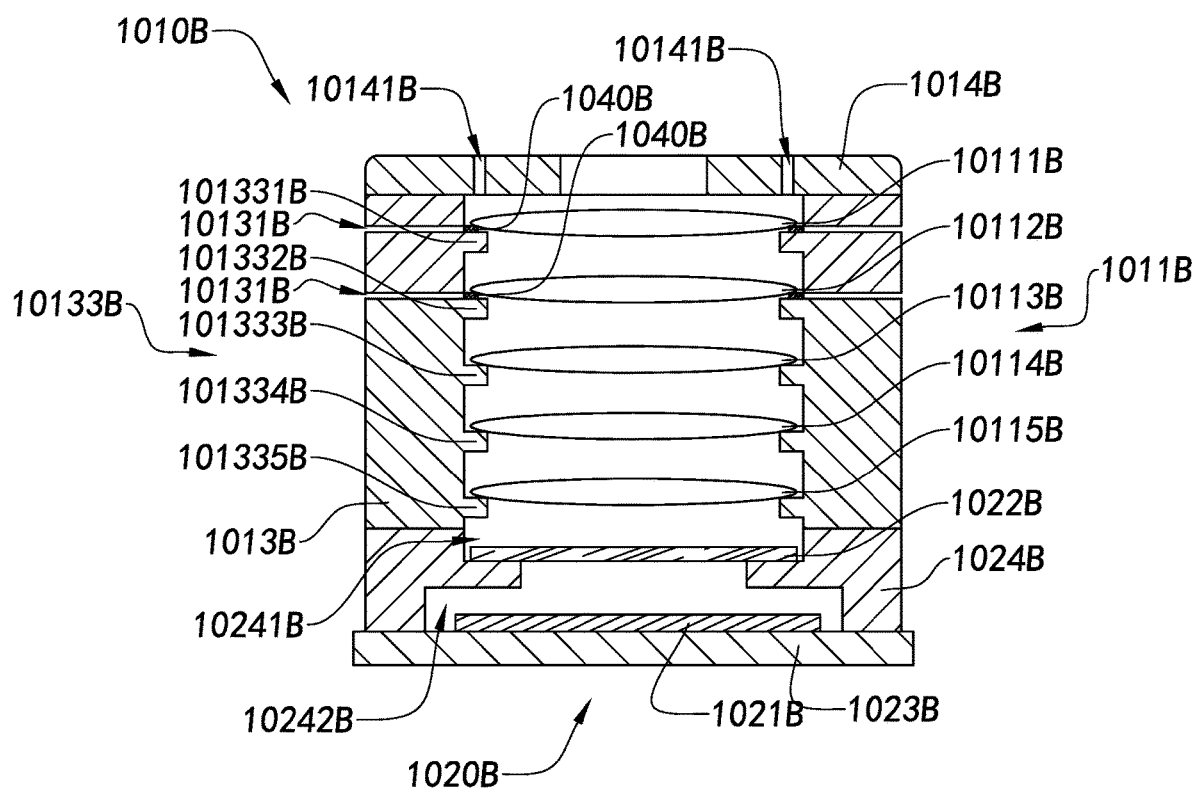
FIG. 10 is a sectional view of the camera module according to the above third preferred embodiment of the present invention.

Referring to FIG. 9 and FIG. 10, a camera module of an adjustable optical lens according to a third preferred embodiment of the present invention is illustrated.

As illustrated in FIG. 9 and FIG. 10, the camera module comprises an adjustable optical lens 10B and a photosensitive device 20B. The adjustable optical lens 1010B is installed in a photosensitive path of the photosensitive device 1020B that lights reflected from an object enter the inside of the photosensitive device 1020B from the adjustable optical lens 1010B to be photoelectric converted, so that the camera module can subsequently generate image(s) respective to the object.

The photosensitive device 1020B comprises a filter 1022B, a lens mount 1024B, an optical sensor 1021B, and a circuit board 1023B, wherein the filter 1022B is fixed at a first groove 10241B arranged on an upper part of an inner wall of the lens mount 1024B and on a top portion of a photosensitive path of the optical sensor 1021B. The optical sensor 1021B is fixed at a second groove 10242B arranged on a lower part of the inner wall of the lens mount 1024B. The optical sensor 1021B is attached on a top side of the circuit board 1023B. The circuit board 1023B is installed at a bottom part of the lens mount 1024B. That is, the filter 1022B, the lens 22B, the optical sensor 1021B, and the circuit board 1023B have been assembled and fixed among one another and cannot be adjusted in successive calibration. Lights reflected from an object may enter the inside of the camera module through the adjustable optical lens 1010B and then be received by the optical sensor 1021B to proceed photoelectric conversion, so that the camera module can subsequently generate images respective to the object.

The adjustable optical lens 1010B comprises an optical structural member 1013B and one or more lenses 1011B. The lenses 1011B are respectively installed in the optical structural member 1013B along an axial direction of the optical structural member 1013B. The optical structural member 1013B is connected to the top portion of the lens mount 1024B and the lenses 1011B are arranged along a photosensitive path of the optical sensor 1021B. At least one of the lenses 1011B is preassembled inside of the optical structural member 1013B. The lens 1011B preassembled inside of the optical structural member 1013B is the adjustable optical element in the present preferred embodiment, which means that it is adaptable to be adjusted in the spatial position inside of the optical structural member 1013B, wherein the lens formed thereof is called adjustable lens.

In the present preferred embodiment, the adjustable optical lens 1010B comprises five lenses 12, including a first lens 10111B, a second lens 10112B, a third lens 10113B, a fourth lens 10114B, and a fifth lens 10115B, which are orderly and overlappingly installed inside the optical structural member 1013B along the photosensitive path of the optical sensor 1021B, wherein the third lens 10113B, the fourth lens 10114B and the fifth lens 10115B have already been preassembled in the optical structural member 1013B and been fixed. The first lens 10111B and the second lens 10112B are preassembled into the optical structural member 1013B as adjustable optical elements that are configured to be adjusted for calibration in the subsequent process, so as to increase imaging quality of the camera module.

Optionally, some of the five lenses are all fixed optical lenses, while the other lenses are the adjustable optical elements which are called adjustable lenses. Before packaging the adjustable optical lens 1010B and the photosensitive device 1020B, assembling positions of the adjustable optical elements are adapted to be adjusted.

Specifically, an adhesive 1040B is applied to orderly preassemble the second lens 10112B and the first lens 10111B into the optical structural member 1013B. The adhesive 1040B is made not be completely solidified. That is, the adhesive 1040B will be semi-solidified to conduct the preassembling of the first lens 10111B and the second lens 10112B, which not only prevents them from over moving, but also make successive adjusting easier.

The adhesive 1040B applied a mixed adhesive of an UV adhesive and a thermosetting adhesive, which becomes semi-solidified after ultraviolet exposure to achieve the above preassembling. After a heating treatment, the adhesive 1040B will be completely solidified to fix the first lens 10111B and the second lens 10112B in position, so as to fix the whole camera module.

The adjustable optical lens 1010B further comprises an aperture member 1014B. The aperture member 1014B is connected to a top of the optical structural member 1013B for introducing incident light beam and limiting the volume of the incident light beam. In the present preferred embodiment, after the second lens 122D and the first lens 10111B were orderly preassembled into the optical structural member 1013B, the aperture member 13 is fixedly installed on top of the optical structural member 1013B, on top of the first lens 10111B, and in the photosensitive path of the optical sensor 1021B. A central axis line of the aperture member 1014B and the central axis line of the optical sensor 23B are coincided or kept within an allowable range of deviation, so as to guarantee imaging quality of the camera module.

It is worth mentioning that there are at least two adjustment channels 10131B provided in the optical structural member 1013B, communicating an internal space of the optical structural member 1013B with an external environment and corresponding to the first lens 121B and the second lens 122B respectively, so as to adjust spatial positions of the first lens 121B and the second lens 122B in the internal space of the optical structural member 1013B through the adjustment channels 10131B respectively. Preferably, six adjustment channels 10131B are provided in the present embodiment, wherein three of the adjustment channels 10131B are provided in a sidewall of the optical structural member 10131B with respect to the preassembling position of the first lens 10111B and separately arranged from one another at 120 degrees. The other three adjustment channels 10131B are provided in the sidewall of the optical structural member 10131B with respect to the preassembling position of the second lens 10112B and separately arranged from one another at 120 degrees.

If the first lens 10111B and the second lens 10112B are required to be adjusted, an elongated element such as a needle can be inserted into the corresponding adjustment channel 10131B to reach the first lens 10111B or the second lens 10112B. By controlling the needle to poke the first lens 10111B and the second lens 10112B, horizontal and vertical positions of the first lens 10111B and the second lens 10112B at the three spots of the corresponding adjustment channels 10131B can be changed, so as to respectively conduct adjustments of the first lens 10111B and the second lens 10112B in any directions, including horizontal positions, vertical positions, and tilt positions.

In the present preferred embodiment, the optical structural member 1013B can be implemented as a lens cone, wherein an inner wall of the optical structural member 1013B has five limiting structures 10133B. Preferably, the limiting structures 10133B are spacedly and protrudedly formed by extending the inner wall of the optical structural member 1013B toward the direction of the cavity thereof, so as to respectively support the lenses 1011B, that is the first limiting structure 101331B, the second limiting structure 101332B, the third limiting structure 101333B, the fourth limiting structure 101334B, and the fifth limiting structure 101335B support the first lens 10111B, the second lens 10112B, the third lens 10113B, the fourth lens 10114B, and the fifth lens 10115B respectively. Those skilled in the art can understand that the optical structural member 1013B can also utilize other means to support each of the lenses 1011B.

It is worth mentioning that the camera module can also comprise a driver and the optical structural member 1013B can be a component of the driver.

In the present preferred embodiment, the camera module can not only be a prime lens camera module, but be an auto-focus lens camera module.

Figure 11:
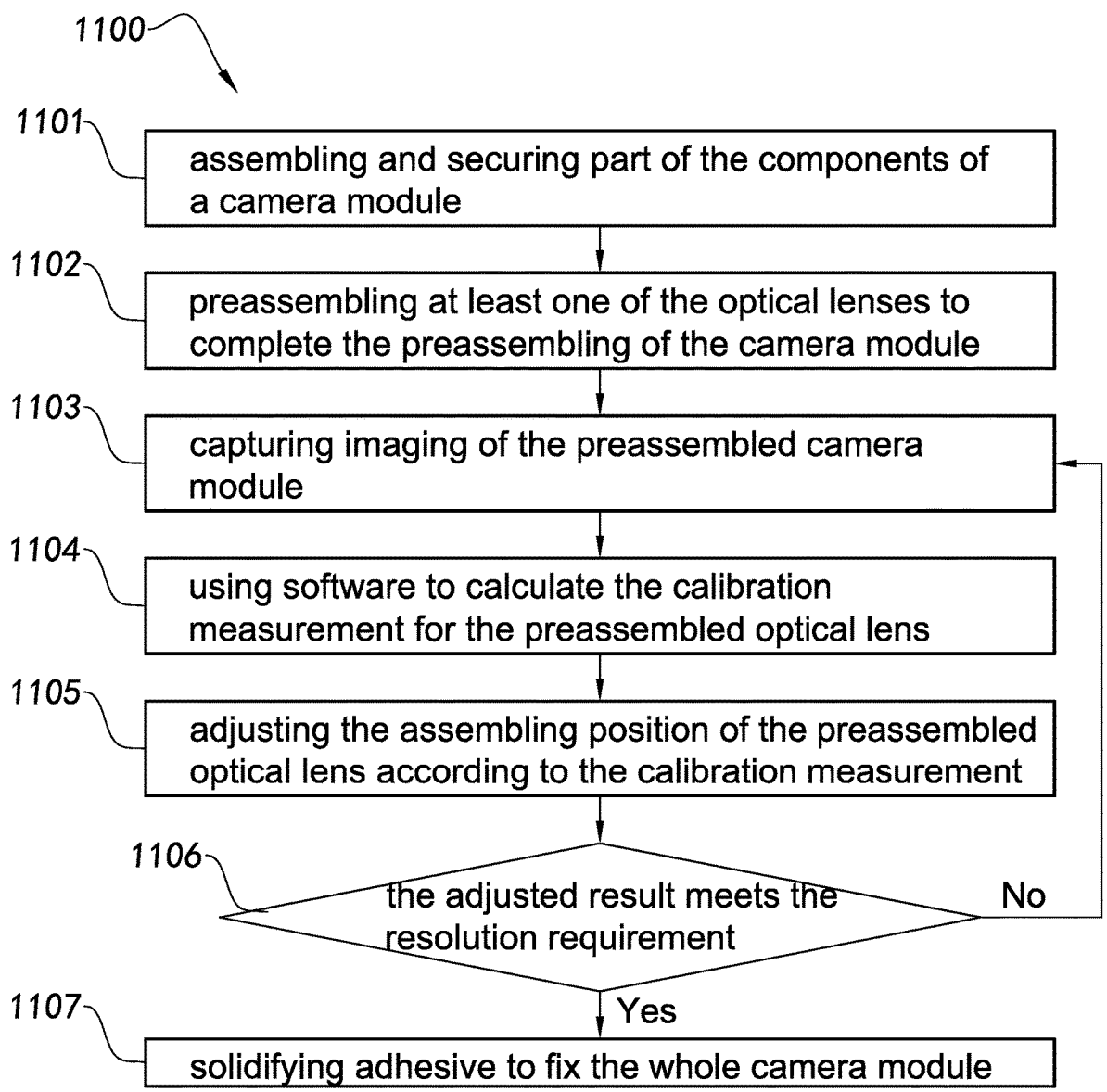
FIG. 11 is a flow diagram of a manufacturing method of the camera module according to the above third preferred embodiment of the present invention.

FIG. 11 is a flow diagram of a manufacturing method 1100 of the camera module of the present preferred embodiment, wherein the manufacturing method 1100 of the camera module includes the steps of:

step (1101): assembling and securing part of the components of a camera module;

step (1102): preassembling at least one of the lenses to complete the preassembling of the camera module;

step (1103): capturing an imaging of the preassembled camera module;

step (1104): using software to calculate the calibration measurement for the preassembled lens;

step (1105): adjusting the assembling position of the preassembled lens according to the calibration measurement;

step (1106): proceeding step (1107) if the adjusted result meets the resolution requirement, or repeating steps (1103) to (1105) if the adjusted result fails to meet the resolution requirement, until the adjusting of the preassembled lens achieves the expected requirement; and step (1107): solidifying adhesive to affix the whole camera module.

In the step (1101), the filter 1022B, the lens mount 1024B, the optical sensor 1021B, and the circuit board 1023B are assembled and fixed to form the photosensitive device 1020B. Also the optical structural member 1013B is assembled and fixed on the lens mount 1024B. The third lens 10113B, the fourth lens 10114B, and the fifth lens 10115B are fixedly assembled at the corresponding limiting structures 10133B of the optical structural member 1013B.

It is worth mentioning that, in this step, assembling tolerances among each of the above elements should be controlled to the smallest to be kept within an allowable range of tolerance as long as possible, so as to avoid increasing successive adjustment or failure of successive adjusting due to overly high assembling tolerance.

In the step (1102), the second lens 10112B and the first lens 10111B are orderly preassembled into the optical structural member 1013B. An adhesive 1040B is applied in the preassembling. The adhesive 1040B is semi-solidified under ultraviolet exposure to complete the preassembling of the second lens 10112B and the first lens 10111B. Next, the aperture member 1014B is fixedly assembled on top of the optical structural member 1013B. At this point, the preassembling of the camera module is finished through the partial fixedly assembling, which makes the optical lens of the camera module becoming the adjustable optical lens 10D.

In the steps (1103) and (1104), the preassembled camera module is powered on and the imaging of the camera module is captured. Then the calibration measurements for the assembling positions of the first lens 10111B and the second lens 10112B are respectively calculated based on the imaging of the camera module.

Capturing of the imaging of the camera module is based on shooting a MTF (Modulation Transfer Function) testing chart with the camera module. The MTF value is applied to represent the imaging quality of the camera module. A greater MTF value indicates a higher imaging quality of the camera module. Every time when the imaging of the camera module is captured, a MTF value corresponding to the imaging needs to be calculated. The MTF value is then checked to determine if it is greater than the standard. If the MTF value is greater than or equal to the standard, the capturing is completed; if the MTF value is lower than the standard, another capturing and adjusting will be required.

It should be noted that in the process of capturing imaging every time, the environmental parameters for the shooting of the camera module, including a distance between the testing chart and the camera module and the parameter of light sources, should be strictly controlled, so as to ensure the accuracy and consistency of imaging capturing for adjusting the assembling position of the adjustable optical element.

In the process of imaging capturing of the camera module, besides of calculating MTF value, other characteristics of the camera module, including stained or defective pixel, artifact and vignette, can also be monitored and checked.

How the software adjusting of the assembling position of the adjustable optical element is based on studies of the sensibility of optical design of lens system. A method of the software to calculate the calibration measurement of the assembling positions of the first lens 10111B and the second lens 10112B comprises the steps of:

measuring optical characteristics of the camera module, including MTF value, eccentricity of the optic axis, tilt of the optic axis, and field curvature before adjusting based on the imaging of the camera module; and calculating the calibration measurements for the assembling positions of the first lens 10111B and the second lens 10112B based on the sensibility of the optical characteristics of the assembling positions of the first lens 10111B and the second lens 10112B.

In the steps (1105) and (1106), based on the calculated calibration measurements of the step (1104), preassembling positions of the first lens 10111B and the second lens 10112B are respectively adjusted through the corresponding adjustment channel 10131B, so as to ensure the first lens 10111B and the second lens 10112B in the optical structural member 1013B to be properly turned. That is to say, the first lens 10111B and the second lens 10112B are properly adjusted in the horizontal position, vertical position or axial position, and tilting position thereof, such that after adjusting, the central axis lines of the first lens 10111B and the second lens 10112B and the central axis line of the optical sensor 1021B are adjusted to be coincided or within an allowable range of deviation. Meanwhile, imaging of the camera module after adjustment will meet the resolution requirement. If the imaging of the camera module still fails to meet the resolution requirement after the adjustment, assembling positions of the first lens 10111B and the second lens 10112B should then further be adjusted.

Each adjusting requires a capturing of the imaging of the camera module, which means to repeat the steps (1103) to (1105) until the imaging of the camera module meets the requirement.

It is worth mentioning that as the adjustable optical element is adjusted to the target position according to the calculated calibration measurement and the imaging of the camera module meets the resolution requirement, it can be considered that the central axis line of the adjustable optical lens 1010B and the central axis line of the optical sensor 1021B are coincided or within an allowable range of deviation, which means the adjustment satisfies the set requirement.

In the step (1107), solidifying the adhesive 1040B through a heating treatment fixes the first lens 10111B and the second lens 10112B in the optical structural member 1013B. Then the adjustment channel 10131B is sealed. The present embodiment preferably seals the adjustment channel 10131B by injecting adhesive or glue dispensing into the adjustment channel 10131B and then conducting a heating process, or waiting to be heated with the adhesive 1040B to solidify the adhesive for sealing the adjustment channel 10131B and the adhesive 1040B at the same time, wherein the adjustment channel 111B is sealed and the first lens 10111B and the second lens 10112B are fixed in position simultaneously, so as to package the adjustable optical lens 1010B and the photosensitive device 1020B and then to fix the whole camera module.

Besides, in the step (1107), the present invention may have at least one adhesive injection channel 10141B provided in the aperture member 1014B for injecting adhesive to further fix the adjusted first lens 10111B in position. An implementation can have two adhesive injection channels 10141B that, after the first lens 10111B alone is adjusted or both the first lens 10111B and the second lens 10112B are adjusted, thermosetting adhesive is injected into the adhesive injection channels 10141B. After the heating treatment of the camera module, the first lens 10111B is further to be completely fixed. Meanwhile, the injected adhesive can also seal the injection channels 10141B after solidification.

Figure 12:
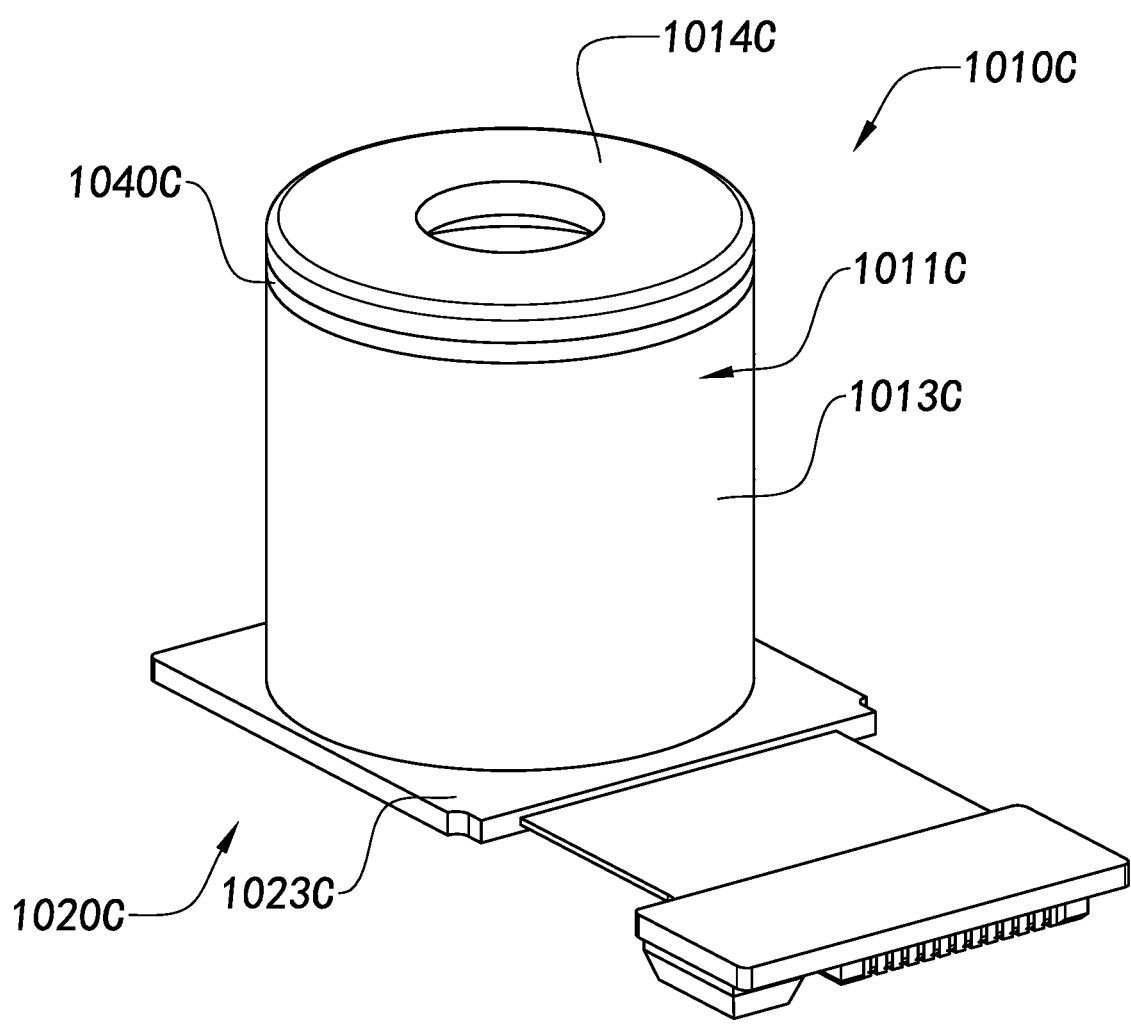
FIG. 12 is a perspective structural view of a camera module according to a fourth preferred embodiment of the present invention.
Figure 13:
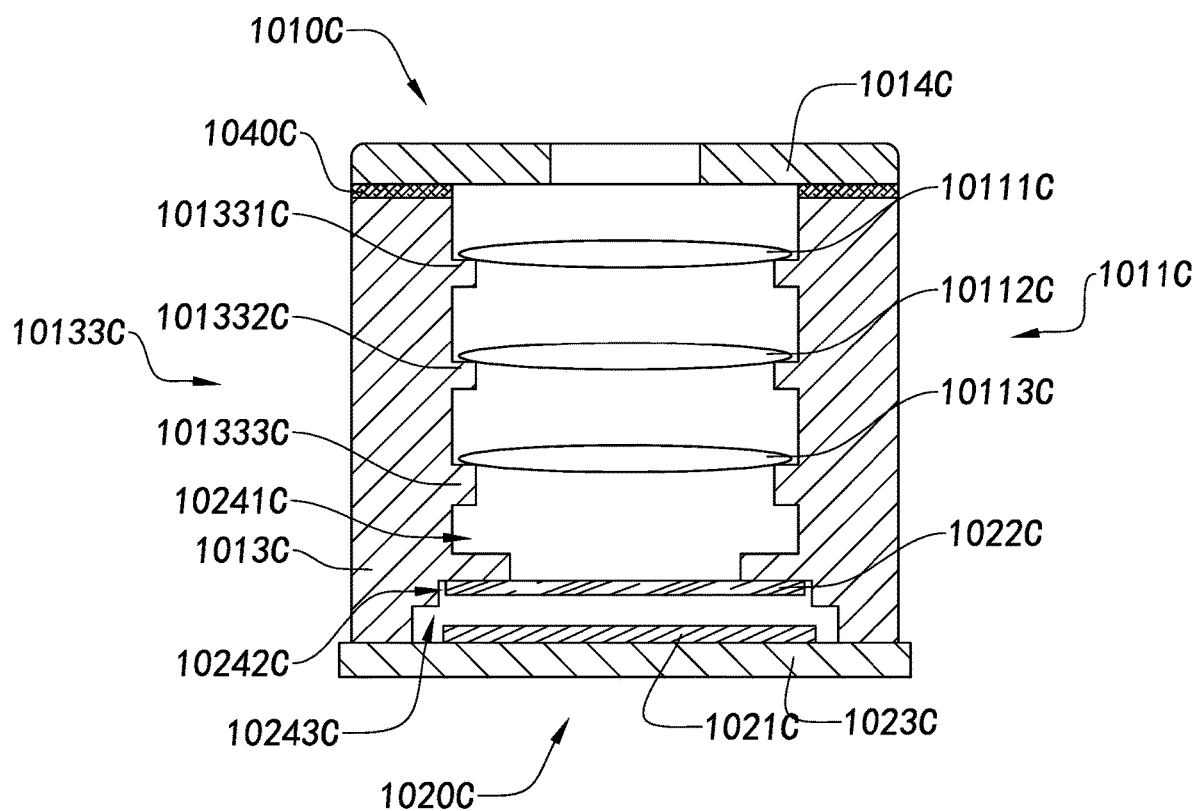
FIG. 13 is a sectional view of a camera module according to the above fourth preferred embodiment of the present invention.

Referring to FIG. 12 and FIG. 13, a camera module according to a fourth preferred embodiment of the present invention is illustrated. As shown in FIG. 12 and FIG. 13, a camera module includes an adjustable optical lens 1010C and a photosensitive device 1020C. The adjustable optical lens comprises an optical structural member 1013C, three lenses 1011C (including a first lens 10111C, a second lens 122C and a third lens 10113C), and an aperture member 1014C, wherein the three lenses 1011C are installed inside the optical structural member 1013C along an axial direction of the optical structural member 1013C. The aperture member 1014C is preassembled on top of the optical structural member 1013C, which is also on top of the first lens 10111C, while keeping a certain spacing therewith. The assembling position of the aperture member 1014C is able to be adjusted in at least one direction, such as X, Y, or Z direction, relative to the spatial position of the optical structural member 1013C. In the present preferred embodiment, the aperture member 1014C is embodied as an adjustable optical element that the optical lens comprising the adjustable optical element becomes an adjustable optical lens. The photosensitive device 1020C comprises a filter 1022C, an optical sensor 1021C and a circuit board 1023C, wherein the optical structural member 1013C is also a lens mount of the photosensitive device 1020C. The filter 1022C is fixedly installed in the optical structural member 1013C and is positioned under a bottom of the third lens 10113C. The optical sensor 1021C is fixedly installed in the optical structural member 1013C and attached on top of the circuit board 1023C under a bottom of the filter 1022C. One or more lenses 12C, the aperture member 1014C, and the filter 1022C are arranged in a photosensitive path of the optical sensor 1021C, so lights reflected from an object may enter the inside of the camera module from the adjustable optical lens 1010C and then be received by the optical sensor 1021C to proceed photoelectric conversion, so that the camera module can subsequently generate images respective to the object.

Specifically, an inner wall of the optical structural member 1013C forms a first groove 10241C, a second groove 10242C and a third groove 223C, which are sequentially and spacedly set in a top, a middle, and a bottom of the optical structural member 1013C. The filter 1022C is installed in the second groove 10242C. The optical sensor 1021C is held in the third groove 223C and attached on the circuit board 1023C on top of the circuit board 1023C. The circuit board 1023C is installed in a bottom portion of the optical structural member 1013C.

The first lens 10111C is fixedly installed at a first limiting structure 101331C arranged on an inner wall of the optical structural member 1013C. The second lens 10112C is fixedly installed at a second limiting structure 101332C arranged on the inner wall of the optical structural member 1013C. The third lens is installed at a third limiting structure 101333C arranged on the inner wall of the optical structural member 1013C. The first limiting structure 101331C, the second limit structure 101332C and the third limit structure 101333C are protrudedly formed by extending the inner wall of the optical structural member 1013C toward the direction of the cavity thereof, so as to respectively support the first lens 10111C, the second lens 10112C and the third lens 10113C.

Figure 14:
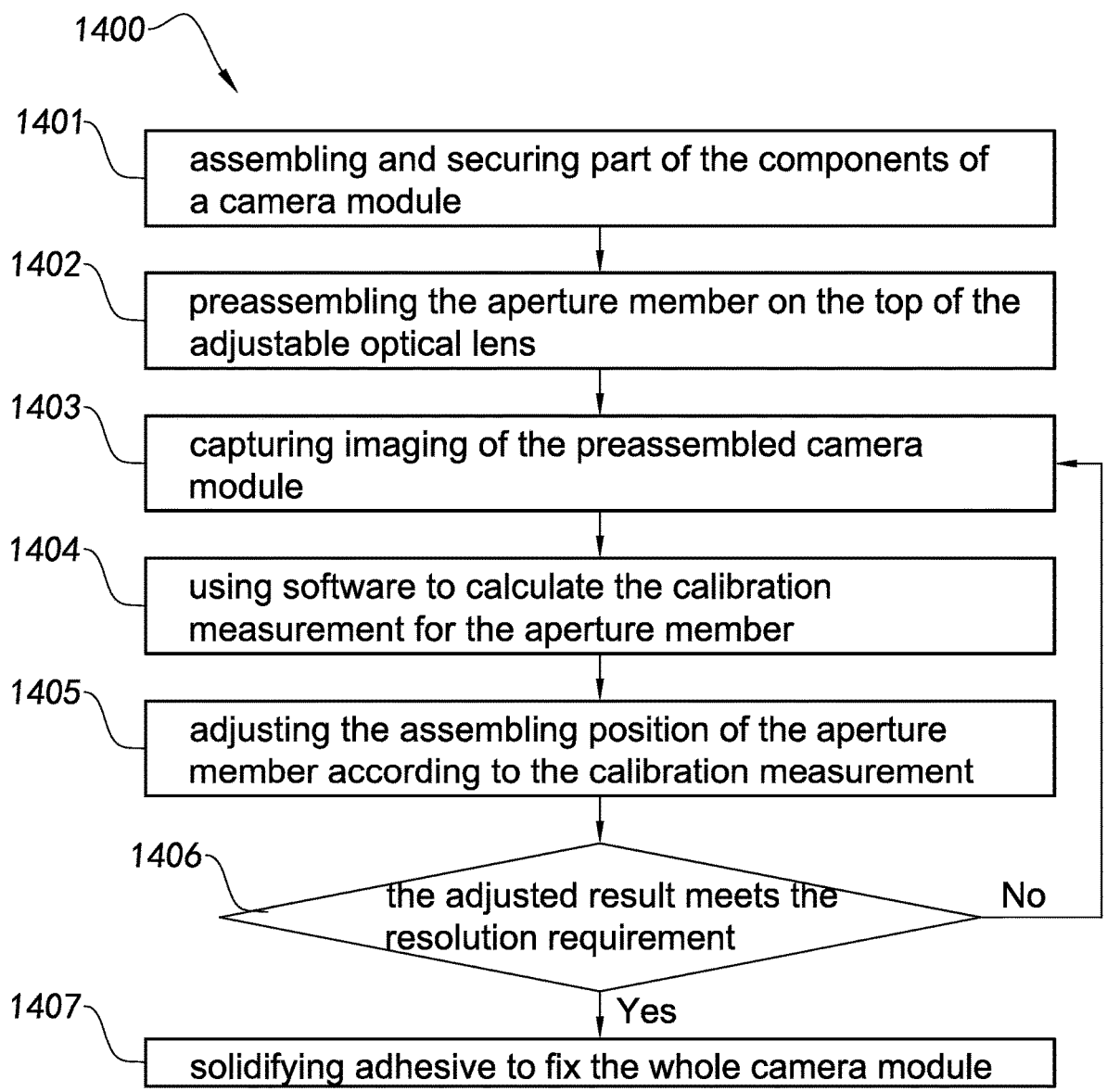
FIG. 14 is a flow diagram of a manufacturing method of the camera module according to the above fourth preferred embodiment the present invention.

Referring to FIG. 14, a manufacturing method 1400 of the camera module according to the above fourth preferred embodiment comprises the steps of:

step (1401): assembling and securing parts of the components of the camera module;

step (1402): preassembling the aperture member 1014C on top of the adjustable optical lens 1010C;

step (1403): capturing an imaging of the preassembled camera module;

step (1404): using software to calculate a calibration measurement for the aperture member 1014C;

step (1405): adjusting an assembling position of the aperture member 1014C according to the calibration measurement;

step (1406): proceeding step (1407) if the adjusted result meets a resolution requirement, or repeating steps (1403) to (1405) if the adjusted result fails to meet the resolution requirement, until the adjusting of the aperture member achieves the expected requirement; and step (1407): solidifying adhesive to fix the whole camera module.

In the step (1401), parts of the module components of the camera module are assembled and fixed. That is, the filter 1022C, the optical sensor 1021C and the circuit board 1023C are installed and fixed at the predetermined positions of the optical structural member 1013C. Also, the third lens 10113C, the second lens 10112C and the first lens 10111C are orderly installed and fixed at the predetermined positions in the optical structural member 1013C, so that the three lenses 12C (the third lens 10113C, the second lens 10112C and the first lens 10111C) are aligned in a photosensitive path of the optical sensor 1021C, and that the central axis lines of the three lenses 1011C and the central axis line of the optical sensor 1021C are arranged to be coincided or within an allowable range of deviation. Besides, assembling tolerances among each of the above components are strictly controlled to guarantee the imaging quality of the camera module and to reduce the workload of future adjusting.

In the step (1402), the aperture member 1014C is preassembled on top of the optical structural member 1013C by semi-solidified adhesive 1040C, so as to have the aperture member 1014C arranged in the photosensitive path of the optical sensor 1021C and allow the aperture member 1013C to be adjusted in at least one direction relative to the spatial position of the optical sensor 1021C or the optical structural member 1013C. The adhesive 1040C is preferably thermosetting adhesive that can be semi-solidified under ultraviolet exposure for preassembling.

In the steps (1403) to (1406), the preassembled camera module is powered on and the imaging of the camera module is captured. Then the calibration measurement for the aperture member 1014C is calculated by the software based on the imaging of the camera module. Proper adjusting of the assembling position of the aperture member 1014C is conducted according to the calculated calibration measurement, so as to make the central axis line thereof and the central axis line of the optical sensor 1021C being coincided or within an allowable range of deviation, which is to also make the central axis line of the adjustable optical lens 1010C and the central axis line of the optical sensor 1021C being coincided or within an allowable range of deviation. At this point, the imaging of the camera module meets the resolution requirement. If imaging of the camera module still fails to meet the resolution requirement after the aperture member 1014C has been adjusted, further capturing of the imaging of the camera module and new adjusting of the aperture member 1014C are required until it is adjusted to an eligible position and then fixed.

In the step (1407), when the adjusting of the aperture member 1014C makes the imaging of the camera module meet the resolution requirement, the camera module will be heated to completely solidify the adhesive 1040C so as to solidly attach the aperture member 1014C to the optical structural member 1013C and to then fix the whole camera module.

It is understandable that according to an alternative mode of the present invention, the lens and aperture member may also directly be completely solidified after their positions are determined, which skips the semi-solidifying process.

Figure 15:
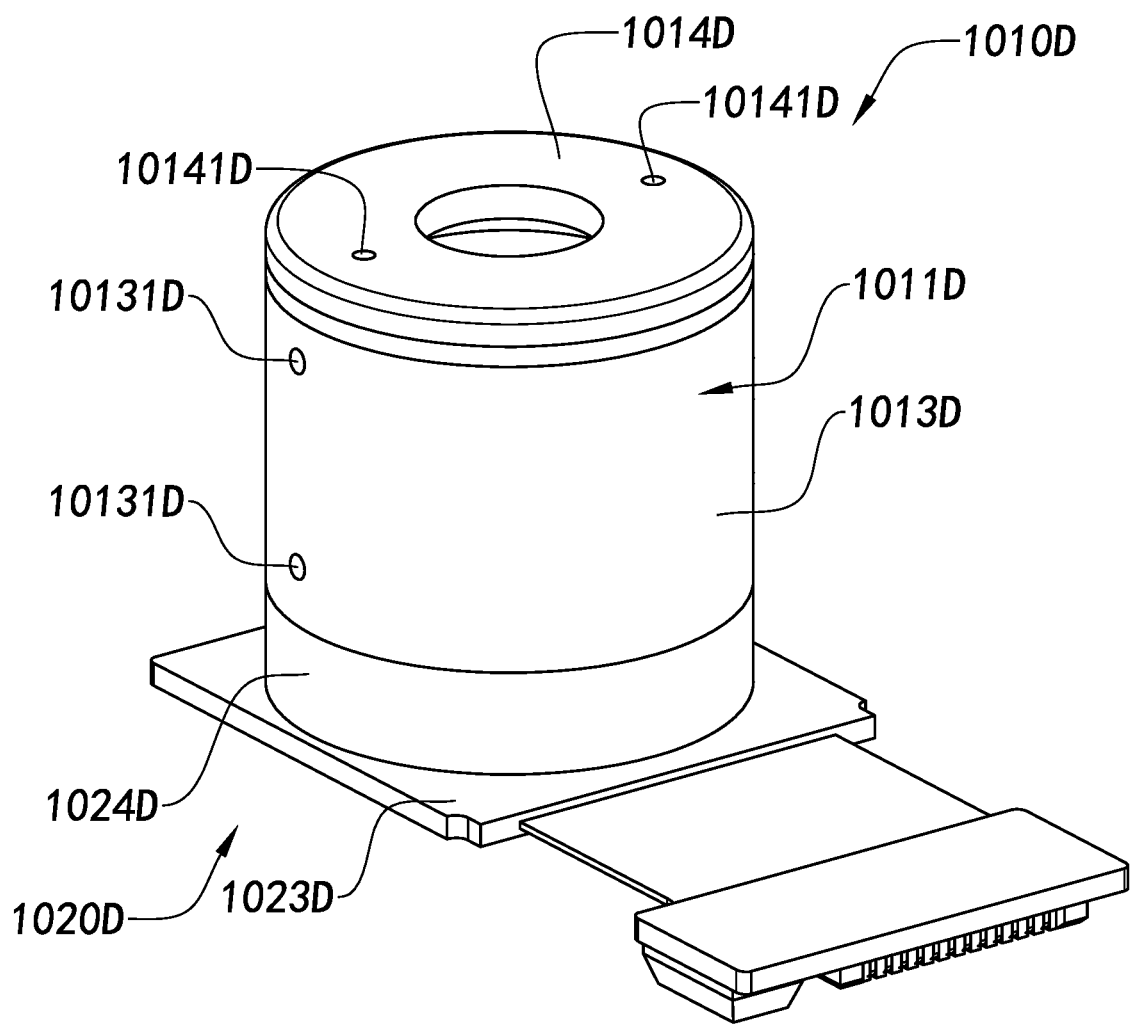
FIG. 15 is a perspective structural view of a camera module according to a fifth preferred embodiment of the present invention.
Figure 16:
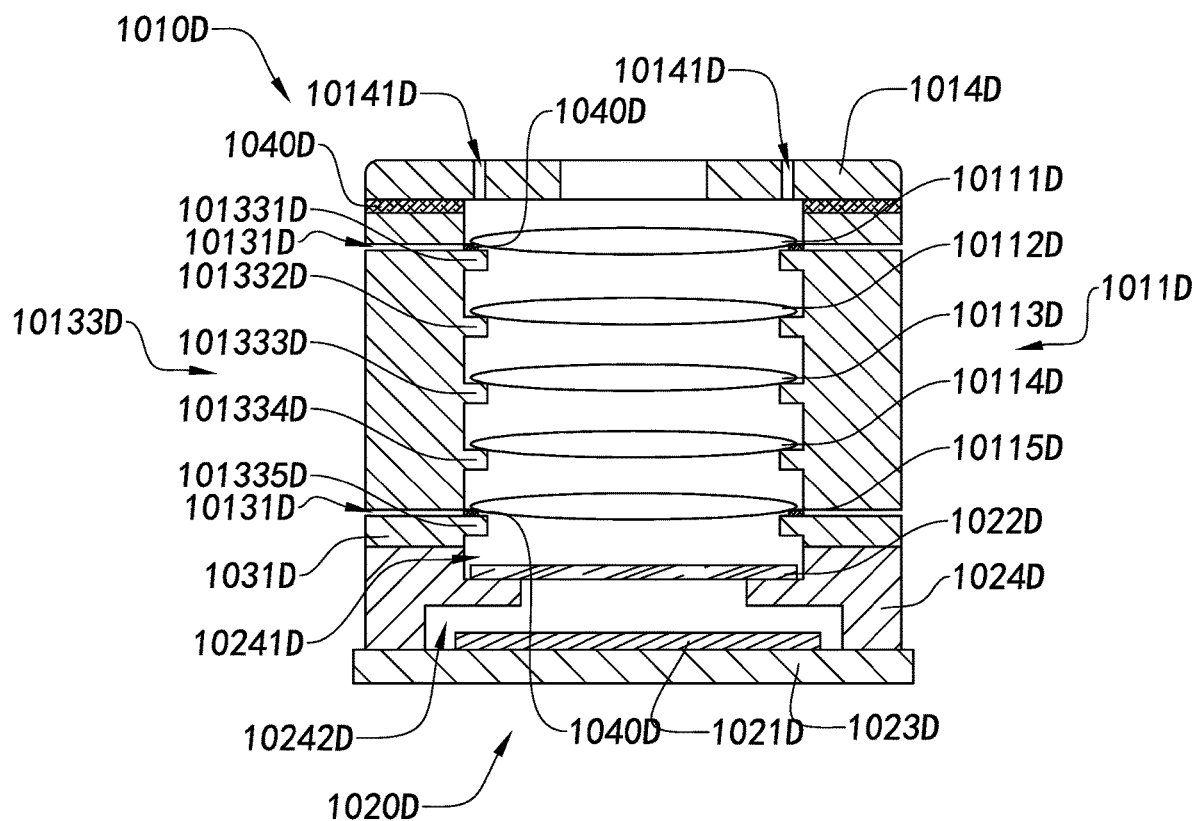
FIG. 16 is a sectional view of the camera module according to the above fifth preferred embodiment of the present invention.

Referring to FIG. 15 and FIG. 16, a fifth preferred embodiment of the present invention is illustrated. As shown in FIG. 15 and FIG. 16, a camera module comprises an adjustable optical lens 1010D and a photosensitive device 1020D. The adjustable optical lens 1010D is installed in a photosensitive path of the photosensitive device 1020D that lights reflected from an object enter the inside of the photosensitive device 1020D from the adjustable optical lens 1010D to be photoelectric converted, so that the camera module can generate images respective to the object.

The photosensitive device 1020D comprises a filter 1022D, a lens mount 1024D, an optical sensor 1021D, and a circuit board 1023D, wherein the filter 1022D is fixed at a first groove 10241D arranged on an upper part of an inner wall of the lens mount 1024D and aligned in a top position of the photosensitive path of the optical sensor 1021D. The optical sensor 1021D is fixed at a second groove 10242D arranged on a lower part of the inner wall of the lens mount 1024D. The optical sensor 1021D is attached on a top side of the circuit board 1023D. The circuit board 1023D is fixed at a bottom part of the lens mount 1024D. That is, after the filter 1022D, the lens mount 1024D, the optical sensor 1021D, and the circuit board 1023D are assembled and fixed among one another as described above, they cannot be adjusted in successive calibration. Lights reflected from an object may enter the inside of the camera module from the adjustable optical lens 1010D and then be received by the optical sensor 1021D to proceed photoelectric conversion, so that the camera module can subsequently generate images respective to the object.

The adjustable optical lens 1010D comprises an optical structural member 1013D and one or more lenses 1011D. The lenses 1011D are overlappedly and spacedly installed inside of the optical structural member 1013D along an axial direction of the optical structural member 1013D. The optical structural member 1013D is installed at a top portion of the lens mount 1024D and the lenses 1011D are aligned along the photosensitive path of the optical sensor 1021D. At least one of the lenses 1011D is preassembled inside of the optical structural member 1013D. One of the lenses 10111D preassembled inside the optical structural member 1013D is arranged as an adjustable optical element, which means that it is adaptable to be adjust in at least one direction in the optical structural member 1013D, wherein the lens, i.e. the adjustable optical element, formed is embodied as an adjustable lens.

In the fifth preferred embodiment, there are five lenses 12, including a first lens 10111D, a second lens 10112D, a third lens 10113D, a fourth lens 10114D, and a fifth lens 10115D, which are orderly, overlappingly and spacedly installed inside the optical structural member 1013D along the photosensitive path of the optical sensor 1021D, wherein the second lens 10112D, the third lens 10113D and the fourth lens 10114D have been preassembled in the optical structural member 1013D and been fixed that their positions are not adjustable. The first lens 10111D and the fifth lens 10115D are preassembled in the optical structural member 1013D as adjustable optical elements to be adjusted for calibration in the subsequent process, so as to increase imaging quality of the camera module.

Optionally, some lenses of the five lenses are all fixed lenses, while the other lenses are the adjustable optical element. Optical lens that comprises one or more adjustable optical element is called adjustable optical lens according to the present invention. Before packaging the adjustable optical lens 1010D and the photosensitive device 1020D, assembling positions of the adjustable optical elements are arranged to be adjusted.

Specifically, an adhesive 1040D is applied to orderly preassemble the first lens 10111D and the fifth lens 10115D in the optical structural member 1013D. The adhesive 1040D will not be completely solidified. That is, the adhesive 1040 is semi-solidified for preassembling of the first lens 10111D and the fifth lens 10115D, which not only prevents them from over moving, but also make successive adjusting easier.

The adjustable optical lens 1010D further comprises an aperture member 1014D. The adhesive 1040D is applied to preassemble the aperture member 1014D on top of the optical structural member 1013D for introducing incident light beam and limiting the volume of the incident light beam, wherein the assembling position of the aperture member 1014D is arranged to be adjustable in at least one direction relative to the optical sensor 1021D, which is mainly adjusting in horizontal direction, while adjusting in vertical direction and tilt direction are also possible.

In the fifth preferred embodiment, sequentially, the fifth lens 10115D is preassembled, and then the fourth lens 10114D, the third lens 10113D and the second lens 10112D are fixedly assembled. Then, the first lens 10111D is preassembled in the optical structural member 1013D, and then the aperture member 1014D is preassembled on top of the optical structural member 1013D. The aperture member 1014D is installed on top of the first lens 10111D and also positioned in the photosensitive path of the optical sensor 1021D. Among the above, the first lens 10111D, the fifth lens 10115D and the aperture member 13D are adjustable optical elements that the assembling positions thereof are adaptable to be adjusted in at least one direction in the successive process of calibration or adjusting, wherein the adjustable directions comprise horizontal direction, vertical direction, tilt direction, and peripheral direction. After the adjustment, the central axis line of the adjustable optical lens and the central axis line of the optical sensor 1021D are made to be coincided or within an allowable range of deviation, so as to have the imaging of the camera module achieving the resolution requirement and to guarantee imaging quality of the camera module.

The adhesive 1040D applied is a mixed adhesive of an UV adhesive and a thermosetting adhesive, which becomes semi-solidified after ultraviolet exposure for the preassembling. After a heating treatment, the adhesive 1040D will be completely solidified to fix the whole camera module.

It is worth mentioning that there are at least two adjustment channels 10131D provided in the optical structural member 1013D, communicating the internal space of the optical structural member 1013D with the external environment and corresponding to the adjustable optical elements respectively. In the fifth preferred embodiment, the adjustment channels 10131D are respectively arranged in sidewalls of the optical structural member 1013D and positioned corresponding to the first lens 10111D and the fifth lens 10115D, adapted for adjusting the spatial positions of the first lens 10111D and the fifth lens 10115D in the internal space of the optical structural member 1013D through the adjustment channels 10131D. Preferably, according to the fifth preferred embodiment, six adjustment channels 10131D are provided, wherein three of the adjustment channels 10131D are arranged on the sidewall of the optical structural member 10131D along the preassembling position of the first lens 10111D and separately arranged from one another at 120 degrees. The other three adjustment channels 10131D are arranged on the sidewall of the optical structural member 10131D along the preassembling position of the second lens 10112D and separately arranged from one another at 120 degrees.

If the first lens 10111D and the fifth lens 10112D need to be adjusted, an elongated element such as a needle can be inserted into the corresponding adjustment channel 10131D. By controlling the needle to contact and poke the first lens 10111D and the fifth lens 10115D, horizontal and vertical positions of the first lens 10111D and the fifth lens 10115D at the three spots of the corresponding adjustment channels 10131D can be changed, so as to respectively conduct adjustment of the first lens 10111D and the fifth lens 10115D in directions including horizontal positions, vertical positions, and tilt positions.

Because the aperture member 1014D is preassembled on top of the adjustable optical lens 1010D, assembling position of the aperture member 13D can be adjusted through any practicable ways.

In the fifth preferred embodiment, the optical structural member 1013D can be implemented as a lens cone, wherein the inner wall of the optical structural member 1013D has five limiting structures 10133D. Preferably, the limiting structures 10133D are spacedly and protrudedly formed by extending the inner wall of the optical structural member 1013D toward the direction of the cavity thereof, so as to respectively support five of the lenses 1011D respectively. In other words, the first limiting structure 101331D, the second limiting structure 101332D, the third limiting structure 101333D, the fourth limiting structure 101334D, and the fifth limiting structure 101335D respectively support the first lens 10111D, the second lens 10112D, the third lens 10113D, the fourth lens 10114D, and the fifth lens 10115D. Those skilled in the art can understand that the optical structural member 1013D can also utilize other means to support each of the lenses 1011D.

It is worth mentioning that the camera module can also comprise a driver and the optical structural member 1013D can be a component of the driver.

In the present preferred embodiment, the camera module can not only be a prime lens camera module, but also be an auto-focus lens camera module.

Figure 17:
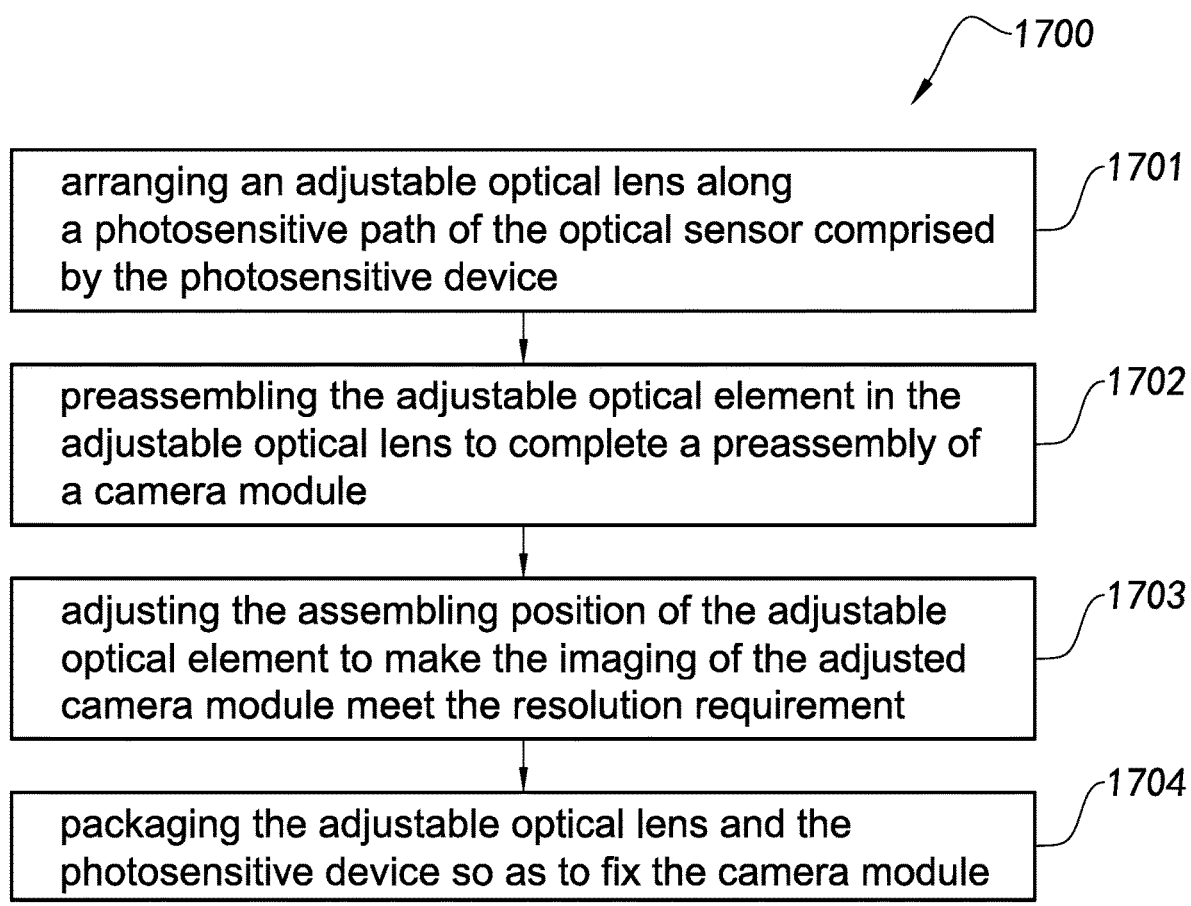
FIG. 17 is a flow diagram of a manufacturing method of the camera module according to the above fifth preferred embodiment of the present invention.

FIG. 17 is a flow diagram of a manufacturing method 1700 of the camera module of the above fifth preferred embodiment, wherein the manufacturing method 1700 of the camera module includes the following steps:

step (1701): arranging the adjustable optical lens 1010D along the photosensitive path of the optical sensor 1021D comprised by the photosensitive device 1020B;

step (1702): preassembling the adjustable optical element in the adjustable optical lens 1010D to complete a preassembly of a camera module;

step (1703): adjusting the assembling position of the adjustable optical element to make the imaging of the adjusted camera module meeting the resolution requirement; and step (1704): packaging the adjustable optical lens 1010D and the photosensitive device 1020D so as to fix the camera module.

In the step (1701), the filter 1022D, the lens mount 1024D, the optical sensor 1021D, and the circuit board 1023D are fixedly assembled to form the photosensitive device 1020D. Also, the optical structural member 1013D is fixedly assembled on the lens mount 1024D. The second lens 10112D, the third lens 10113D and the fourth lens 10114D are fixedly assembled at the corresponding limiting structures 10133D of the optical structural member 1013D. Then the adjustable optical lens 1010D is set in the photosensitive path of the optical sensor 1021D to complete the fixing assembling of parts of the components of the camera module. These elements in the present embodiment are non-adjustable optical elements.

It is worth mentioning that, in this step, assembling tolerances among each of the above elements should be controlled to the smallest and to be kept within the allowable range of tolerance as long as possible, so as to avoid increases of successive adjustment or failure of successive adjusting due to overly high assembling tolerance among each of the above elements In the step (1702), the first lens 10111D and the fifth lens 10115D are preassembled in the optical structural member 1013D and the aperture member 1014D is preassembled on top of the optical structural member 1013D. An adhesive 1040D is used to conduct the preassembling of the first lens 10111D, the fifth lens 10115D and the aperture member 1014D. The adhesive 1040D is then semi-solidified by ultraviolet exposure to finish the preassembling of the first lens 10111D, the fifth lens 10115D and the aperture member 1014D. At this point, the preassembling of the camera module is produced. The first lens 10111D, the fifth lens 10115D and the aperture member 1014D in the present preferred embodiment are the adjustable optical elements that makes the optical lens of the camera module that comprises the adjustable optical elements becoming the adjustable optical lens 1010D.

The step (1703) comprises the steps of:

(17031) capturing imaging of the preassembled camera module;

(17032) calculating a calibration measurement for the adjustable optical element with a software based on the imaging of the camera module; and (17033) adjusting an assembling position of the adjustable optical element according to the calibration measurement.

In the step (1703), if the resolution requirement of the camera module fails to meet the request after the adjustable optical element was adjusted, the steps (17031) to (17033) need to be repeated until the resolution of the adjusted camera module meets the requirement.

In the step (17032) and the step (17033), the calibration measurements for the assembling positions of the first lens 10111D, the fifth lens 10112D and the aperture member 1014D are respectively calculated based on the imaging of the camera module. Then, according to each of the calibration measurements, the assembling positions of the first lens 10111D, the fifth lens 10115D and the aperture member 1014D are adjusted respectively and accordingly.

In the above steps, capturing of the imaging of the camera module is based on shooting a MTF (Modulation Transfer Function) testing chart with the camera module. The MTF value is applied to represent the imaging quality of the camera module. A greater MTF value indicates a higher imaging quality of the camera module. Every time when the imaging of the camera module is captured, a MTF value corresponding to the imaging needs to be calculated. The MTF value is then checked to determine if it is greater than the standard. If the MTF value is greater than or equal to the standard, the capturing is completed; if the MTF value is lower than the standard, another capturing and adjusting will be required.

It should be noted that in the process of capturing the imaging every time, the environmental parameters for the shooting of the camera module, including a distance between the testing chart and the camera module and the parameter of light sources, should be strictly controlled, so as to ensure the accuracy and consistency of imaging capturing for adjusting the assembling position of the adjustable optical element.

In the process of imaging capturing of the camera module, besides of calculating MTF value, other characteristics of the camera module, including stained or defective pixel, artifact and vignette, can also be monitored and checked.

How the software adjusting of the assembling position of the adjustable optical element is based on studies of the sensibility of optical design of lens system. A method of the software to calculate the calibration measurement of the assembling positions of the first lens 121D, the fifth lens 125D and the aperture member 1014D comprises the steps of:

measuring optical characteristics of the camera module, including MTF value, eccentricity of the optic axis, tilt of the optic axis, and field curvature before adjusting based on the imaging of the camera module; and calculating the calibration measurements for the assembling positions of the first lens 10111D, the fifth lens 10115D, and the aperture member 1014D based on the sensibility of the optical characteristics of the assembling positions of the first lens 10111D, the fifth lens 10115D and the aperture member 1014D.

Furthermore, in the step (1703), based on the calculated calibration measurements, preassembling positions of the first lens 10111D, the fifth lens 10115D and the aperture member 1014D are respectively adjusted, so as to ensure the first lens 10111D and the fifth lens 10115D in the optical structural member 1013D to be properly turned. That is to say, the first lens 10111D and the fifth lens 10115D are properly adjusted in the horizontal position, vertical or axial position, or tilting position thereof. Also, the horizontal position, vertical or axial position, or tilting position of the aperture member 1014D can also be properly adjusted accordingly. After the adjustment, the central axis line of the adjustable optical lens 1010D and the central axis line of the optical sensor 1021D are to be coincided or within an allowable range of deviation. Imaging of the camera module after adjusting also meets the resolution requirement. If the imaging of the camera module still fails to meet the resolution requirement after the adjustment, assembling position of the adjustable optical element should then further be adjusted.

It is worth mentioning that, as the adjustable optical element is adjusted to the target position according to the calculated calibration measurement, it can be considered that the central axis line of the adjustable optical lens 1010D and the central axis line of the optical sensor 1021D are coincided or within an allowable range of deviation, which meets the target requirement that the imaging of the adjusted camera module meet the resolution requirement.

In the step (1704), solidifying the adhesive 1040D through a heating treatment fixedly attaches the first lens 10111D, the fifth lens 10115D and the aperture member 1014D to the optical structural member 1013D. Then, the adjustment channel 10131D is sealed. According to the fifth embodiment, the sealing is conducted preferably by injecting adhesive into the adjustment channel 10131D, that seals and further fixes the first lens 10111D and the second lens 10112D in position, so as to package the adjustable optical lens 1010D and the photosensitive device 1020D.

Besides, in the step (1704), the present invention may has at least one adhesive injection channel 10141D provided in the aperture member 1014D for injecting adhesive (e.g. thermosetting adhesive) to further fixed the first lens 10111D and fifth lens 10115D after adjusted. Another implementation can have two adhesive injection channels 10141D that, after the first lens 10111D and the fifth lens 10115D are adjusted, thermosetting adhesive is injected into the adhesive injection channels 10141D. After the heating treatment of the camera module, the first lens 10111D and the fifth lens 10115D are completely fixed. Meanwhile the adhesive injection channels 10141D can be sealed.

Figure 18:
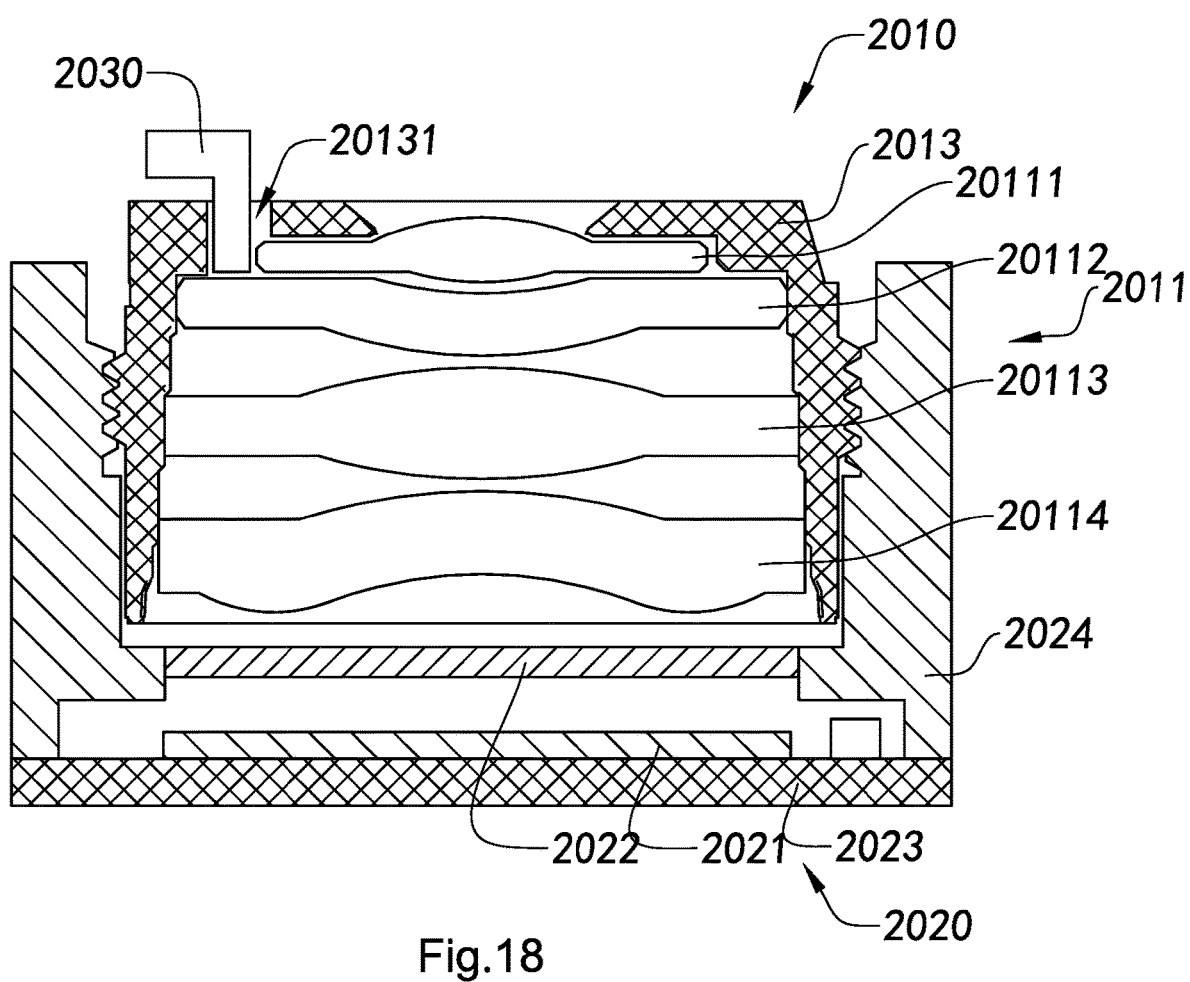
FIG. 18 is a sectional view of a manufacturing process of the camera module according to a sixth preferred embodiment of the present invention.
Figure 19:
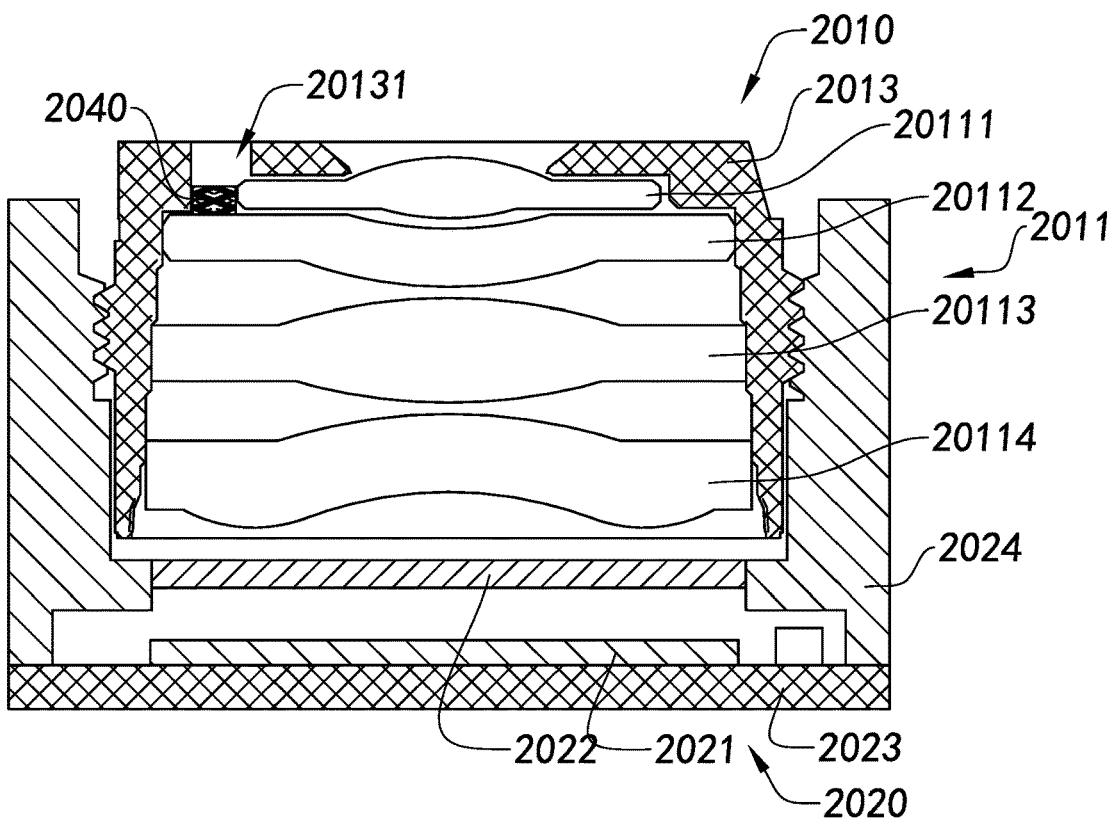
FIG. 19 is a sectional view of a manufacturing process of the camera module according to the above sixth preferred embodiment of the present invention.

Referring to FIGS. 18-19, a sixth embodiment of the camera module provided by the present invention will be illustrated. Referring to FIGS. 18-19, a camera module comprises an adjustable optical lens 2010 and an photosensitive device 2020, wherein the photosensitive device 2020 comprises an optical sensor 2021. The adjustable optical lens 2010 is arranged along a photosensitive path of the optical sensor 2021 that lights reflected from an object can enter an inside of the camera module through the adjustable optical lens 2010 and be received by the optical sensor 2021 to proceed photoelectric conversion, so that images respective to the object can be subsequently captured by the camera module.

The photosensitive device 2020 further comprises a filter 2022, a circuit board 2023, and a lens mount 2024. The filter 2022 is mounted in the lens mount 2024 and arranged above the optical sensor 2021. The optical sensor 2021 is attached on the circuit board 2023. The circuit board 2023 is mounted on a bottom of the lens mount 2024 so as to have the optical sensor 2021 located in a cavity defined in an internal of the lens mount 2024. Besides, the optical sensor 2021 keeps a distance from the lens mount 2024. The photosensitive device 2020 is manufactured with chip on board (COB) technology. Besides, according to the present invention, the photosensitive device 2020 can also be made with flip chip technology or other manufacture methods according to actual situation.

The adjustable optical lens 2010 comprises one or more lenses 2011 and an optical structural member 2013, wherein the lenses 2011 are arranged in the internal space of the optical structural member 2013 along a vertical direction of the optical structural member 2013, wherein at least one of the lenses 2011 is utilized as an adjustable lens that its assembling position in the optical structural member 2013 is adaptable to be adjusted, such that an optical path of the adjustable optical lens 2010 can be adjusted. Therefore, a central axis line of the adjustable optical lens 2010 and a central axis line of the optical sensor 2021 can be coincided or within an allowable range of deviance after the adjustment, such that the imaging quality of the camera module can be ensured.

It is worth mentioning that the optical structural member 2013 can be a regular lens cone component or an integral module of lens cone component and lens mount, wherein the camera module can be a product with auto-focus device or an integral structure of a lens cone component with an auto-focus carrier.

In the sixth preferred embodiment, there are four lenses 2011, including a first optical lens 20111, a second optical lens 20112, a third optical lens 20113, and a fourth optical lens 20114, which are orderly and overlappingly arranged in an internal space of the optical structural member 2013, wherein the first lens 20111 is arranged on top of the optical structural member 2013 and selected to be an adjustable lens. The adjustable lens (which means the first lens 20111 in the present embodiment) is preassembled in the optical structural member 2013 with an assembling position adaptable to be adjusted in one or more directions, such as one or more directions of the horizontal direction, vertical direction, tilt direction, and peripheral direction.

Further, the optical structural member 2013 has at least an adjustment channel 20131 provided in a top portion thereof, which are arranged for communicating the internal space of the optical structural member 2013 with an external environment and positioned corresponding to the adjustable optical lens 2011, so as to allow the adjustable lens be purposefully adjusted from outside of the optical structural member 2013.

Specifically, an external adjustment device 2030 can be utilized to insert into the adjustment channels 20131. Because there is a gap provided between a side of the adjustable lens and an interior of the optical structural member 2013, the external adjustment device 2030 can adjust an assembling position of the adjustable lens through contacting the side of the adjustable lens. For example, the external adjustment device 2030 can be embodied as a probe according to the sixth preferred embodiment. The probe is adapted to be inserted into the adjustment channel 20131 to contact the side of the first lens 20111 and to be controlled to move the first lens 20111 and adjust its assembling position. The probe may also be embodied to have electronic components and automation functions to automatically record the adjusting method and calibration measurement of the adjustable lens, so as to quantitatively determine if the adjustment is accurate or to precisely adjust the adjustable lens by inputting the adjusting method and calibration measurement of the adjustable lens into the probe.

It is worth mentioning that the adjusting method and calibration measurement of the adjustable lens are calculated with a software based on the imaging of the camera module captured when powering on the preassembled camera module. The adjusting method and calibration measurement help the adjustable lens to be purposefully adjusted. The camera module may meet the expected requirement after at least one adjustment. Namely, the calibration becomes faster, which saves time for the adjustment and increases the efficiency and yield rate of the production.

After the adjustable lens is adjusted, it then has to be affixed so as to complete the calibration and assembling of the camera module. According to the sixth preferred embodiment, it can utilize an external affixing device to affix the adjustable lens. For example, a glue dispensing device is utilized in the preferred embodiment to affix the first optical lens 20111 through glue dispensing. In other words, the glue dispensing device injects the adhesive 2040 into the adjustment channel 20131 and, after the adhesive is solidified, the first lens 20111 is affixed in position, wherein the adhesive 2040 can selectively be a thermosetting glue.

It is worth mentioning that, as FIG. 19 illustrated, the adhesive 2040 can be injected to a side of the first lens 20111, which means the adhesive 2040 is injected between the side of the first lens 20111 and the corresponding inner wall of the optical structural member 2013, so as to affix the first lens 20111 through affixing the side of the first lens 20111 with the inner wall of the optical structural member 2013.

It is suitable to also fill the adhesive 2040 into the adjustment channel 20131 in the injection process of the adhesive 2040, such that the adjustment channel 20131 can be sealed when the adjustable lens is affixed. However, it may certainly seal the adjustment channel 20131 through adhesive injection after the adjustable lens is affixed in position.

In addition, the adhesive 2040 may also be injected onto a top surface of the adjustable lens when the side of the adjustable lens is extended to the inner wall of the optical structural member 2013, such that the adjustable lens can be affixed through affixing the top surface of the adjustable lens to the inner wall of the optical structural member 2013.

Figure 20:
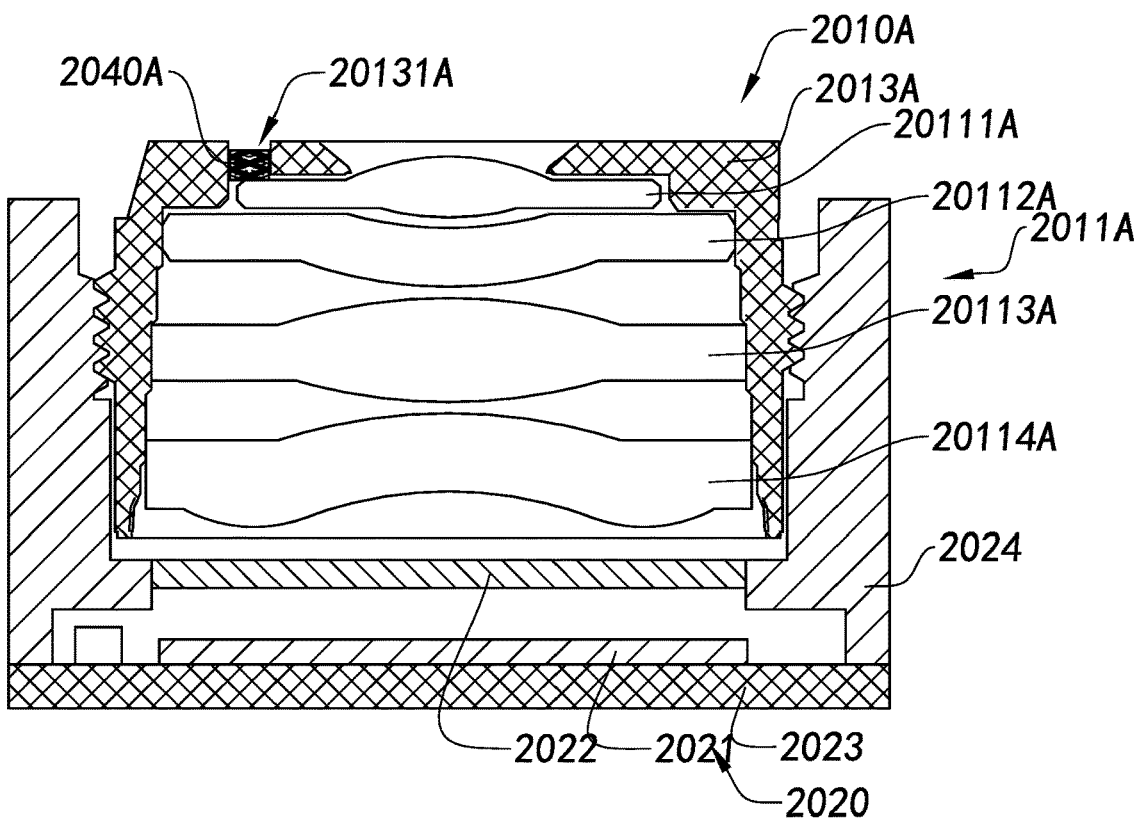
FIG. 20 is a sectional view of the camera module according to an alternative mode of the above sixth preferred embodiment of the present invention.

Specifically, an adjustable optical lens 2010A according to an alternative mode of the above sixth adjustable optical lens 2010 is illustrated in FIG. 20. The adjustable optical lens 2010A comprises one or more lenses 2011A and an optical structural member 2013A. There are four optical lenses 2011A, including a first lens 20111A, a second lens 20112A, a third lens 20113A, and a fourth lens 20114A, which are orderly and overlappingly arranged in the internal space of the optical structural member 2013 respectively along a vertical direction of the optical structural member 2013A. The first lens 20111A (functioned as the adjustable lens) being preassembled can be adjusted through at least an adjustment channel 20131A provided in a top portion of the optical structural member 2013. The external adjustment device 2030 can be utilized to reach a top surface of the first lens 20111A to adjust the first lens 20111A as well. After the adjustment, the adjustment channel 20131A may also serve as an affixing channel. In other words, the adjustment channel 20131A will also be utilized for injection of the adhesive 2040A to affix the first lens 20111A. The adhesive 2040A will be injected onto the top surface of the first optical lens 20111A and in the adjustment channel 20131A, so as to affixedly connected the top surface of the first optical lens 20111A with the inner wall of the optical structural member 2013A by the adhesive 2040A. It is suitable to fill the adhesive 2040A in the adjustment channel 20131A in the injection process of the adhesive 2040A, such that the adjustment channel 20131A can also be sealed when the adjustable lens is affixed, which helps to prevent dust from entering, reduce the working procedure, save time, and increase efficiency.

Figure 21:
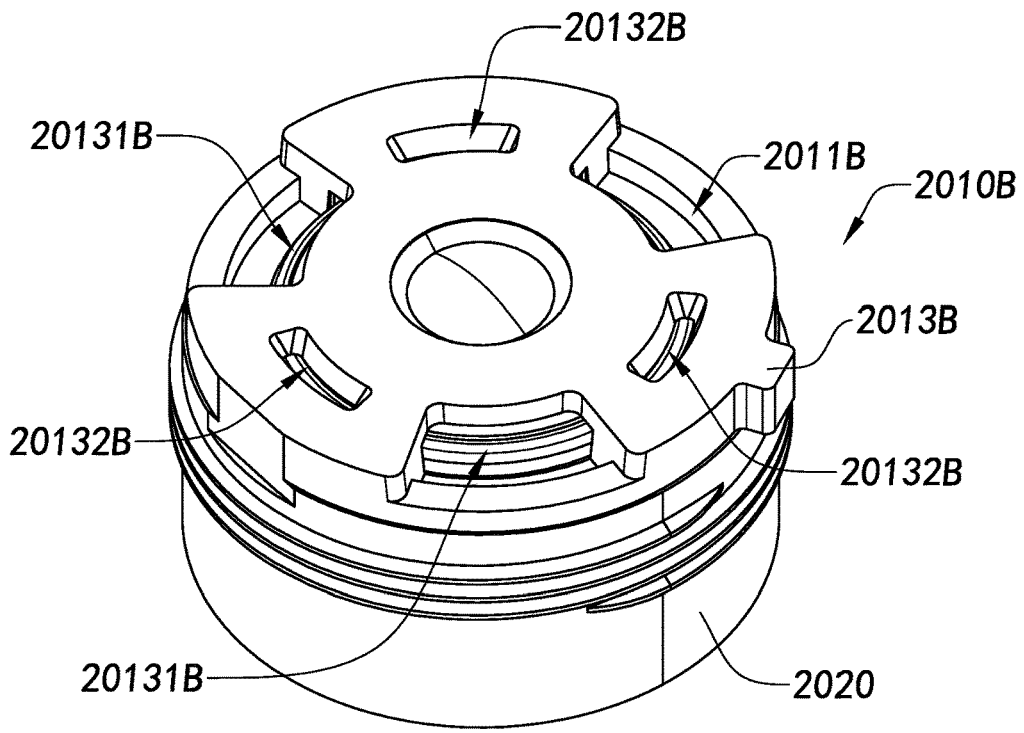
FIG. 21 is a perspective structural view of a camera module according to a seventh preferred embodiment of the present invention.
Figure 22:
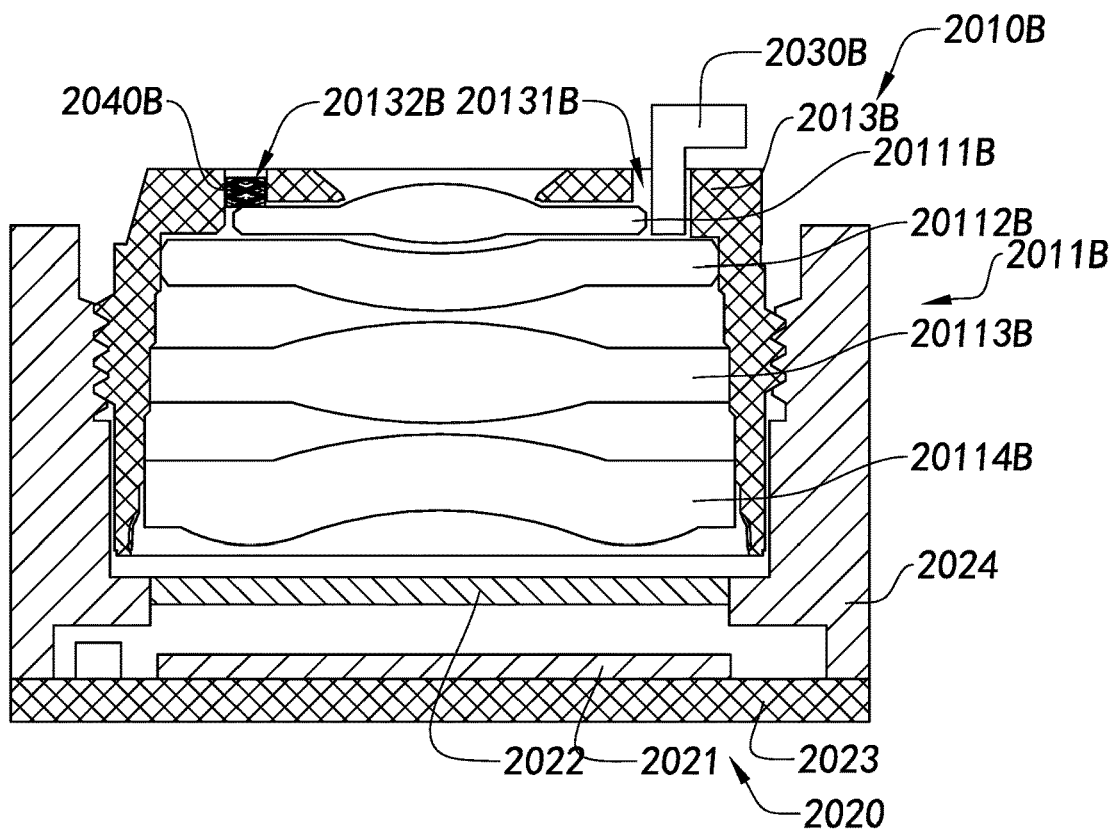
FIG. 22 is a sectional view of a manufacturing process of the camera module according to the above seventh preferred embodiment of the present invention.

Referring to FIGS. 21-22, a seventh embodiment of the camera module provided by the present invention is illustrated. Referring to FIGS. 21-22, a camera module comprises an adjustable optical lens 2010B and a photosensitive device 2020, wherein the adjustable optical lens 2010B is arranged and affixed on top of the photosensitive device 2020 based on the imaging need and aligned in an optical path of the camera module, wherein the photosensitive device 2020 is embodied the same as the above preferred embodiments, which is not repeatedly described in this seventh preferred embodiment.

The adjustable optical lens 2010B comprises one or more lenses 2011B and an optical structural member 2013B. The lenses 2011B include a first lens 20111B, a second lens 20112B, a third lens 20113B, and a fourth lens 20114B, which are arranged in the internal space of the optical structural member 2013B sequentially along the vertical direction of the optical structural member 2013B and along the photosensitive path of the optical sensor 2021. The first lens 20111B is arranged and preassembled on top of the optical structural member 2013B to serve as the adjustable lens in the present preferred embodiment and its assembling position is adaptable to be adjusted in at least one direction.

The optical structural member 2013B comprises at least an adjustment channel 20131B provided in a side thereof. The adjustment channel 20131B is positioned corresponding to the adjustable lens and communicating the internal space of the optical structural member 2013B to the external environment, adapted for adjusting the adjustable lens.

In the present preferred embodiment, there can be three adjustment channels 20131B arranged along various positions on the optical structural member 2013B corresponding to the first lens 20111B, which are separately arranged from one another at 120 degrees along a peripheral direction, adapted for adjusting the first lens 20111B from multiple directions and angles, so as to ensure the adjustment accuracy. Specifically, an external adjustment device 2030B can be utilized to insert into each of the adjustment channels 20131B. Because an edge of the first lens 20111B directly communicates with outside through the adjustment channels 20131B, the external adjustment device can be utilized to adjust an assembling position of the first lens 20111B through contacting the edge of the first optical lens 20111B.

The optical structural member 2013B has three the affixing channels 122B arranged along a peripheral direction on top of the optical structural member 2013B for communicating the internal space of the optical structural member 2013B with the external environment, such that the adjustable lens can be affixed by injecting adhesive through the adjustment channels 20131B until the adhesive contacts the adjustable lens and the optical structural member 2013B. According to the present preferred embodiment, the adjustable lens is affixed in the optical structural member 2013B by injecting adhesive 2040B on the surface of the adjustable lens and solidifying it. The affixing channels 122B are separated from one another at 120 degrees and spaced apart with the adjustment channels 20131B, such that the adjustable lens can be affixed from multiple places, so as to ensure the reliability of affixing and functioning of the camera module, such that the adjustment can be more efficient.

Figure 23:
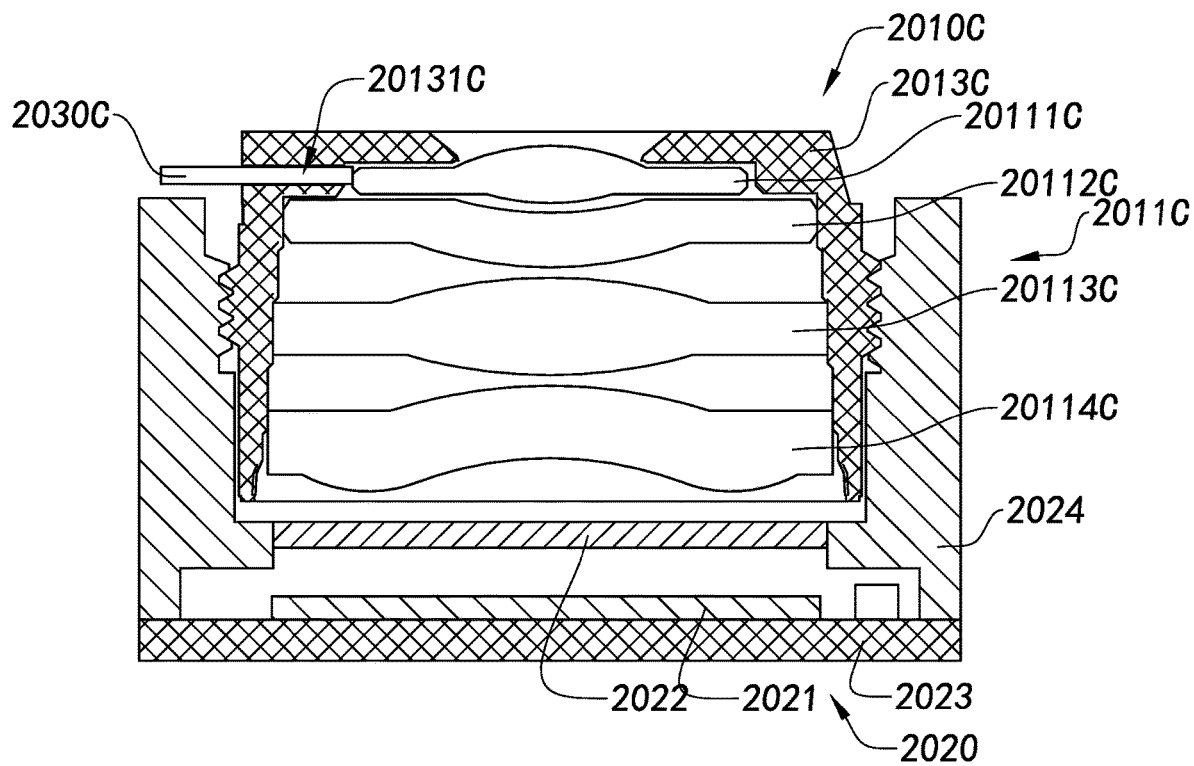
FIG. 23 is a sectional view of a manufacturing process of the camera module according to an eighth preferred embodiment of the present invention.

Referring to FIG. 23, an eighth embodiment of the camera module according to the present invention is illustrated. Referring to FIG. 23, the camera module comprises an adjustable optical lens 2010C and a photosensitive device 2020, wherein the photosensitive device 2020 is embodied the same as the above mentioned preferred embodiments and not repeatedly described in this eighth embodiment.

The adjustable optical lens 2010C comprises one or more lenses 2011C and an optical structural member 2013C. The lenses 2011C includes a first lens 20111C, a second lens 20112C, a third lens 20113C, and a fourth lens 20114C, which are arranged in an internal space of the optical structural member 2013C sequentially along a vertical direction of the optical structural member 2013C and aligned along a photosensitive path of the optical sensor 2021. The first lens 20111C is arranged and preassembled on top of the optical structural member 2013C to serve as an adjustable lens in the eighth preferred embodiment and its assembling position is adaptable to be adjusted in at least one direction.

The optical structural member 2013C comprises at least an adjustment channel 20131C provided in a side thereof. The adjustment channel 20131C is positioned corresponding to the adjustable lens and adapted for communicating an internal space of the optical structural member 2013C to an external environment for adjusting the adjustable lens.

In the eighth preferred embodiment, there are three adjustment channels 20131C arranged along in a peripheral direction on an outer side of the optical structural member and positioned corresponding to the first lens 20111C, which are separately arranged from one another at 120 degrees, adapted for adjusting the first lens 20111C from multiple directions and angles, so as to ensure the adjustment accuracy. Specifically, an external adjustment device 2030C can be utilized to insert into each of the adjustment channels 20131C. Because at least a side of the first lens 20111C directly communicates to outside through the adjustment channels 20131C, the external adjustment device 2030C can be utilized to adjust an assembling position of the first lens 20111C through contacting the side of the first optical lens 20111C.

The part of the optical structural member 2013C that has the adjustment channel 20131C arranged therein is taller than the lens mount 2024. That is to say, the adjustment channel 20131C on the side is arranged on a part of the optical structural member 2013C that protrudes from the lens mount 2024, which helps the adjustment of the adjustable lens from the outside of the optical structural member 2013C and avoids the lens mount 2024 from blocking the adjustment.

After the adjustment, an adhesive is injected into the adjustment channel 20131C through a dispensing device until the adhesive contacts the first lens 20111C to affix the first lens 20111C in the optical structural member 2013C.

Preferably, more adhesive can be injected until the adjustment channel 20131C is filled so as to affix the first lens 20111C and seal the adjustment channel 20131C at the same time.

Figure 24:
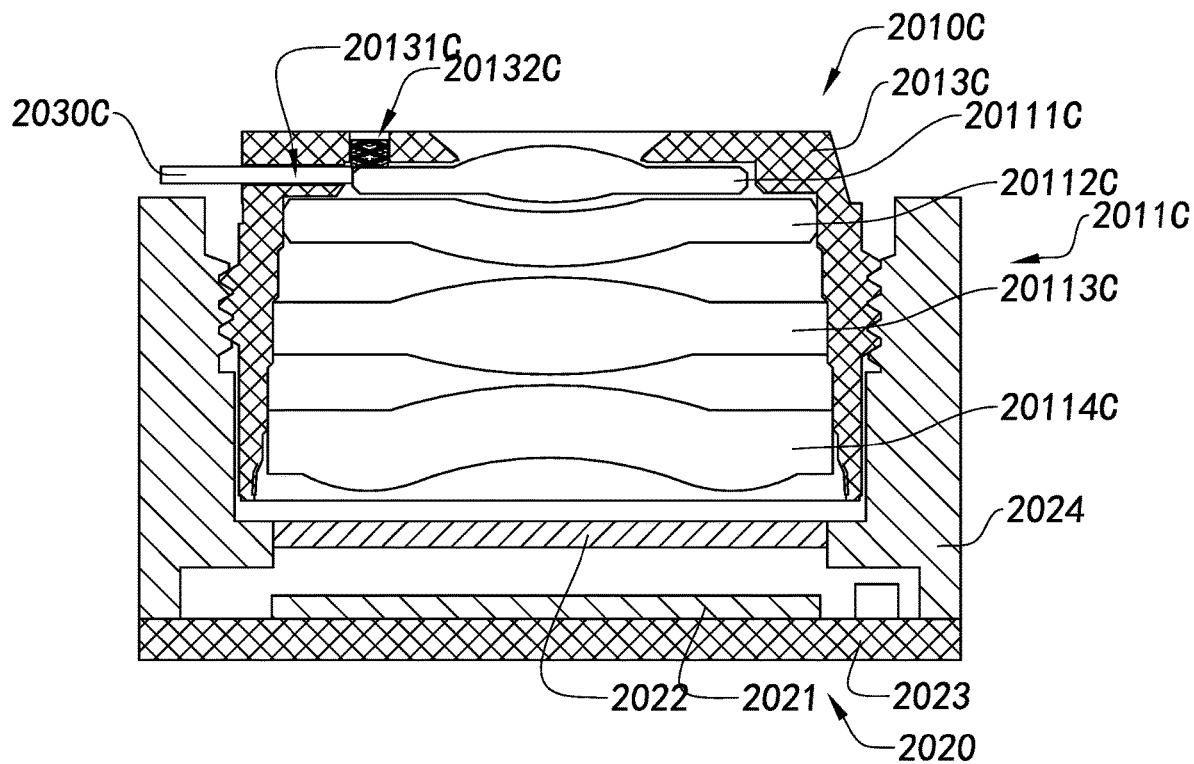
FIG. 24 is a sectional view of the camera module according to an alternative mode of the above eighth preferred embodiment of the present invention.

FIG. 24 is an alternative mode of the above eighth preferred embodiment. According to the present alternative mode, the first optical lens 20111C is affixed through an affixing channel 122C provided in a top portion of the optical structural member 2013C, wherein the adhesive 2040C is injected through the affixing channel 122C. After solidification, the top surface of the first lens 20111C is arranged to communicate with an outside environment of the optical structural member 2013C, adapted for injecting the adhesive 2040C into the affixing channel 122C from outside. Then, the first lens 20111C can be affixed when the adhesive 2040C is solidified on the surface of the first lens 20111C. Meanwhile, the solidified adhesive 2040C injected in the affixing channel 122C can also seal the affixing channel 122C.

In the present alternative mode, the first lens 20111C can be affixed both through the adjustment channel 20131C and the affixing channel 122C.

Figure 25:
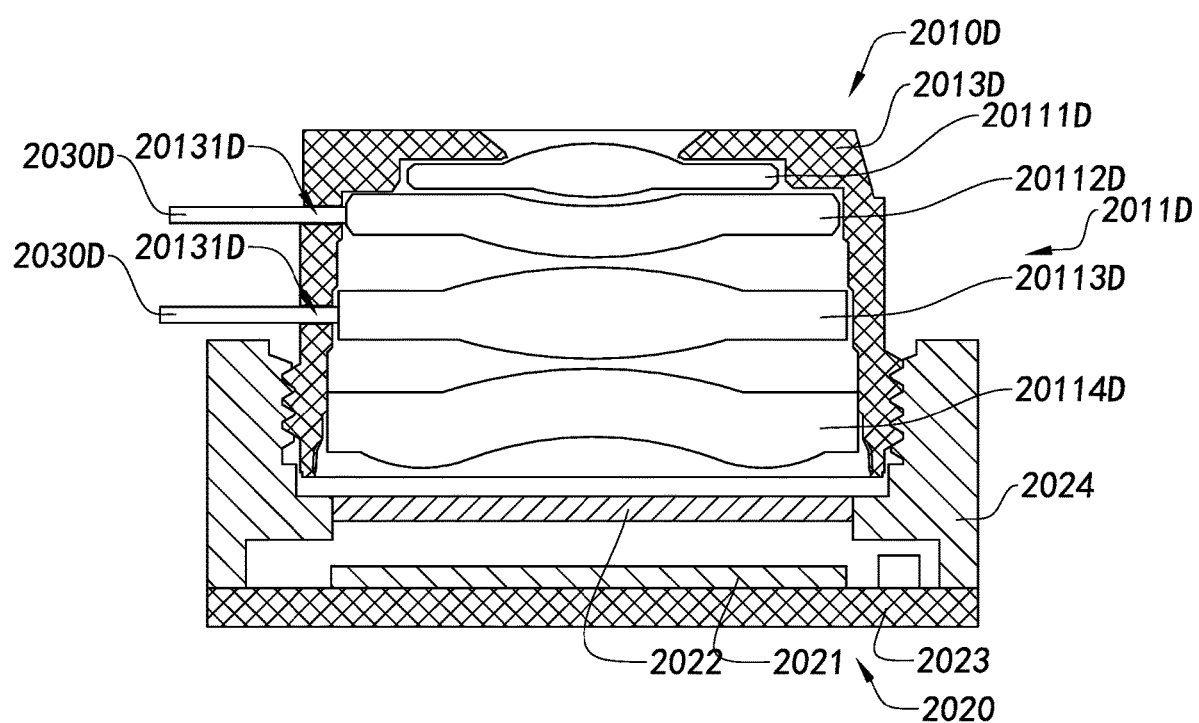
FIG. 25 is a sectional view of the camera module according to another alternative mode of the above eighth preferred embodiment of the present invention.

FIG. 25 is another alternative mode of the above eighth preferred embodiment. Referring to FIG. 25, the camera module comprises an adjustable optical lens 2010D and a photosensitive device 2020, wherein the photosensitive device 2020 is embodied the same as the above mentioned preferred embodiments and not repeatedly described in this alternative mode. The adjustable optical lens 2010D is arranged in the photosensitive path of the photosensitive device 2020.

The adjustable optical lens 2010D comprises one or more lenses 2011D and an optical structural member 2013D. The lenses are arranged in the internal space of the optical structural member 2013D along a vertical direction of the optical structural member 2013D. According to the present alternative mode, there are four optical lenses 2011D, including a first lens 20111D, a second lens 20112D, a third lens 20113D, and a optical lens 20114D, wherein the first lens 20111D and the optical lens 20114D are affixed in the optical structural member 2013D, while the second lens 20112D and the third lens 20113D are preassembled in the optical structural member 2013D to serve as adjustable lenses which are arranged in a middle portion of the optical structural member 2013D, wherein their assembling positions are suitable to be adjusted in at least one direction. The middle portion mentioned here means place other than the positions where the first lens 20111D and the fourth lens 20114D are arranged, which includes any position besides the top and bottom of the optical structural member 2013D.

At least one adjustment channel 20131D is provided in the optical structural member 2023D, which are respectively arranged at positions in the optical structural member 2013D corresponding to the second lens 20112D and the third lens 20113D. The adjustment channels 20131D communicate an internal space of the optical structural member 2013D with an external environment, adapted for an external adjustment device 2030D to be inserted into each of the adjustment channels 20131D to contact the edges of the second lens 20112D and the third lens 20113D to respectively adjust the assembling positions of the second lens 20112D and the third lens 20113D.

The external adjustment device 2030D can be embodied as a probe with electronic components and automation function to automatically record the adjusting method and calibration measurement of the adjustable lens, so as to quantitatively determine if the adjustment of the adjustable lens is accurate or to precisely adjust the adjustable lens by inputting the adjusting method and calibration measurement of the adjustable lens on the external adjustment device 2030D, such that the adjustment can be more efficient.

In the present preferred embodiment, it may optionally have a plurality of the adjustment channels 20131D arranged along the outer side of the optical structural member 2013D. The adjustment channels 20131D surrounding around the optical structural member 2013D are positioned corresponding to the adjustable lenses adapted for adjusting the adjustable lenses from various directions to ensure the accuracy of the adjustment. For instance, there may have three adjustment channels 20131D arranged along a peripheral direction of the second lens 20112D and another three adjustment channels 20131D arranged along a peripheral direction of the third lens 20113D.

After the second lens 20112D and the third lens 20113D are adjusted, they are affixed through the adjustment channels 20131D. For instance, a glue dispensing device is utilized to dispense glue or adhesive through the adjustment channels 20131D, so as to have the adhesive contacting an edge of the second lens 20112D and an edge of the third lens 20113D, such that the second lens 20112D and the third lens 20113D can be respectively affixed to an inner wall of the optical structural member 2013D. Meanwhile, the adhesive can also be injected to fill the adjustment channels 20131D to seal the adjustment channels 20131D. The adhesive is preferably a thermosetting glue, which will be solidified to affix the second lens 20112D and the third lens 20113D and seal the adjustment channels 20131D after a heating treatment.

It is worth mentioning that if the adjustable lens is preassembled through semi-solidifying the adhesive, the semi-solidifying adhesive used in the preassembling can be completely solidified in the subsequent affixing process. After the solidification, the adjustable lens will be affixed in position. Then, it may further seal the adjustment channel 20131D through external glue dispensing in the adjustment channel 20131D or further affix the adjustable lens through another glue dispensing so as to guarantee the reliability of the affixing.

It is worth mentioning that, according to the eighth preferred embodiment, the position for adjusting the adjustable lens and the position for affixing the adjustable lens may be the same position or different positions. For example, it may have a plurality of the affixing channels arranged on the outer side of the optical structural member 2013D corresponding to the position of the adjustable lens, wherein the affixing channels and the adjustment channels 20131E are spacedly arranged on the side of the optical structural member, such that the adjustable lens can both be adjusted and affixed from various directions. Certainly, one may also choose to have the adjustment channels 20131D arranged on part of the optical structural member 2013D, while the affixing channels arranged on the other part that the adjustment channels 20131D and the affixing channels are not spacedly arranged.

Figure 26:
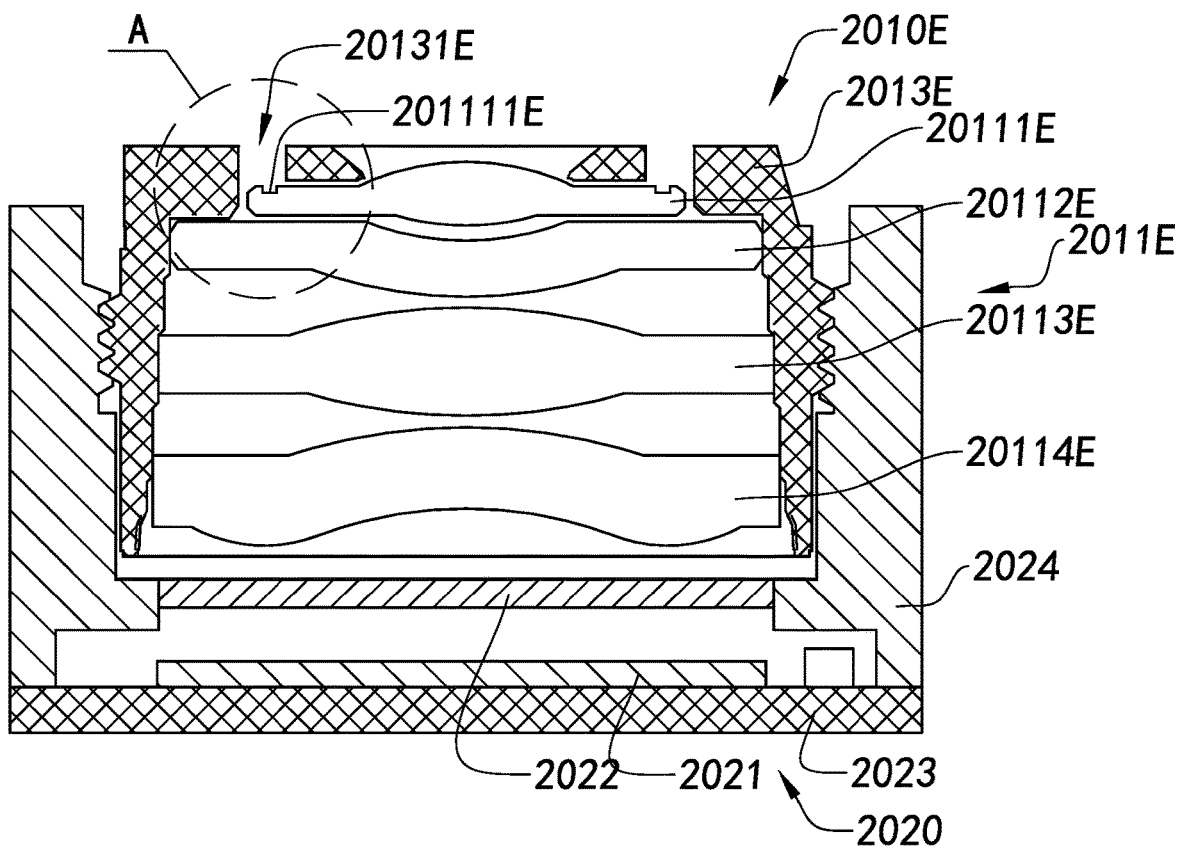
FIG. 26 is a sectional view of a manufacturing process of the camera module according to a ninth preferred embodiment of the present invention.
Figure 27:
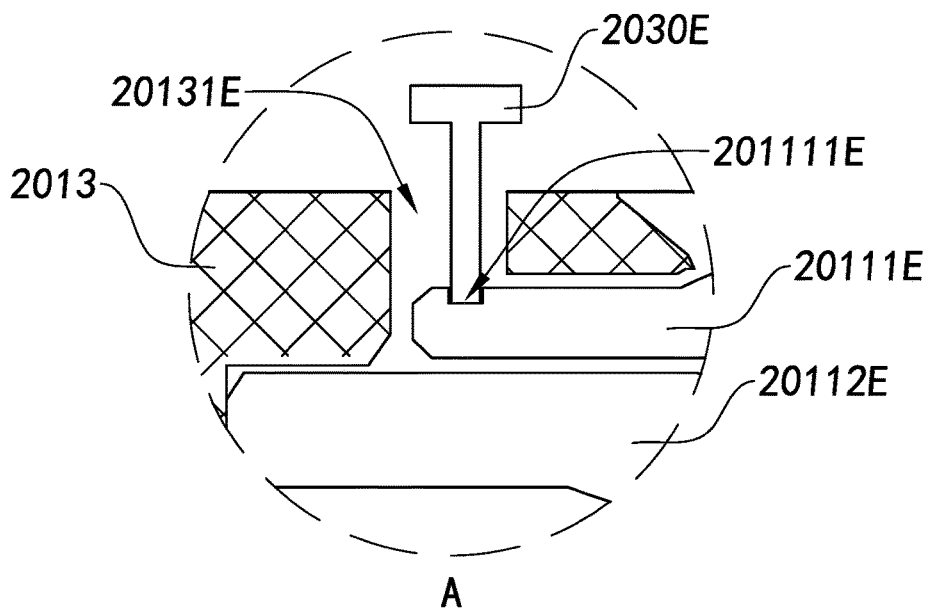
FIG. 27 is a partially enlarged view of a manufacturing process of the camera module according to the above ninth preferred embodiment of the present invention.

Referring to FIGS. 26-27, a ninth preferred embodiment of the camera module according to the present invention is illustrated. Referring to FIGS. 26-27, the camera module comprises an adjustable optical lens 2010E and a photosensitive device 2020, wherein the photosensitive device 2020 is embodied the same to the above mentioned preferred embodiments and not repeatedly described in this ninth preferred embodiment. The adjustable optical lens 2010E is arranged in a photosensitive path of the photosensitive device 2020 so as for shooting and imaging.

The adjustable optical lens 2010E comprises at least one lens 2011E and an optical structural member 2013E, wherein each lens 2011E is set and affixed in an internal space of the optical structural member 2013E along a vertical direction of the optical structural member 2013E and positioned in a photosensitive path of the optical sensor 2021.

In the ninth preferred embodiment, there are four lenses 2011E, including a first lens 20111E, a second lens 20112E, a third lens 20113E, and a fourth lens 20114E, which are arranged in the internal space of the optical structural member 2013E sequentially from top to bottom. That is, the first lens 20111E is arranged and preassembled in a top portion of the optical structural member 2013E. An assembling position of the first lens 20111E, served as an adjustable lens of ninth preferred embodiment, is adaptable to be adjusted in at least one direction, adapted for adjusting an optical path of the adjustable optical lens 2010E. After adjustment, a central axis line of the adjustable optical lens 2010E and a central axis line of the optical sensor 2021 are coincided or within an allowable range of deviance.

The optical structural member 2013E has at least an adjustment channel 20131E arranged on top of the optical structural member 2013E. According to the ninth preferred embodiment, there are two adjustment channels 20131E communicating the internal space of the optical structural member 2013E with an external environment, such that the surface of the first lens 20111E can communicate with the outside through the adjustment channel 20131E and an assembling position thereof can therefore be adjusted.

The first lens 20111E has at least two adjustment grooves 201111E arranged on a top surface thereof. The top openings of the adjustment grooves 201111E are respectively positioned corresponding to the adjustment channels 20131E being communicated with the external environment of the optical structural member 2013E through the adjustment channels 20131E. Further, the adjustment grooves 201111E are preferably arranged at the positions near by an edge of the first lens 20111E, such that they will not affect the light path of the first lens 20111E, so as to ensure the imaging of the camera module.

To adjust an assembling position of the first lens 20111E, an external adjustment device 2030E is inserted into the adjustment channel 20131E to contact the first lens 20111E. The external adjustment device 2030E is inserted to reach the adjustment groove 201111E to grab the first lens 20111E through the adjustment groove 201111E and to adjust at least one of the horizontal position, vertical position, tilt position, and peripheral position of the first lens 20111E, such that the optical path of the adjustable optical lens 2010E can be adjusted to make the camera module meeting the resolution requirement.

After the first lens 20111E is optically adjusted, it has to be permanently affixed so as to complete the assembling of the adjustable optical lens 2010E. In the ninth preferred embodiment, the affixing position and the adjustment position are the same position adjacent to the adjustment channel 20131E. Specifically, an adhesive is injected into the adjustment channel 20131E through a dispensing device. The adhesive in a liquid state or semi-solidified state that can flow onto the side or top surface of the first lens 20111E through the adjustment channel 20131E. Then, the first lens 20111E can be permanently affixed in the optical structural member 2013E after the adhesive is solidified through a heating treatment. Optionally, more adhesive can be injected to fill the adjustment channel 20131E so as to affix the first lens 20111E and seal the adjustment channel 20131E at the same time.

It is worth mentioning that the number of the adjustment channel 20131E and the adjustment groove 201111E may vary, which shall not limit the scope of the present invention. Extra affixing channel may also be arranged in the optical structural member 2013E for affixing the adjustable lens, wherein the position of the affixing channel may also be different from the position of the adjustment channel 20131E.

Figure 31:
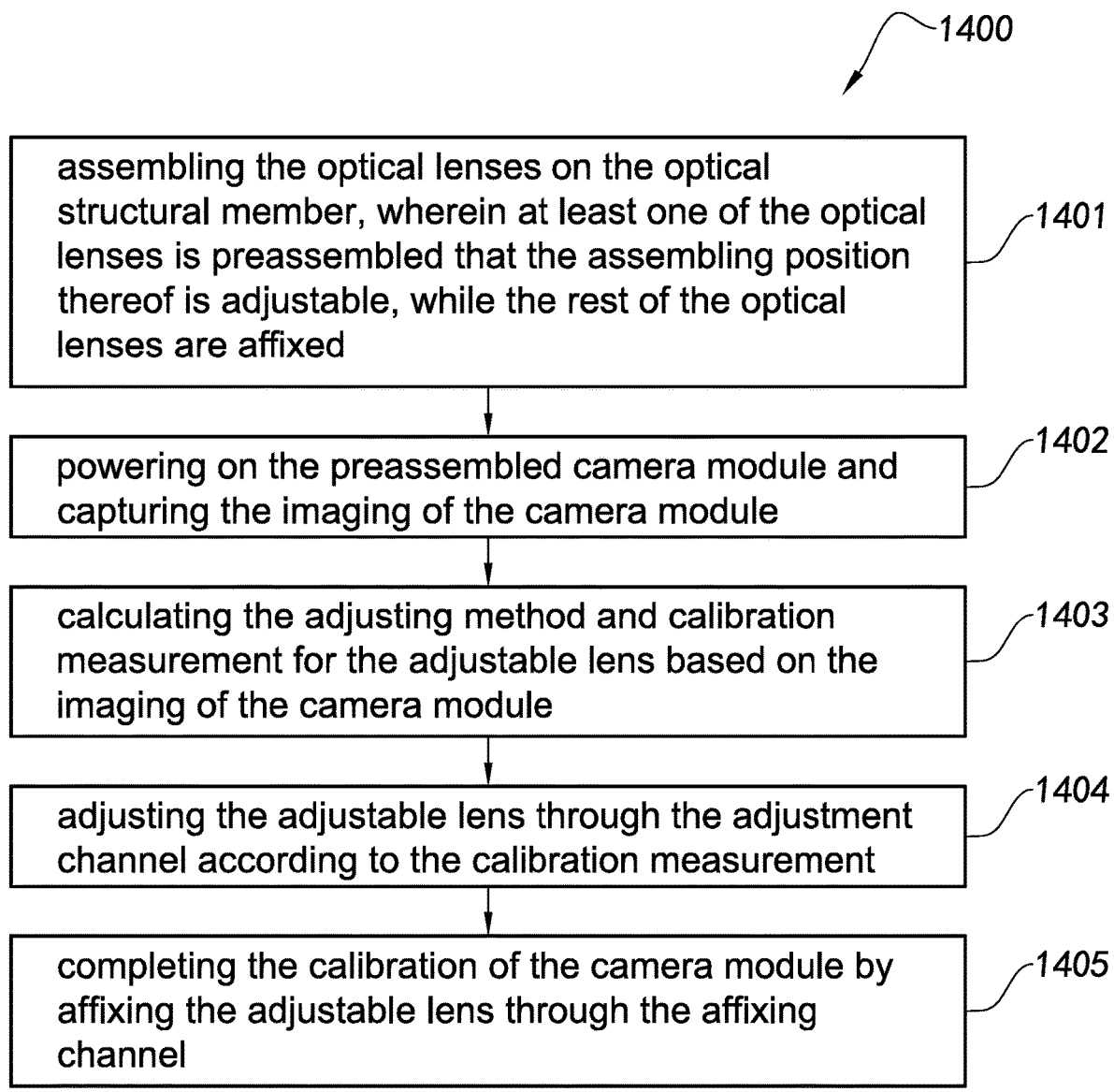
FIG. 31 is a flow diagram of an calibration method of the camera module according to the above sixth to tenth preferred embodiments of the present invention.

Referring to FIG. 31, a calibration method of the camera module according to the above preferred embodiments of the present invention is illustrated, wherein the calibration method 1400 of the camera module includes the following steps:

step (1401): assembling the lenses in the optical structural member, wherein at least one of the lenses is preassembled that the assembling position thereof is arranged to be adjustable, while the rest of the lenses are affixed in position;

step (1402): powering on the preassembled camera module and capturing the imaging of the camera module;

step (1403): calculating the adjusting method and calibration measurement for the adjustable lens based on the imaging of the camera module;

step (1404): adjusting the adjustable lens through the adjustment channel according to the calibration measurement; and step (1405): completing the calibration of the camera module by affixing the adjustable lens through the adjustment/affixing channel;

In the step (1401), one or more lenses is arranged to serve as the adjustable lens, wherein the adjustable lens will not be affixed so as to be adjusted in the subsequent process.

In the step (1404), the adjustable lens is adjusted by utilizing the external adjustment device through the adjustment channel of the optical structural member, wherein the adjustment channel may be arranged in a top or side portion of the optical structural member, which may refer to the above preferred embodiments and the alternative modes thereof for specific information.

In the step (1405), the adjustable lens may also be affixed through the affixing channel arranged in the optical structural member or the adjustment channel. In other words, the positions for affixing and adjusting the adjustable lens can be the same or different. The adhesive for affixing may function through contacting the side or top surface of the adjustable lens, which may refer to the above preferred embodiments and the alternative modes thereof for specific information.

Figure 28:
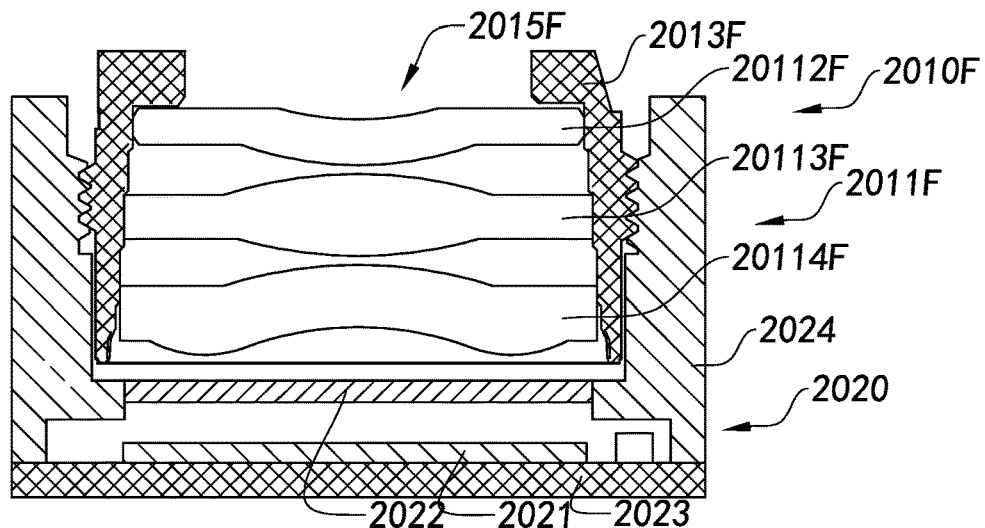
FIGS. 28-30 are sectional views of the camera module in the assembling process according to a tenth preferred embodiment of the present invention.
Figure 29:
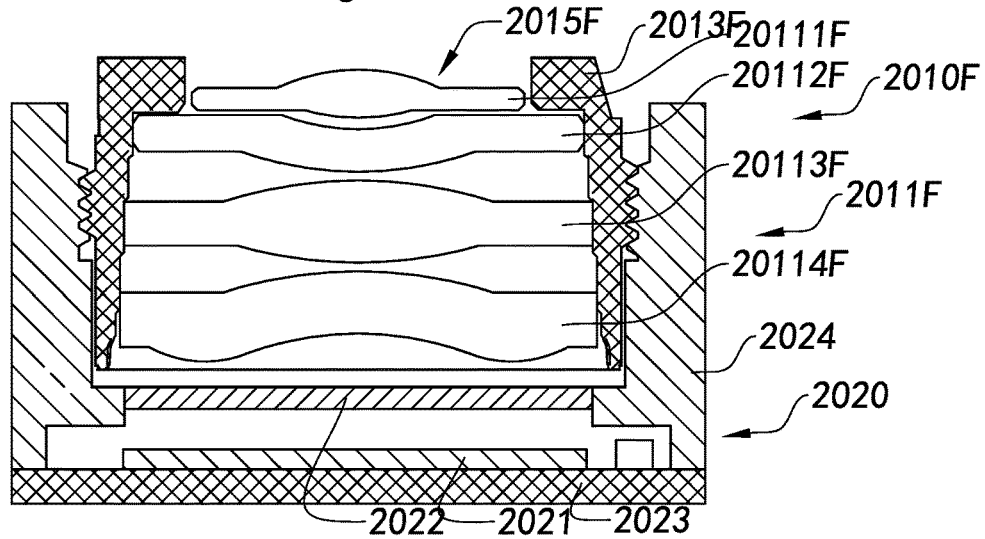
Figure 30:
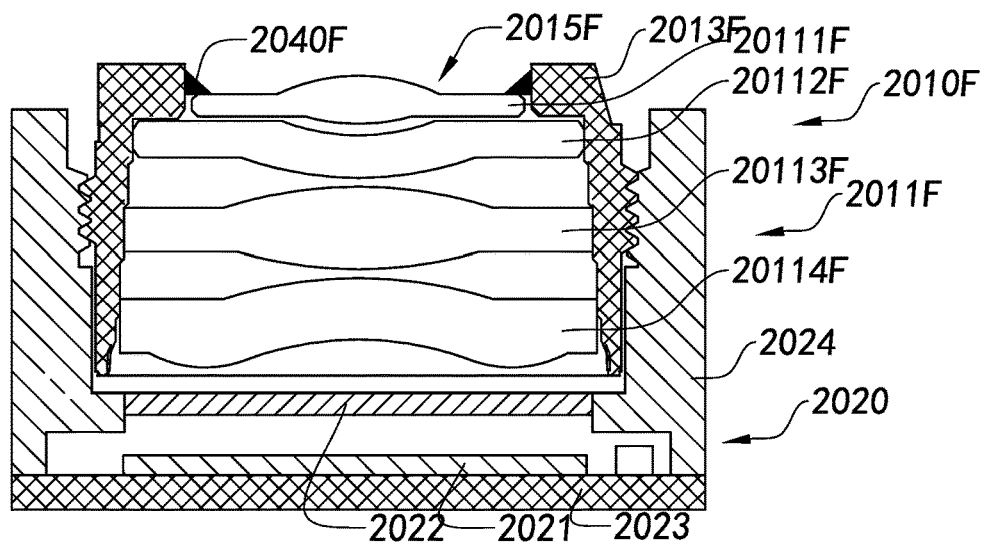

Referring to FIGS. 28-30, 32, a tenth preferred embodiment of the camera module and its calibration method according to the present invention are illustrated. Referring to FIGS. 28-30, the camera module comprises an adjustable optical lens 2010F and a photosensitive device 2020, wherein the photosensitive device 2020 is embodied the same to the above mentioned preferred embodiment and not repeatedly described in this tenth preferred embodiment. The adjustable optical lens 2010F is arranged in a photosensitive path of the photosensitive device 2020 adapted for shooting and imaging.

The adjustable optical lens 2010F comprises at least one lens 2011F and an optical structural member 2013F, wherein each lens 2011F is set and affixed in an internal space of the optical structural member 2013F along a vertical direction of the optical structural member 2013F and positioned in a photosensitive path of the optical sensor 2021.

In the tenth preferred embodiment, there are four lenses 2011F, including a first lens 20111F, a second lens 20112F, a third lens 20113F, and a fourth lens 20114F, which are arranged in an internal space of the optical structural member 2013F sequentially from top to bottom. In which, the first lens 20111F is arranged and preassembled in a top portion of the optical structural member 2013F. An assembling position of the first lens 20111F, serving as an adjustable lens of the tenth preferred embodiment, is adaptable to be adjusted in at least one direction, adapted for adjusting an optical path of the adjustable optical lens 2010F. After adjustment, a central axis line of the adjustable optical lens 2010F and a central axis line of the optical sensor 2021 are coincided or within an allowable range of deviance.

After the adjustment, the assembling of the adjustable optical lens 2010F will be completed when the first optical lens 20111F is permanently affixed.

Figure 32:
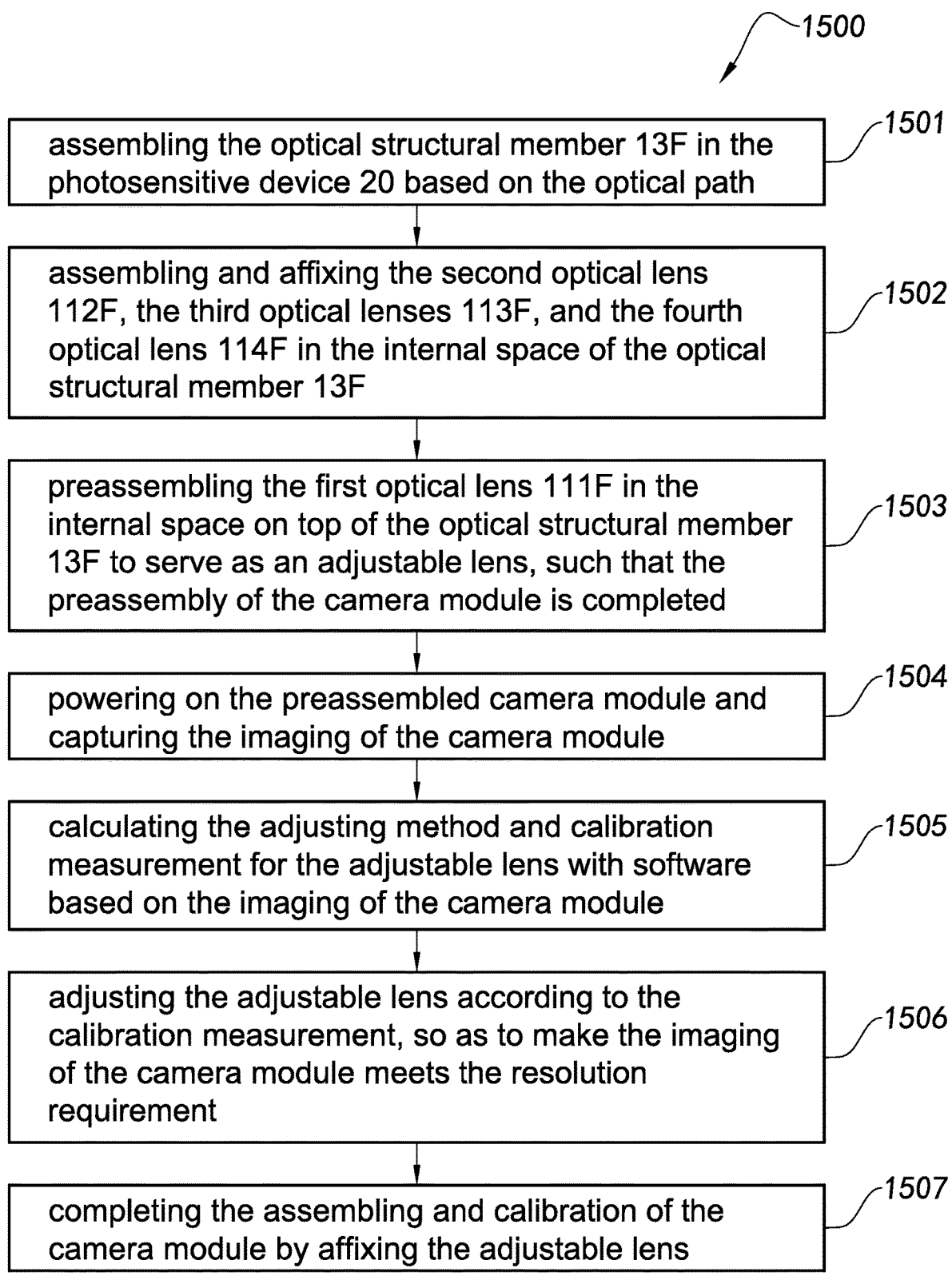
FIG. 32 is a flow diagram of an calibration method of the camera module according to the above tenth preferred embodiment of the present invention.

Referring to FIG. 32, a calibration method 1500 of the camera module comprises the following steps:

step (1501): assembling the optical structural member 2013F and the photosensitive device 2020 based on the optical path thereof;

step (1502): assembling and affixing the second lens 20112F, the third lenses 20113F, and the fourth lens 20114F in the internal space of the optical structural member 2013F;

step (1503): preassembling the first lens 20111F in the internal space on top of the optical structural member 2013F to serve as the adjustable lens, such that the preassembly of the camera module is completed;

step (1504): powering on the preassembled camera module and capturing the imaging of the camera module;

step (1505): calculating the adjusting method and calibration measurement for the adjustable lens with the software based on the imaging of the camera module;

step (1506): adjusting the adjustable lens according to the calibration measurement, so as to make the imaging of the camera module meeting the resolution requirement; and step (1507): completing the assembling and calibration of the camera module by affixing the adjustable lens;

In the step (1502), the second lens 20112F, the third lenses 20113F, and the fourth lens 20114F can either be assembled in the optical structural member 2013F one by one or be integrated into a whole unit to be assembled in the optical structural member 2013F;

In the step (1503), the first lens 20111F is arranged in the internal space on top of the optical structural member 2013F, positioned above the second lens 20112F, and preassembled as the adjustable lens, such that the assembling position thereof can be adjusted in the subsequent process. The adjustment of the adjustable lens is adaptable to be conducted from the top of the optical structural member 2013F, which does not require an adjustment channel that is particularly arranged. Hence, the working procedure is more simple.

In the step (1506), because the adjustable lens is located in the internal space formed on top of the optical structural member 2013F, the adjustable lens can be directly contacted and adjusted via the position of the light incident channel 2015F provided on top of the optical structural member 2013F. It is adaptable to utilize a device to enter from the top of the optical structural member 2013F to contact the adjustable lens during the adjustment. Then, the adjustable lens can be adjusted by means of tool clamping or vacuum suctioning.

In the step (1507), the adhesive 2040F, optionally a thermosetting glue, is injected through the light incident channel 2015F provided on top of the optical structural member 2013F after the adjustment to affix the first optical lens 20111F after the adhesive 2040F is solidified. It does not require having any affixing channel particularly arranged, such that the structure can become more simple. For instance, the adjustable lens can be affixed to the inner wall of the optical structural member 2013F through dispensing adhesive to the edge of the adjustable lens and solidifying the adhesive by heat treatment.

It is worth mentioning that the adjustable lens can directly be preassembled in the optical structural member 2013F through being placed on a loading portion arranged in the optical structural member 2013F or through the semi-solidified adhesive, which can prevent the adjustable lens from offset much and allow it to be adjusted in the subsequent process, such that the adjustment extent can be reduced, the adjustment frequency can be decreased, and the calibration efficiency can be increased.

Figure 33:
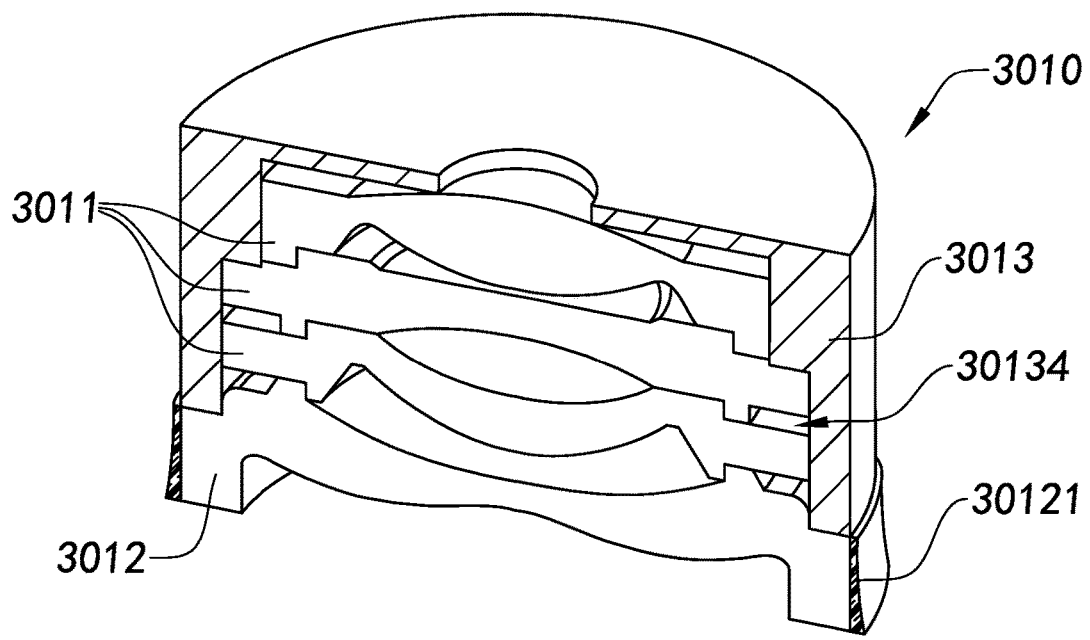
FIG. 33 is a perspective structural view of a lens of a camera module according to an eleventh preferred embodiment of the present invention.
Figure 34:
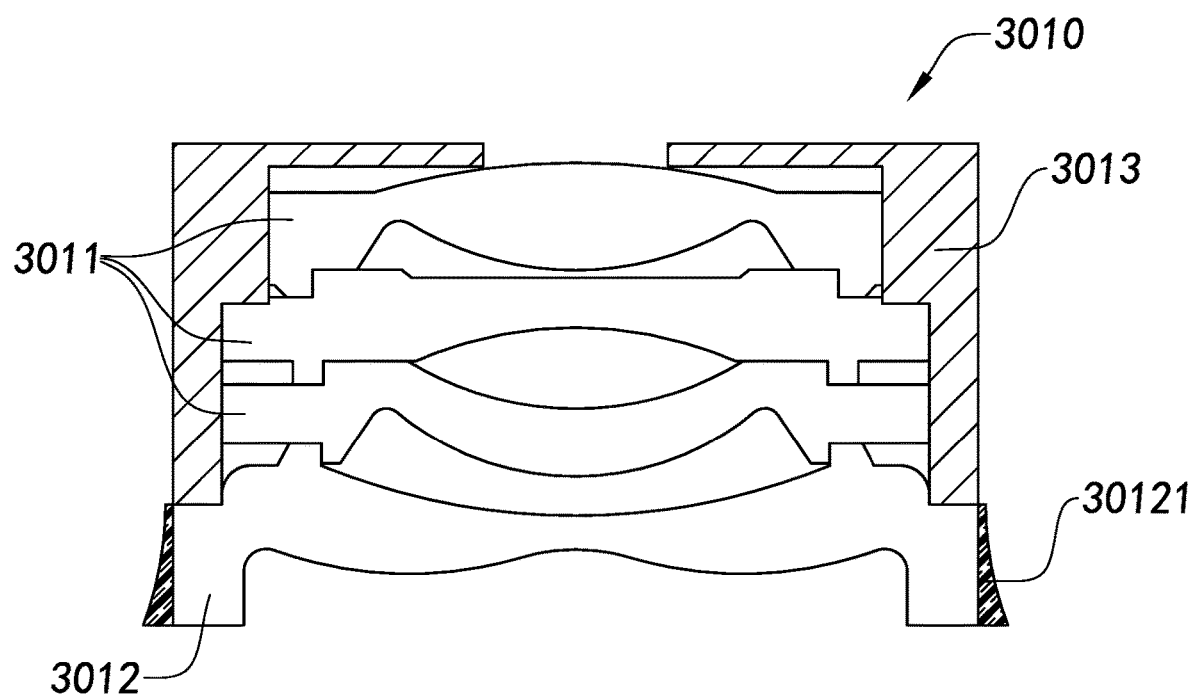
FIG. 34 is a sectional view of a manufacturing process of the camera module lens according to the above eleventh preferred embodiment of the present invention.

Referring to FIGS. 33-34, an eleventh preferred embodiment of the camera module lens according to the present invention is illustrated. Referring to FIGS. 33-34, the camera module lens 3010 comprises one or more internal lenses 3011, one or more external lenses 3012, and a lens cone component 3013. The internal lenses 3011 are arranged in an interior of the lens cone component 3013 along a vertical direction of the lens cone component 3013. The external lenses 3012 are arranged in the exterior of the lens cone component 3013, such as an external space of a top or bottom of the lens cone component 3013, along the vertical direction of the lens cone component. The external lens(es) 3012 and the internal lens(es) 3011 are arranged in the same optical path of the camera module lens 3010, while the external lens 3012 is not contained in the interior of the lens cone component 3013.

According to the eleventh preferred embodiment, there are three internal lenses 3011 embedded and integrated with one another, which are then affixed in an accommodating cavity 30131 of the lens cone component 3013, wherein adjacent internal lenses 3011 are connected with each other by spacer ring. An edge of the internal lenses 3011 can be processed, such as applied with glue, so as to orderly bind and integrate the internal lenses 3011 through the painted glue without using structural elements like spacer ring or the like. A lens unit is formed by assembling the internal lenses 3011. Then the internal lenses 3011 are treated as a whole to be installed in the lens cone component 3013 and affixed. In such situation, the requirements of the machining precision of the lens cone component 3013 and the assembling accuracy among the internal lenses 3011 and the lens cone component 3013 will be lower, which helps to reduce the production cost. Besides, it reduces the assembling procedure, shortens the assembling tolerance chain, saves the assembling time, and increases product yield and efficiency.

In the eleventh preferred embodiment, there is only one piece of the external lens 3012, wherein the external lens 3012 is installed on a bottom of the lens cone component 3013, wherein an edge of the external lens 3012 and the bottom of the lens cone component 3013 are connected. According to the eleventh preferred embodiment, an adhesive is applied on an edge of a top surface of the external lens 3012 and a bottom surface of the lens cone component 3013 so as to affixedly connect them together while the external lens 3012 is positioned corresponding to the internal lenses 3011 in an optical path of the camera module lens 3010.

While the lens cone component 3013 is a conventional black lens barrel, it can both block external light from entering the internal of the camera module lens 3010 from positions besides light incident channel and avoid light entered via the light incident channel from leaking from the internal of the camera module lens 3010. Besides, the external lens 3012 is not arranged in the lens cone component 3013. Therefore, the present invention further provides a shading layer 30121 arranged on an outer side of the external lens 3012. The shading layer 30121 has to completely cover the entire side of the external lens 3012 so as to avoid light leakage of the camera module lens 3010 and prevent external stray light from entering the camera module lens 3010, such that the imaging quality of the camera module lens 3010 can be ensured.

According to other embodiment of the present invention, as for the camera module lens 3010, there may not have the shading layer 30121 arranged on the outer side of the external optical lens 3012. In other words, the camera module lens 3010 may comprise the external lens 3012 without the shading layer. Nonetheless, because the shading layer 30121 may still be arranged in the subsequent process, the shading layer 30121 may not necessary for the camera module lens 3010.

After the camera module lens 3010 has been mounted on the camera module, in order to ensure the imaging quality of the camera module, the shading layer 30121 is arranged on the external lens 3012 assembled in the camera module. It may also arrange the shading layer 30121 on the outer side of the external lens 3012 of the camera module lens 3010 during the assembling of the camera module and have the camera module lens 3010 with the shading layer 30121 arranged be assembled with the photosensitive device to make the camera module.

In short, the camera module lens 3010 may or may not include the shading layer 30121.

If the camera module lens 3010 comprises the shading layer 30121, the options of the arrangement moment of the shading layer 30121 may include the following three steps:

(1) arranging the shading layer 30121 on the outer side of the external optical lens 3012 beforehand and assembling the external optical lens 3012 on the camera module lens 3010;

(2) arranging the shading layer 30121 after the external optical lens 3012 was assembled on the camera module lens 3010; and (3) arranging the shading layer 30121 on the outer side of the external optical lens 3012 after the photosensitive device and the camera module lens 3010, without the shading layer 30121, were assembled into the camera module.

Preferably, the shading layer 30121 is arranged by applying black glue on the outer side of the external optical lens 3012, wherein the black glue can be a thermosetting glue that becomes the shading layer 30121 after solidified.

Figure 35:
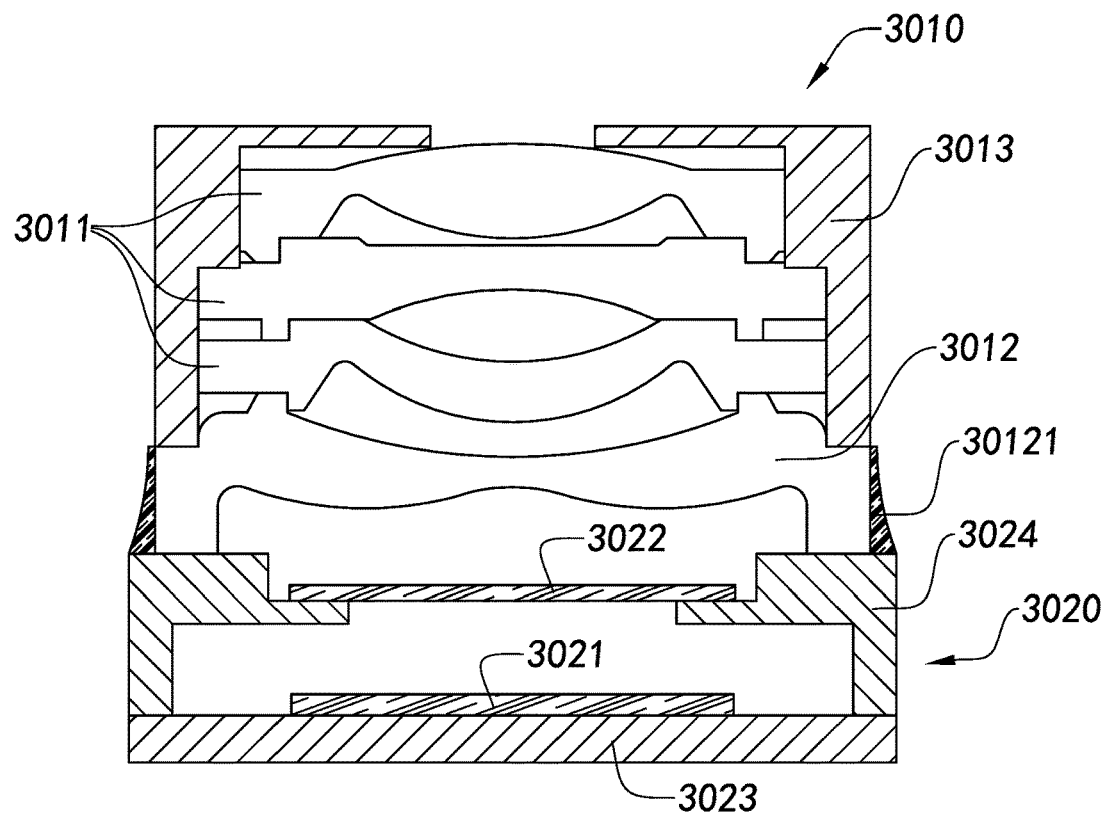
FIG. 35 is a sectional view of a manufacturing process of the camera module according to the above eleventh preferred embodiment of the present invention.

Referring to FIG. 35, a camera module comprising the above mentioned camera module lens 3010 is illustrated. Referring to FIG. 35, the camera module comprises the camera module lens 3010 and an photosensitive device 3020, wherein the photosensitive device 3020 comprises an optical sensor 3021. The camera module lens 3010 is arranged along a photosensitive path of the optical sensor 3021 that lights reflected from an object can enter an inside of the camera module through the camera module lens 3010 and be received by the optical sensor 3021 to proceed photoelectric conversion, so that images respective to the object can be subsequently captured by the camera module.

The photosensitive device 3020 further comprises a filter 3022, a circuit board 3023, and a lens mount 3024. The filter 3022 is mounted in the lens mount 3024 and arranged above the optical sensor 3021. The optical sensor 3021 is attached on the circuit board 3023. The circuit board 3023 is mounted on a bottom of the lens mount 3024 so as to have the optical sensor 3021 located in a cavity defined in an internal of the lens mount 3024. Besides, the optical sensor 3021 keeps a distance from the lens mount 3024. In other word, they do not contact with each other. The photosensitive device 3020 is manufactured with chip on board (COB) technology.

The external lens 3012 is arranged between the lens cone component 3013 and the lens mount 3024. Namely, the edge of the top surface of the external lens 3012 is connected with the bottom surface of the lens cone component 3013 and the edge of the bottom surface of the external optical lens 3012 is connected with the top surface of the lens mount 3024, leant on the lens mount 3024, and supported by the lens mount 3024. Meanwhile, the internal lenses 3011 and the external lenses 3012 are all arranged in the photosensitive path of the optical sensor 3021.

The external lens 3012 is arranged on the outside of the lens cone component 3013 and leant on the lens mount 3024, such that a distance between the camera module lens 3010 and the optical sensor 3021 can be decreased and a shorter back focal length of the camera lens can be achieved. Camera module made with such camera module lens has better imaging quality and significantly lower cost.

Figure 36:
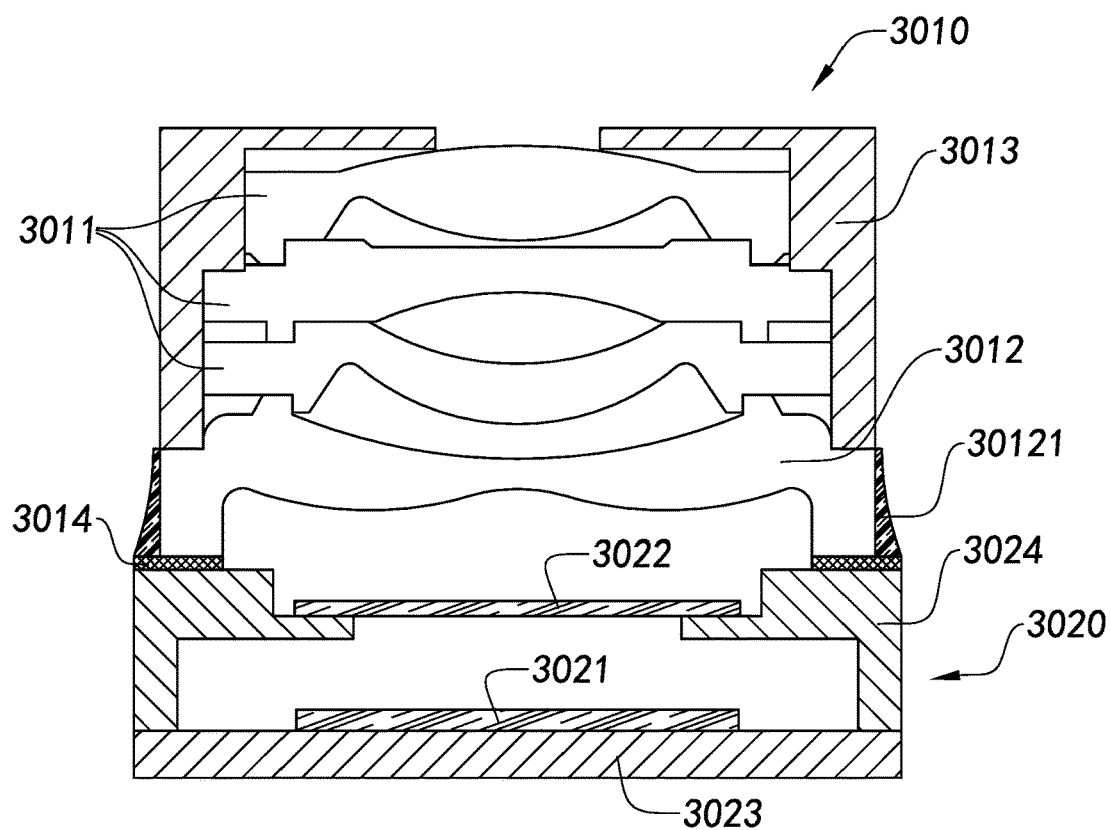
FIG. 36 is a perspective view of an assembling method of the camera module according to the above first preferred embodiment of the present invention.
Figure 42:
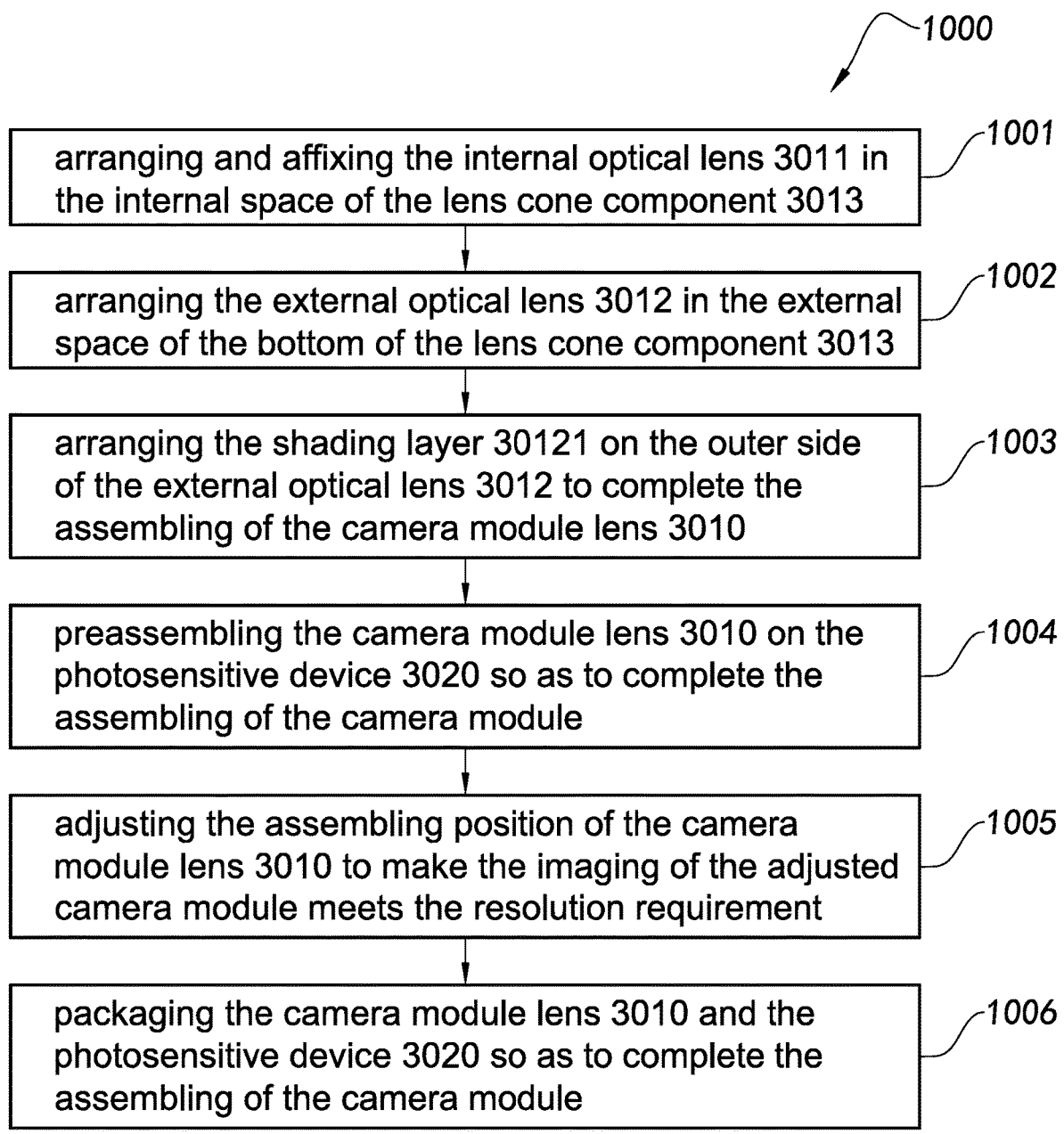
FIG. 42 is a flow diagram of a assembling method of the camera module according to the above first preferred embodiment of the present invention.

Referring to FIGS. 36 and 42, an assembling method of the camera module is illustrated. The assembling method 1000 of the camera module comprises the following steps:

step (1001): arranging and affixing the internal lens 3011 in the internal space of the lens cone component 3013;

step (1002): arranging the external lens 3012 in the external space of the bottom of the lens cone component 3013;

step (1003): arranging the shading layer 30121 on the outer side of the external lens 3012 to complete the assembling of the camera module lens 3010;

step (1004): preassembling the camera module lens 3010 on the photosensitive device 3020 so as to complete the assembling of the camera module;

step (1005): adjusting the assembling position of the camera module lens 3010 to make the imaging of the adjusted camera module meeting the resolution requirement; and step (1006): packaging the camera module lens 3010 and the photosensitive device 3020 so as to complete the assembling of the camera module.

The step (1001) to step (1003) are the assembling steps of the camera module lens 3010.

In the step (1001), the internal lenses 3011 can be affixed in the internal space of the lens cone component 3013 one by one or be embedded and integrated into a whole lens unit to be affixed in the internal space of the lens cone component 3013.

In the step (1002) and step (1003), black glue is also applied on the juncture of the lens cone component 3013 and the external lens 3012 when it is applied on the outer side of the external lens 3012 for making the shading layer 30121, such that it is able to not only form the shading layer 30121, but also connect the external lens 3012 and the lens cone component 3013, that reduces assembling steps, saves time, increases product yield efficiency, and lowers the cost. Certainly, the shading layer 30121 can also be arranged by applying black glue on the outer side of the external optical lens 3012 after the external lens 3012 and the lens cone component 3013 are connected. Depending on the actual situation, the shading layer 30121 can selectively be arranged on the external lens 3012 before or after it was assembled.

Further, it may also apply adhesive on the edge of the top surface of the external lens 3012 or the bottom surface of the lens cone component 3013 to connect them. Besides, the external lens 3012 and the lens cone component 3013 can either be affixingly connected or not when they are preassembled, such that the assembling positions of the lens cone component 3013 and the external lens 3012 are adaptable to be adjusted place at least one direction in the subsequent process.

In the step (1004), adhesive is applied on the edge of the bottom surface of the external lens 3012 or the top surface of the lens mount 3024, so as to affixedly connect the external lens 3012 and the lens mount 3024 with the adhesive 3040. The adhesive 3040 is preferably a thermosetting glue. The external lens 3012 and the optical sensor 3021 can also be preassembled, so that their relative assembling positions are adaptable to be adjusted in at least one direction.

In the above steps, the adhesive for preassembling is suitably a mixed adhesive of a UV glue and a thermosetting glue. The adhesive forms a semi-solidified condition after ultraviolet exposure to implement the preassembling. In addition, the semi-solidified adhesive will be completely solidified through a heating treatment, such that the external lens 3012 can be affixed on the lens mount 3024 and the lens cone component 3013.

In the step (1005), the adjustment of the camera module lens 3010 can be conducted through adjusting the external lens 3012 and/or the lens cone component 3013, which means the optical path of the camera module lens 3010 can be adjusted so as to make the central axis line of the camera module lens 3010 and the central axis line of the optical sensor 3021 being coincided or within an allowable range of deviance, such that imaging of the camera module can meet the expected resolution requirement.

The camera module can be calibrated according to the following three ways through the preassembling of the external lens 3012 in the above assembling method:

(1) Calibrate the camera module by adjusting the assembling position of the lens cone component 3013, which means to adjust the internal lenses 3011 affixed in the internal space of the lens cone component 3013 through adjust the lens cone component 3013. In other words, the external lenses 3012 are affixedly connected with the lens mount 3024, but preassembled with the lens cone component 3013 under this condition.

(2) Calibrate the camera module respectively through adjusting the lens cone component 3013 and the external lens 3012. The external lens 3012 and the lens cone component 3013 are both preassembled with the lens mount 3024 under this condition.

(3) Calibrate the camera module through adjusting the lens cone component 3013 and the external lens 3012 at the same time, which means to calibrate the camera module through adjusting the camera module lens 3010. Namely, the external lens 3012 is affixedly connected with the lens cone component 3013, but preassembled with the lens mount 3024 under this condition.

The step (1005) comprises the following steps:

step (10051): powering on the preassembled camera module and capturing the imaging of the camera module;

step (10052): calculating the adjusting method and calibration measurement of the camera module lens 3010, including the adjusting method and calibration measurement for the external optical lens 3012 and/or the adjusting method and calibration measurement for the lens cone component 3013, by software and photology based on the imaging of the camera module; and step (10053): precisely adjusting the assembling position of the camera module lens 3010 according to the calibration measurement.

In the step (1006), after the preassembled camera module is adjusted, adhesive, such as thermosetting glue, is dispensed between the external lens 3012 and the lens cone component 3013 and between the external lens 3012 and the lens mount 3024 and solidified, so as to fix the preassembled external lens 3012 and complete the assembling of the camera module.

Besides, the external lens 3012 may directly be affixed between the lens cone component 3013 and the lens mount 3024. That is, the camera module lens 3010 is affixed on the photosensitive device 3020. After it was affixed, assembling of the camera module will be completed, that does not allow further adjustment. Nevertheless, there will be tolerance on the optical back focal length of the prime lens module under this assembling way, which will cause unstable quality on the module. As a result, the optical back focal length has to be adjusted again for every module.

Figure 37:
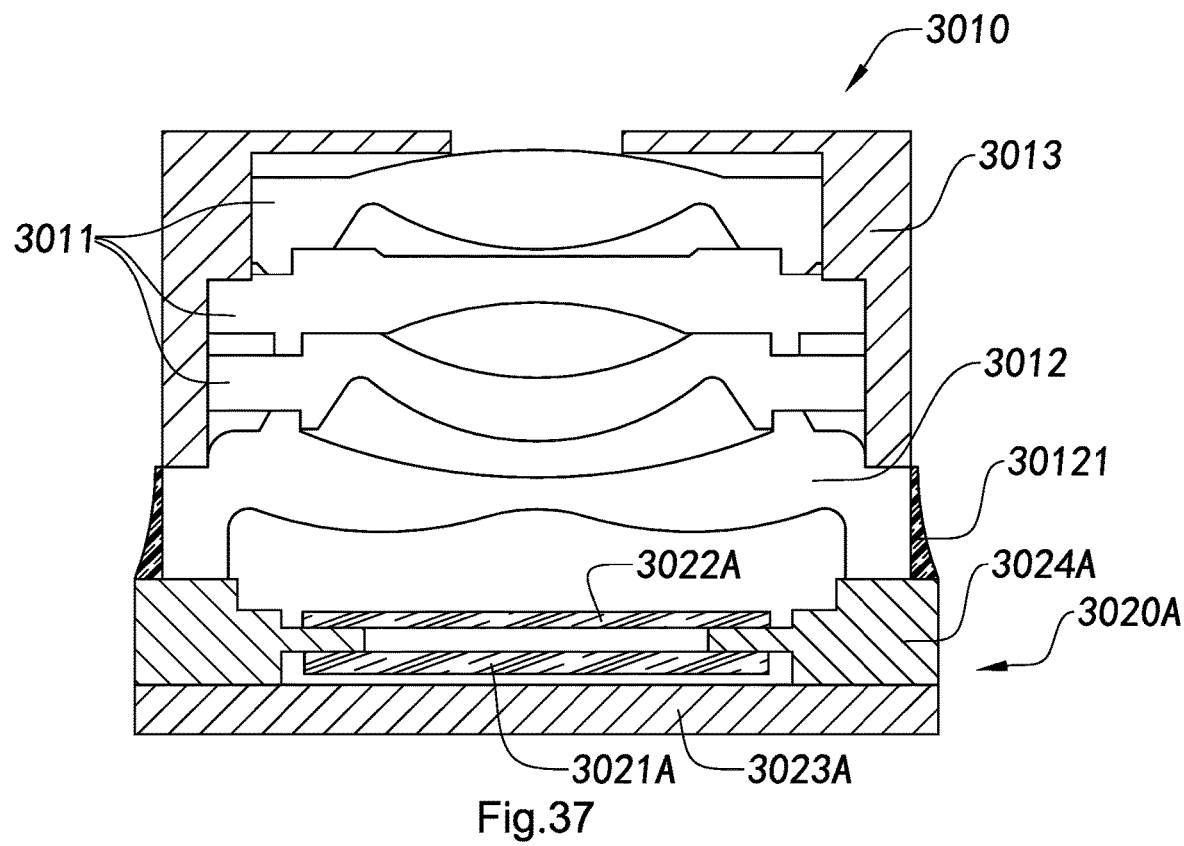
FIG. 37 is a perspective view of the camera module according to an alternative mode of the above eleventh preferred embodiment of the present invention.

Referring to FIG. 37, another camera module comprising the above mentioned camera module lens 3010 is illustrated. Referring to FIG. 37, the camera module comprises the camera module lens 3010 and a photosensitive device 3020A, wherein the photosensitive device 3020A comprises an optical sensor 3021A. The camera module lens 3010 is arranged along a photosensitive path of the optical sensor 3021A that lights reflected from an object can enter an inside of the camera module through the camera module lens 3010 and be received by the optical sensor 3021A to proceed photoelectric conversion, so that images respective to the object can be subsequently captured by the camera module.

The photosensitive device 3020A further comprises a filter 3022A, a circuit board 3023A, and a lens mount 3024A. The photosensitive device 3020A is made with flip chip technology and located on a bottom of the lens mount 3024A to be connected with the lens mount 3024A directly. The optical sensor 3021A and the filter 3022A are respectively located on a top and bottom of an inner wall of the lens mount 3024A that has a protruded platform. The optical sensor 23A is spaced from the circuit board 3023A. The lens mount 3024A has electronic functions to ensure imaging of the camera module.

The height of the photosensitive device 3020A is shorter according to the present alternative mode, which not only satisfies the assembling requirement of the short back focal length module, but further shorten the assembling tolerance chain, such that the tolerance of the relative assembling positions of the optical sensor 3021A and the camera module lens 3010 can be minimized and the assembling accuracy can therefore be increased. It also helps to reduce the limitation on the back focal length of the camera module and allows the height of the module to be further decreased, that is helpful for developing compact camera module. In addition, because the optical sensor 3021A is directly arranged on the lens mount 3024A without attaching on the circuit board 3023A, it can eliminate the influence of uneven circuit board to the optical sensor 3021A, so as to further guarantee the imaging quality of the camera module.

Figure 38:
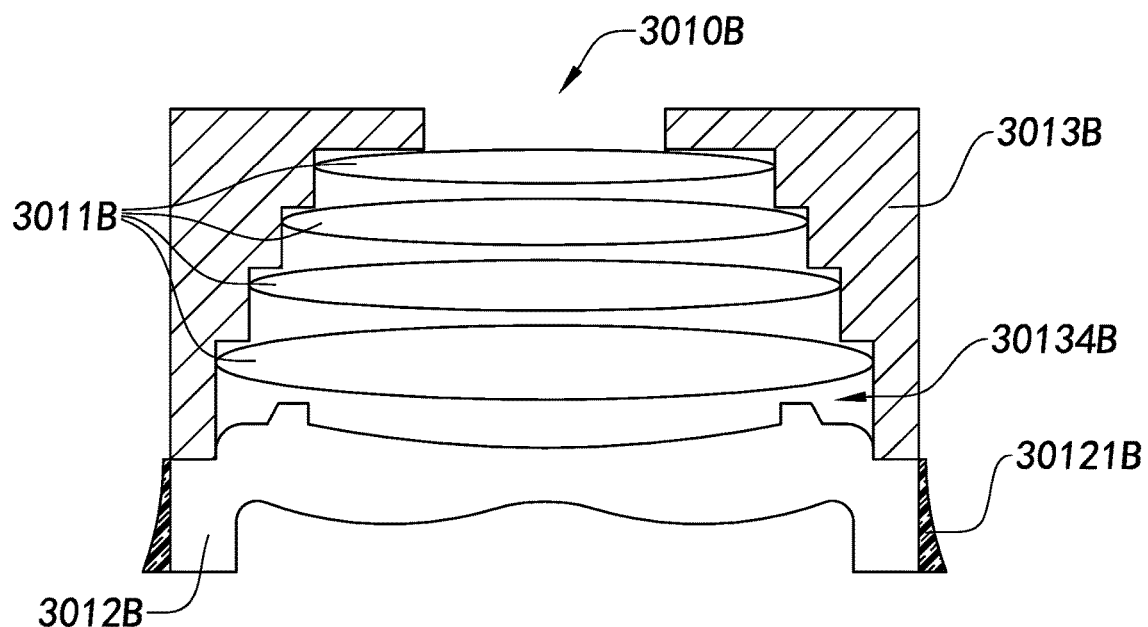
FIG. 38 is a perspective view of the camera module lens according to an alternative mode of the above eleventh preferred embodiment of the present invention.

Referring to FIG. 38, an alternative mode of the camera module lens according to the present invention is illustrated. Referring to FIG. 38, the camera module lens 3010B comprises four internal lenses 3011B, one external lens 3012B, and a lens cone component 3013B. The internal lenses 3011B are arranged in an accommodating cavity 30131B of the lens cone component 3013B along a vertical direction of the lens cone component 3013B. The external lens 3012B is affixed on a bottom of the lens cone component 3013B. The internal lenses 3011B and the external lens 3012B are aligned in an optical path of the camera module lens 3010B.

The internal lenses 3011B are orderly and successively affixed in an internal space of the lens cone component 3013B, wherein it utilizes spacer ring to connect and fasten among the internal lenses 3011B and the lens cone component 3013B.

The external lens 3012B has a shading layer 30121B arranged on an edge thereof. The shading layer 30121B is formed by applying black glue on an outer side of the external lens 3012B. The black glue is preferably a thermosetting glue. The shading layer 30121B completely covers an entire side of the external lens 3012B so as to avoid light leakage of the camera module lens 3010B.

Figure 39:
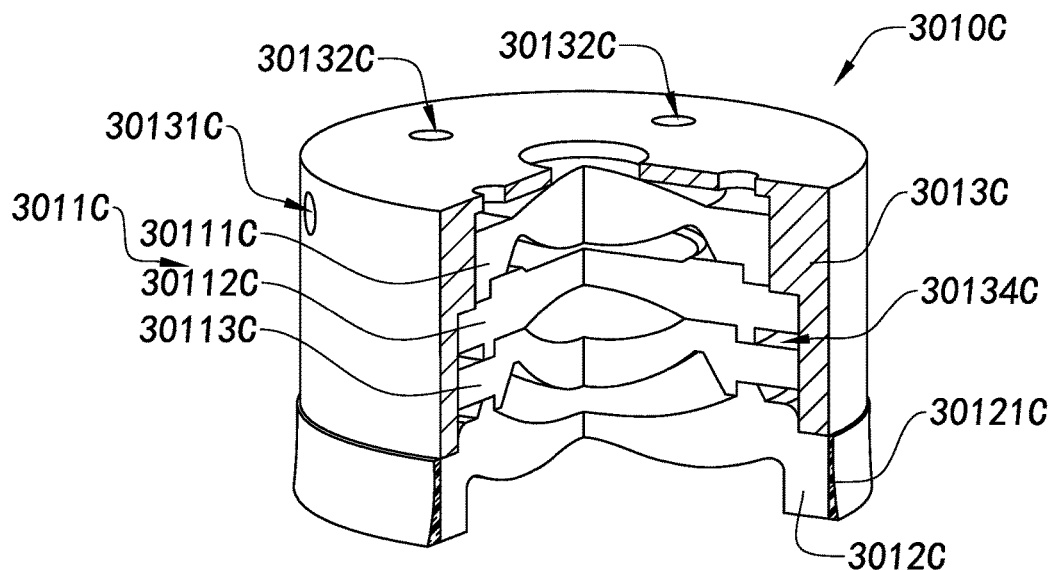
FIG. 39 is a perspective structural view of a lens of a camera module according to a twelfth preferred embodiment of the present invention.
Figure 40:
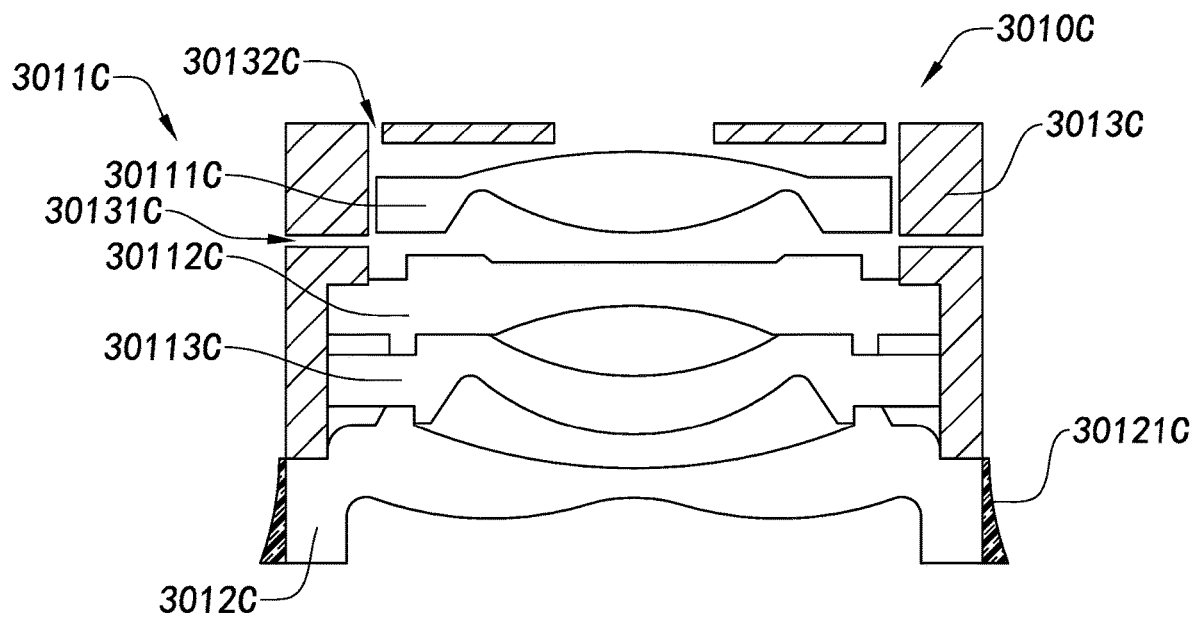
FIG. 40 is a sectional view of the camera module lens according to the above twelfth preferred embodiment of the present invention.

Referring to FIGS. 39-40, a twelfth preferred embodiment of the camera module lens according to the present invention is illustrated. Referring to FIGS. 39-40, the camera module lens 3010C comprises at least an internal lens 3011C, at least an external lens 3012C, at least a lens cone component 3013C. The internal lens 3011C is arranged in an accommodating cavity 30131C of the lens cone component 3013C. The external lens 3012C is arranged on a bottom of the lens cone component 3013C and in the outside of the lens cone component 3013C. The internal lens 3011C and the external lens 3012C are aligned in an optical path of the camera module lens 3010C.

In the twelfth preferred embodiment, there are three internal lenses 3011C, including a first internal lens 30111C, a second internal lens 30112C, and a third internal lens 30113C, wherein the first internal lens 30111C is preassembled in an internal space on top of the lens cone component 3013C to serve as an adjustable lens, wherein an assembling position thereof is adaptable to be adjusted in at least one direction correspondingly to a spatial position of the lens cone component 3013C. The adjustable directions include one or more of the horizontal, vertical, tilt, and peripheral directions.

Preferably, the first internal lens 30111C is preassembled with adhesive, wherein the adhesive is preferably a mixed adhesive of UV glue and thermosetting glue, such that the first internal lens 30111C can be preassembled in the lens cone component 3013C after the adhesive is semi-solidified through ultraviolet exposure. After the adjustment, the first internal lens 30111C can then be completely affixed by the adhesive that is completely solidified through a heating treatment. Person skilled in the art may also choose other means to preassemble the adjustable lens.

The second internal lens 30112C and the third internal lens 30113C are embedded and integrated into a whole lens unit. The embedment and integration of the two can selectively by utilizing spacer ring or glue connection. The lens unit is then affixed in the internal space of a middle and bottom of the lens cone component 3013C selectively through welding or glue connection. The second internal lens 30112C and the third internal lens 30113C can also be affixed in the lens cone component 3013C one by one.

It is worth mentioning that it may optionally make one or more of the internal lenses 3011C to serve as the adjustable lens(es) and it may also have the assembling position of the external lens 3012C adjustable by preassembling the external lens 3012C on the bottom of the lens cone component 3013C, so as to make the external lens 3012C an adjustable lens and adjust it in the subsequent process. Then, the optical center of the camera module lens 3010C can be calibrated through adjusting the assembling positions of the adjustable optical lenses. The adjustable optical lenses will be affixed after calibration, so as to increase the yield rate of the camera module lens.

The lens cone component 3013C has at least an adjustment channel 30131C arranged at a position where the adjustable lens is installed on the lens cone component 3013C. According to the preferred embodiment, the arranging position of the adjustment channel 30131C is corresponding to the assembling position of the first internal lens 30111C. The adjustment channel 30131C is adapted for communicating the internal space of the lens cone component 3013C with an external environment, wherein an external adjustment device is able to reach and contact the first internal lens 30111C through the adjustment channel 30131C from the outside of the lens cone component 3013C to adjust the assembling position of the first internal lens 30111C.

Preferably, according to the twelfth preferred embodiment, there are four adjustment channels 30131C arranged along a peripheral direction on the outer side of the lens cone component 3013C, wherein the adjustment channels 30131C are evenly distributed on the top of the lens cone component 3013C and positioned corresponding to the first internal lens 30111C. The adjustment channels 30131C are spaced with one another at 90 degrees, so as to allow the first internal lens 30111C to be adjusted from various directions, such that the adjustment accuracy can be ensured.

The lens cone component 3013C has at least an affixing channel 30132C arranged on a top portion of the lens cone component 3013C and positioned corresponding to the first internal lens 30111C. After the first internal lens 30111C is adjusted, the first internal lens 30111C is affixed by utilizing a dispensing device to dispensing adhesive through the affixing channel 30132C. Preferably, according to the twelfth preferred embodiment, there are four affixing channels 30132C separated from one another at 90 degrees and positioned corresponding to the edge of the first internal lens 30111C, such that it can be affixed from multiple places, so as to ensure a reliable affixing. When the adhesive is dispensing to affix the first internal lens 30111C, additional adhesive can be filled in the affixing channels 30132C at the same time to avoid dusts from entering and to prevent light leakage of the camera lens.

It is worth mentioning that the first internal lens 30111C can also be affixed by injecting adhesive through the adjustment channel 30131C, especially when the internal lens 30111C arranged in the internal space of the middle or bottom of the lens cone component 3013C serves as the adjustable lens. It usually utilizes the adjustment channel 30131C, corresponding to the adjustable lens, to affix the adjustable lens. Beside, additional adhesive can be injected into the adjustment channel 30131C to seal the adjustment channel 30131C at the same time.

When the external lens 3012C serves as the adjustable lens, it can be adjusted through other device and affixed through dispensing or completely solidifying the adhesive.

Further, a shading layer 30121C is arranged on an edge of the external lens 3012C. The shading layer 30121C has to completely cover the entire side of the external lens 3012C so as to avoid light leakage of the camera module lens 3010C and prevent external stray light from entering the camera module lens 3010C, such that the imaging quality of the camera module lens 3010C can be ensured. Preferably, the shading layer 30121 is arranged by applying black glue on the outer side of the external lens 3012, wherein the black glue can be a thermosetting glue that becomes the shading layer 30121C after solidified.

Figure 41:
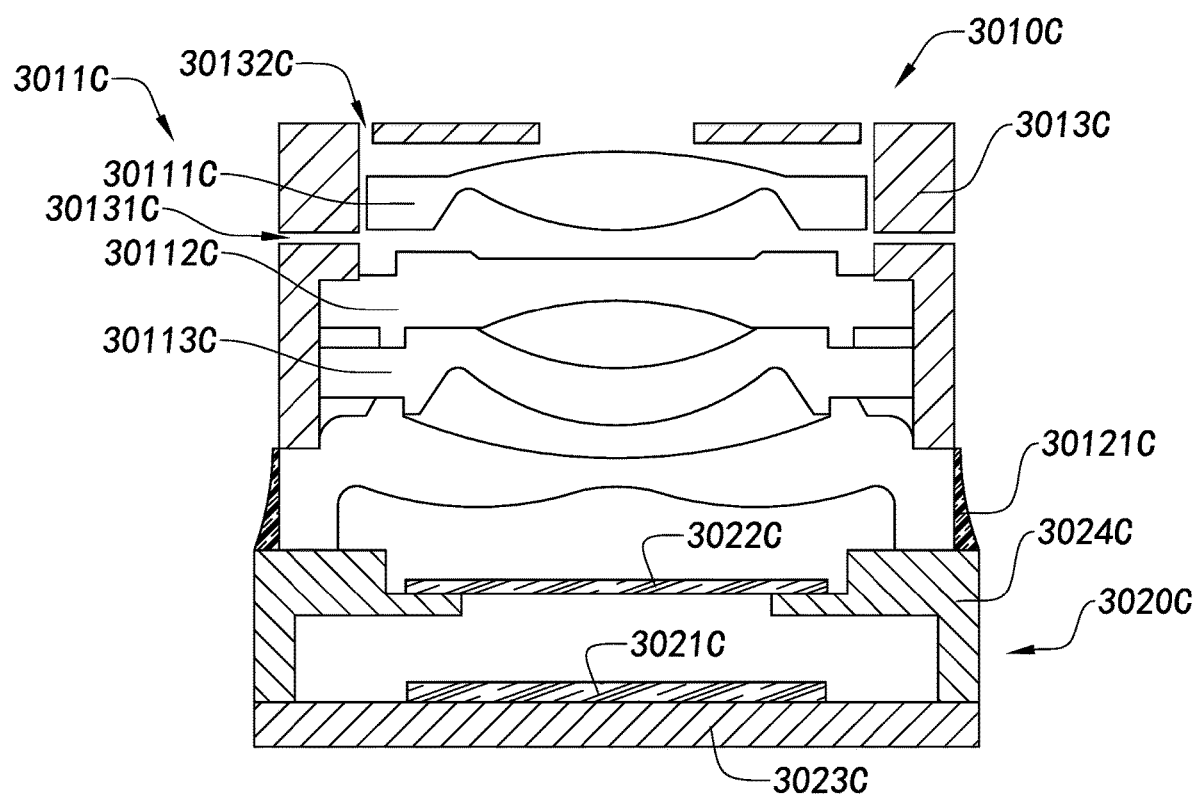
FIG. 41 is a sectional view of a manufacturing process of the camera module according to the above twelfth preferred embodiment of the present invention.

Referring to FIG. 41, a camera module comprising the above mentioned camera module lens 3010C is illustrated. Referring to FIG. 41, the camera module comprises the camera module lens 3010C and a photosensitive device 3020C, wherein the photosensitive device 3020C comprises an optical sensor 3021C. The camera module lens 3010C is arranged along a photosensitive path of the optical sensor 3021C that lights reflected from an object can enter an inside of the camera module through the camera module lens 3010C and be received by the optical sensor 3021C to proceed photoelectric conversion, so that images respective to the object can be subsequently captured by the camera module.

The photosensitive device further comprises a filter 3022C, a circuit board 3023C, and a lens mount 3024C. The filter 3022C is mounted in the lens mount 3024C and arranged above the optical sensor 3021C. The optical sensor 3021C is attached on the circuit board 3023C. The circuit board 3023C is mounted on a bottom of the lens mount 3024C so as to have the optical sensor 3021 located in a cavity defined in an internal of the lens mount 3024C. Besides, the optical sensor 3021C keeps a distance from the lens mount 3024C. In other word, they do not contact with each other. The photosensitive device 3020C is manufactured with chip on board (COB) technology.

The external lens 3012C is arranged between the lens cone component 3013C and the lens mount 3024C. That is, a top of the external lens 3012C is connected with the bottom of the lens cone component 3013C. A bottom of the external lens 3012C is connected with the top of the lens mount 3024C and leant on the lens mount 3024C to be supported by the lens mount 3024C. The internal lenses 3011C and the external lens 3012C are all arranged along a photosensitive path of the optical sensor 3021C. The assembling position of first internal lens 30111C serving as an adjustable lens of the camera module is adjustable relatively with an assembling position of the optical sensor 3021C. After the adjustment, a central axis line of the camera module lens 3010C and a central axis line of the optical sensor 3021C are coincided or within an allowable range of deviance, so as to ensure the imaging quality of the camera module.

It is worth mentioning that the rest internal lenses 3011C and the external lens 3012C in the camera module may also be chosen to serve as the adjustable lens for adjusting the central axis line of the camera module lens 3010C. As the external lens 3012C serves as the adjustable lens, it has to preassemble the external lens 3012C and the lens mount 3024C, which means that the external lens 3012C may not be affixed on the lens mount 3024C and the assembling position of the external lens 3012C should be adjustable correspondingly to the lens mount 3024C.

Figure 43:
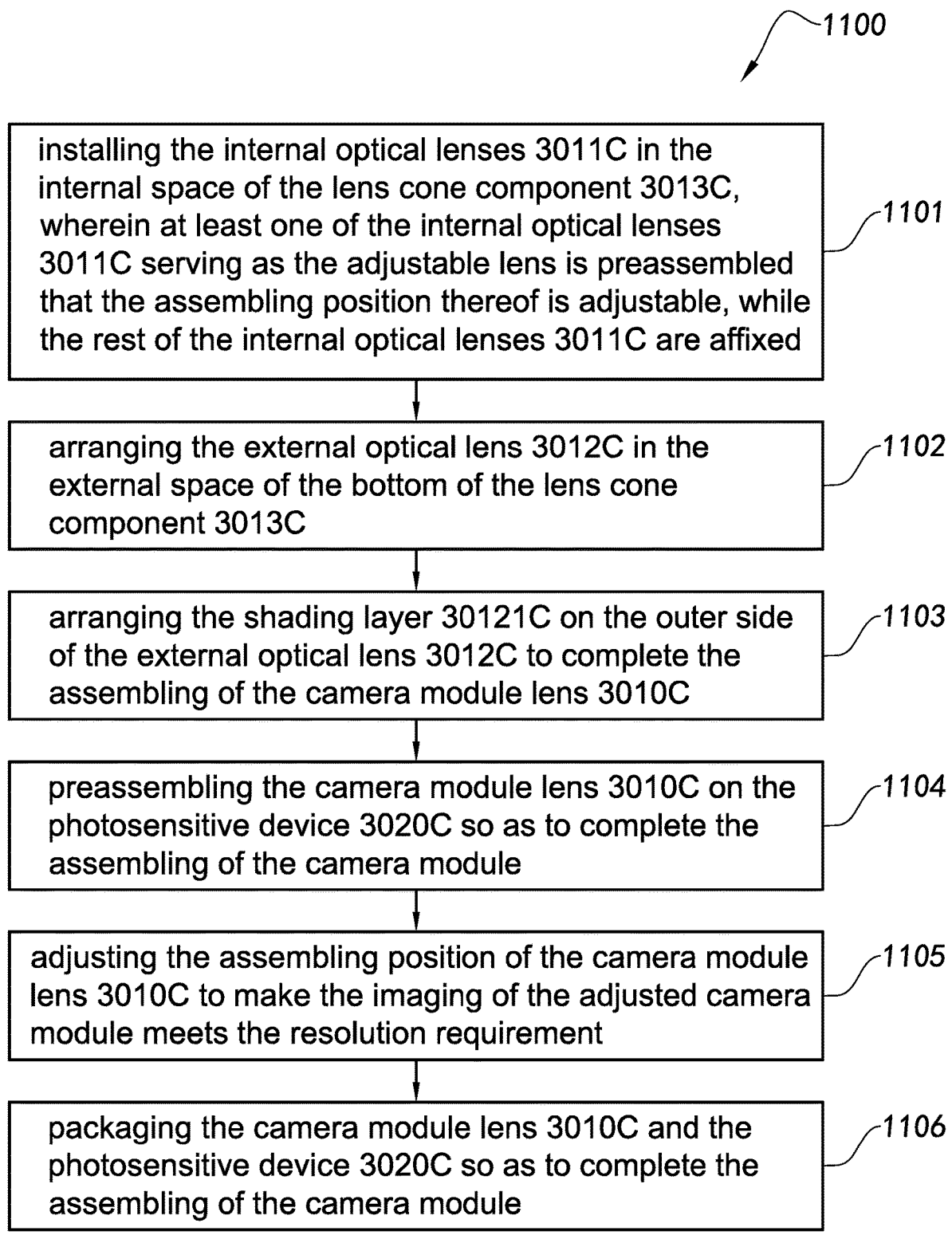
FIG. 43 is a flow diagram of an assembling method of the camera module according to the above twelfth preferred embodiment of the present invention.

Referring to FIG. 43, an assembling method of the camera module is illustrated. The assembling method 1100 of the camera module comprises the following steps:

step (1101): installing the internal lenses 3011C in the internal space of the lens cone component 3013C, wherein at least one of the internal lenses 3011C serving as the adjustable lens is preassembled that the assembling position thereof is adjustable, while the rest of the internal lenses 3011C are affixed;

step (1102): arranging the external lens 3012C in the external space of the bottom of the lens cone component 3013C;

step (1103): arranging the shading layer 30121C on the outer side of the external lens 3012C to complete the assembling of the camera module lens 3010C;

step (1104): preassembling the camera module lens 3010C on the photosensitive device 3020C so as to complete the assembling of the camera module;

step (1105): adjusting the assembling position of the camera module lens 3010C to make the imaging of the adjusted camera module meets the resolution requirement; and step (1106): packaging the camera module lens 3010C and the photosensitive device 3020C so as to complete the assembling of the camera module.

The step (1101) to step (1103) are the assembling steps of the camera module lens 3010C.

In the step (1101), the internal lenses 3011C besides the adjustable lens may also be affixed in the internal space of the lens cone component 3013C one by one or be embedded and integrated to form a whole lens unit to be affixed in the internal space of the lens cone component 3013C, wherein the first internal lens 30111C is serving as the adjustable lens and preassembled with adhesive, such that the assembling position thereof can be adjusted in the subsequent process.

In the step (1102) and step (1103), black glue is also applied on the juncture of the lens cone component 3013C and the external lens 3012C when it is applied on the outer side of the external lens 3012C for making the shading layer 30121C, such that it is able to not only form the shading layer 30121C, but also connect the external lens 3012C and the lens cone component 3013C, which reduces on assembling steps, saves time, increases product yield efficiency, and lowers the cost. Certainly, the shading layer 30121C can also be arranged by applying black glue on the outer side of the external lens 3012C after the external lens 3012C and the lens cone component 3013C are connected. Depending on the actual situation, the shading layer 30121C can selectively be arranged on the external lens 3012C before or after it was assembled.

Further, it may also apply adhesive on the edge of the top surface of the external lens 3012C or the bottom surface of the lens cone component 3013C to connect them. Besides, the external lens 3012C and the lens cone component 3013C can either be affixingly connected or not when they are preassembled, wherein the external lens 3012C serves as adjustable lens, such that the assembling positions of the lens cone component 3013C and the external lens 3012C are adaptable to be adjusted place at least one direction in the subsequent process.

In the step (1104), adhesive is applied on the edge of the bottom surface of the external lens 3012C or the top surface of the lens mount 3024C, so as to affixedly connect the external lens 3012C and the lens mount 3024C with adhesive. The adhesive is preferably a thermosetting glue. The external lens 3012C and the optical sensor 3021C can also be preassembled, so that their relative assembling positions are adaptable to be adjusted in at least one direction.

In the above steps, the adhesive for preassembling is suitably a mixed adhesive of a UV glue and a thermosetting glue. The adhesive turns into a semi-solidified condition after ultraviolet exposure to implement the preassembling. Then, it will be completely solidified through a heating treatment, such that the external lens 3012C can be affixed on the lens mount 3024C and the lens cone component 3013C.

In the step (1105), the adjustment of the camera module lens 3010C can be conducted through adjusting the external lens 3012C, the internal lens serving as the adjustable lens, and/or the lens cone component 3013C, which means the optical path of the camera module lens 3010C can be adjusted so as to make the central axis line of the camera module lens 3010C and the central axis line of the optical sensor 3021C are coincided or within an allowable range of deviance, such that imaging of the camera module can meet the expected resolution requirement.

Specifically, the camera module lens can be adjusted according to the following ways through the preassembling of the adjustable lens in the above assembling method:

(1) Calibrate the camera module by adjusting the assembling position of the lens cone component 3013C, that means to adjust the preassembled adjustable lens and the internal lenses 3011C affixed in the internal space of the lens cone component 3013C through adjust the lens cone component 3013C. In other words, the external lenses 3012C are affixedly connected with the lens mount 3024C, but preassembled with the lens cone component 3013C under this condition.

(2) Calibrate the camera module respectively through adjusting the lens cone component 3013C and the external lens 3012C. The external lens 3012C and the lens cone component 3013C are both preassembled the lens mount 3024C under this condition.

(3) Calibrate the camera module through adjusting the lens cone component 3013C and the external lens 3012C at the same time, which means to calibrate the camera module through adjusting the camera module lens 3010C. Namely, the external lens 3012C is affixedly connected affixedly connected with the lens cone component 3013, but preassembled with the lens mount 3024C under this condition.

(4) Adjust the central axis line of the camera module lens 3010C through adjusting the assembling position of the adjustable lens.

(5) Calibrate the camera module through combining the adjustable lens adjustment with the adjustments of the lens cone component 3013C and the external lens 3012C mentioned in the above (1) to (3).

The step (1105) comprises the following steps:

step (11051): powering on the preassembled camera module and capturing the imaging of the camera module;

step (11052): calculating the adjusting method and calibration measurement of the camera module lens 3010C by software and photology based on the imaging of the camera module; and step (11053): precisely adjusting the assembling position of the camera module lens 3010C according to the calibration measurement.

In the step (1106), after the preassembled camera module 10C is adjusted, adhesive, such as thermosetting glue, is dispensed between the external lens 3012C and the lens cone component 3013C and between the external lens 3012C and the lens mount 3024C and solidified, so as to fix the preassembled external lens 3012C. Besides the internal lens 3011C, which serves as the adjustable lens, is affixed through the adjustment channel 30131C and/or the affixing channel 30132C, so as to complete the assembling of the camera module.

In addition, the external lens 3012C may also be directly affixed between the lens cone component 3013C and the lens mount 3024C without adjustment afterwards. Rather, the imaging of the camera module is calibrated through adjusting and affixing the assembling position of the internal lens 3011C serving as the adjustable lens. Then the assembling of the camera module can be completed.

Those skilled in the art shall understand that the above mentioned embodiments of the present invention in the descriptions and figures are to give examples, but to confine the present invention. Objectives of the present invention are completely and effectively implemented. Notions of the functions and structures of the present invention have been shown and described in the embodiments, whereas implementations of the present invention may have modifications or changes in any ways without going against the above notions.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A camera module, comprising:
a photosensitive device including an optical sensor; and
an adjustable optical lens member which is arranged in a photo sensitive path of said optical sensor and comprises an optical structural member, one or more adjustable lenses, and an aperture member, wherein each of said lenses is arranged in an internal space of said optical structural member wherein at least one of said lenses is preassembled in said internal space of said optical structural member serving as an adjustable lens, wherein said aperture member is arranged on top of said optical structural member and on a top side of said adjustable lens preassembled, wherein said aperture member has at least one adhesive injection channel which is located in a side of said photo sensitive path of said optical sensor, and before packaging said adjustable lens and said photosensitive device, an assembling position of said one or more adjustable lenses inside said optical structural member is arranged to be adjusted under said aperture member, so as to change a relative position between said aperture member and said one or more adjustable lenses as well as a relative position between said one or more adjustable lenses and said optical sensor, wherein said adhesive injection channel is extended corresponding to said adjustable lens, such after said adjustable lens is adjusted, said adhesive injection channel is guided for injecting adhesive into said internal space of said optical structural member to affix a position of said adjustable lens once the adhesive is solidified.

2. The camera module, as recited in claim 1, wherein said optical structural member has at least one adjustment channel provided communicating said internal space of said optical structural member with an external environment, wherein said at least one adjustment channel is positioned corresponding to said one or more adjustable lenses to be preassembled and arranged in said internal space of said optical structural member, wherein each of said one or more adjustable lenses is preassembled in said internal space of said optical structural member is able to be adjusted through said at least one adjustment channel before packaging said adjustable lens and said photosensitive device, wherein said adhesive injection channel is non-parallel to said at least one adjustment channel.

3. The camera module, as recited in claim 2, wherein each of said one or more adjustable lenses of said adjustable optical lens member in said internal space of said optical structural member is able to be adjusted in at least one direction, wherein a central axis line of each of said one or more adjustable lenses and a central axis line of said optical sensor are coincided or within an allowable range of deviation therebetween after adjustment of said one or more adjustable lenses.

4. The camera module, as recited in claim 3, wherein said photosensitive device comprises a filter, a lens mount and a circuit board, wherein said filter is affixed on said lens mount and said optical sensor is attached on said circuit board and positioned below said filter, wherein the optical structural member is affixed on a top side of the lens mount.

5. The camera module, as recited in claim 3, wherein said photosensitive device comprises a filter and a circuit board, wherein said filter is installed in said optical structural member and positioned below said one or more adjustable lenses, wherein said optical sensor is attached on said circuit board and positioned below said filter, wherein a space distance between said optical structural member with respect to said optical sensor is fixed.

6. The camera module, as recited in claim 2, wherein said photosensitive device comprises a filter, a lens mount and a circuit board, wherein said filter is affixed on said lens mount and said optical sensor is attached on said circuit board and positioned below said filter, wherein the optical structural member is affixed on a top side of the lens mount.

7. The camera module, as recited in claim 2, wherein said photosensitive device comprises a filter and a circuit board, wherein said filter is installed in said optical structural member and positioned below said one or more adjustable lenses, wherein said optical sensor is attached on said circuit board and positioned below said filter, wherein a space distance between said optical structural member with respect to said optical sensor is fixed.

8. The camera module, as recited in claim 1, wherein each of said one or more adjustable lenses of said adjustable optical lens member in said internal space of said optical structural member is able to be adjusted in at least one direction, wherein a central axis line of each of said one or more adjustable lenses and a central axis line of said optical sensor are coincided or within an allowable range of deviation therebetween after adjustment of said one or more adjustable lenses.

9. The camera module, as recited in claim 8, wherein said photosensitive device comprises a filter, a lens mount and a circuit board, wherein said filter is affixed on said lens mount and said optical sensor is attached on said circuit board and positioned below said filter, wherein the optical structural member is affixed on a top side of the lens mount.

10. The camera module, as recited in claim 8, wherein said photosensitive device comprises a filter and a circuit board, wherein said filter is installed in said optical structural member and positioned below said one or more adjustable lenses, wherein said optical sensor is attached on said circuit board and positioned below said filter, wherein a space distance between said optical structural member with respect to said optical sensor is fixed.

11. The camera module, as recited in claim 1, wherein said photosensitive device comprises a filter, a lens mount and a circuit board, wherein said filter is affixed on said lens mount and said optical sensor is attached on said circuit board and positioned below said filter, wherein the optical structural member is affixed on a top side of the lens mount.

12. The camera module, as recited in claim 1, wherein said photosensitive device comprises a filter and a circuit board, wherein said filter is installed in said optical structural member and positioned below said one or more adjustable lenses, wherein said optical sensor is attached on said circuit board and positioned below said filter, wherein a space distance between said optical structural member with respect to said optical sensor is fixed.

13. A manufacturing method of a camera module, comprising steps of:
  (A) arranging an adjustable optical lens member along a photosensitive path of an optical sensor of an optical device;
  (B) preassembling an aperture member and an adjustable optical element in said adjustable optical lens member to complete a preassembly of said camera module;
  (C) adjusting an assembling position of an aperture member for adjusting an incident light beam based on an image obtained by said optical sensor;
  (D) adjusting an assembling position of the adjustable optical element to make an imaging of said camera module meeting a resolution requirement;
  (E) through an adhesive injecting channel, injecting adhesive into said optical device to affix a position of said adjustable optical element; and
  (F) packaging said adjustable optical lens member and said optical device.

14. The method, as recited in claim 13, wherein the step (D) further comprises the following steps:
  (D1) capturing an imaging of said preassembled camera module;
  (D2) calculating a calibration measurement for said adjustable optical element with a software based on said imaging of said preassembled camera module; and
  (D3) adjusting an assembling position of said adjustable optical element according to said calibration measurement before packaging said adjustable optical element and said optical device.

15. A camera module, comprising:
  a camera module lens member; and
  a photosensitive device, wherein said camera module lens member is arranged along a photosensitive path of the photosensitive device and comprises one or more internal lenses, one or more external lenses, and a lens cone component, wherein each of said one or more internal lenses are arranged in an interior space of the lens cone component, and said one or more external lenses are arranged in an exterior space of the lens cone component, wherein a central axis line of said one or more internal lenses and a central axis line of said one or more external lenses are coincided, wherein at least one of said one or more internal lenses serves as an adjustable lens arranged to be adjusted to align said central axis line of said one or more internal lenses with said central axis line of said one or more external lenses based on an image obtained by said photosensitive device, wherein when said adjustable lens is adjusted inside said internal space of said lens cone component, a position of said adjustable lens is affixed by adhesive, so as to fix a relative position between said adjustable lens and said photosensitive device.

16. The camera module, as recited in claim 15, wherein said photosensitive device further comprises an optical sensor and a lens mount, wherein said optical sensor is located in an internal of said lens mount, wherein said one or more external lenses are arrange between said lens cone component and said photosensitive device.

17. The camera module, as recited in claim 16, further comprising a shading layer arranged on an outer side of said one or more external lenses to completely cover said outer side thereof for avoiding light leakage from said one or more external lens and for preventing external stray light entering into said one or more external lens, wherein said shading layer is formed by black glue applied on said outer side of said one or more external lenses.

18. The camera module, as recited in claim 17, wherein said lens cone component has at least an affixing channel arranged on a top portion of said lens cone component, such that before fixing said adjustable lens, after said adjustable lens is adjusted, said affixing channel is guided for injecting the adhesive into said internal space of said lens cone component to affix said position of said adjustable lens once the adhesive is solidified.

19. The camera module, as recited in claim 16, wherein said lens cone component has at least an adjustment channel, wherein a portion of said adjustment channel is corresponding to an assembling position of at least one of said one or more internal lenses serving as said adjustable lens, wherein said adjustment channel is communicated said internal space of said lens cone component with an external environment.

20. The camera module, as recited in claim 16, wherein said lens cone component has at least an affixing channel arranged on a top portion of said lens cone component, such that before fixing said adjustable lens, after said adjustable lens is adjusted, said affixing channel is guided for injecting the adhesive into said internal space of said lens cone component to affix said position of said adjustable lens once the adhesive is solidified.

* * * * *